US005530544A

United States Patent [19]
Trebino et al.

[11] Patent Number: 5,530,544
[45] Date of Patent: Jun. 25, 1996

[54] METHOD AND APPARATUS FOR MEASURING THE INTENSITY AND PHASE OF ONE OR MORE ULTRASHORT LIGHT PULSES AND FOR MEASURING OPTICAL PROPERTIES OF MATERIALS

[75] Inventors: Rick P. Trebino; Kenneth W. DeLong, both of Livermore, Calif.

[73] Assignee: Sandia Corporation, Albuquerque, N.M.

[21] Appl. No.: 299,021

[22] Filed: Aug. 31, 1994

Related U.S. Application Data

[63] Continuation-in-part of Ser. No. 966,644, Oct. 26, 1992.
[51] Int. Cl.$^6$ ............................................. G01B 9/02
[52] U.S. Cl. ......................................................... 356/345
[58] Field of Search ................................... 356/345, 346

[56] References Cited

U.S. PATENT DOCUMENTS 4,792,230 12/1988 Naganuma et al. ...................... 356/345

OTHER PUBLICATIONS

"Imaging Objects Hidden in a Highly Scattering Media Using Femtosecond Second–Harmonic–Generation Cross–Correlation Time Gating", Yoo et al, Optics Letters, Jul. 1991, pp. 1019–1021.
R. J. Hellwarth, "Third–Order Optical Susceptibilities of Liquids and Solids," Progr. Quant. Electron., vol. 5, pp. 1–68 (1977).
K. J. Blow et al., "Theoretical Description of Transient Stimulated Raman Scattering in Optical Fibers," IEEE J. Quant. Electron., vol. 25, No. 12, pp. 2665–2673 (1989).
R. Hellwarth et al., "Origin and frequency dependence of nonlinear optical susceptibilies of glasses," Phys. Rev. B., vol. 11, No. 2, pp. 964–967 (1975).
R. Trebino et al., "Antiresonant–ring transient spectroscopy," 16 Opt. Lett., vol. 16, No. 7, pp. 493–495 (1991).

H. J. Eichler et al., *Laser–Induced Dynamic Gratings,* Springer–Verlag, New York (1988), pp. 1–37.
R. Trebino et al., "Fourth–order Partial–Coherence Effects in the Formation of Integrated–Intensity Gratings with Pulsed Light Sources," 3 J. Opt. Soc. Am. B, pp. 1295–1304 (Oct. 1986).
R. Trebino et al., "Chirp and Self–Phase Modulation in Induced–Grating Autocorrelation Measurements of Ultrashort Pulses," 15 Opt. Lett. No. 19, pp. 1079–1981 (Oct. 1990).
J. Foing et al., "Femtosecond Pulse Phase Measurement by Spectrally Resolved Up–Conversion: Application to Continuum Compression," 28 IEEE J. Quantum Electron., No. 10, pp. 2285–2290.
M. Gower, "Phase Conjugate Mirrors," Tutorial T8, SPIE, pp. 1–5, (Apr. 1984).
J. L. A. Chilla et al., "Direct determination of the amplitude and the phase of femtosecond light pulses," 16 Opt. Lett., No. 1, pp. 38–41 (1991).
A. Brun et al., "Single–shot characterization of ultrashort light pulses," 24 J. Phys. D: Appl. Phys., pp. 1225–1233 (Aug. 1991).
J. R. Flenup et al., "Phase–retrieval stagnation problems and solutions," J. Opt. Soc. Amer. A, vol. 3, pp. 1897–1907 (1986).
J. R. Flenup, "Phase retrieval algorithms: a comparison," Appl. Opt. 21, pp. 2758–2769 (1982).
W. H. Press et al., Numerical Recipes in C, 2nd ed. (Cambridge Univ. Press, U.K., 1992), Chapter 10, pp. 394–455.

(List continued on next page.)

*Primary Examiner*—Samuel A. Turner
*Attorney, Agent, or Firm*—Timothy D. Stanley; Gregory A. Cone; Donald A. Nissen

[57] ABSTRACT

The intensity and phase of one or more ultrashort light pulses are obtained using a non-linear optical medium. Information derived from the light pulses is also used to measure optical properties of materials. Various retrieval techniques are employed. Both "instantaneously" and "non-instantaneously" responding optical mediums may be used.

10 Claims, 35 Drawing Sheets

OTHER PUBLICATIONS

A. Levi et al., "Image Recovery: Theory and Applications," H. Stark, ed. (Academic Press, San Diego, 1987), Chapter 8, pp. 277–320.

K. W. DeLong et al., "Pulse retrieval in frequency–resolved optical gating based on the method of generalized projections", 19 Opt. Lett., No. 24, pp. 1–3 (1994).

R. H. Stolen et al., "Raman response function of silica–core fibers," 6 J. Opt. Soc. Am. B, No. 6, pp. 1159–1166 (1989).

R. H. Stolen et al., "Effect of the Raman part of the nonlinear refractive index on propagation of ultrashort optical pulses in fibers," 9 J. Opt. Soc. Am. B, No. 9, pp. 565–573 (1992).

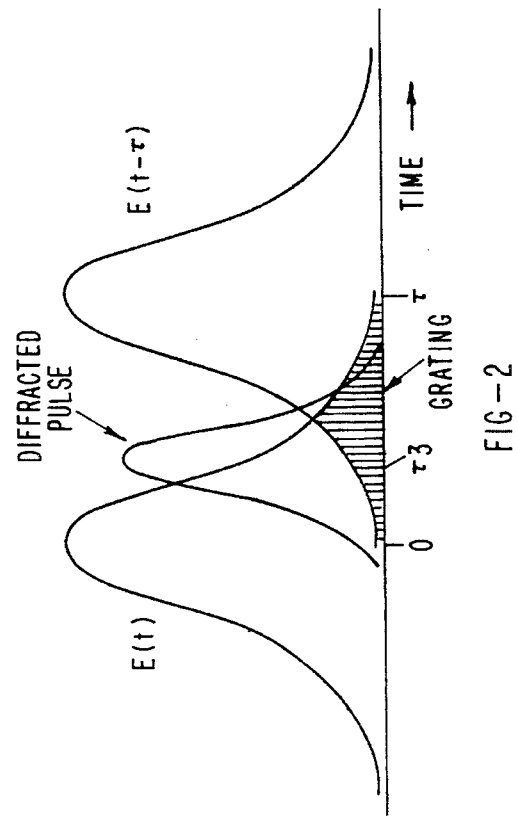
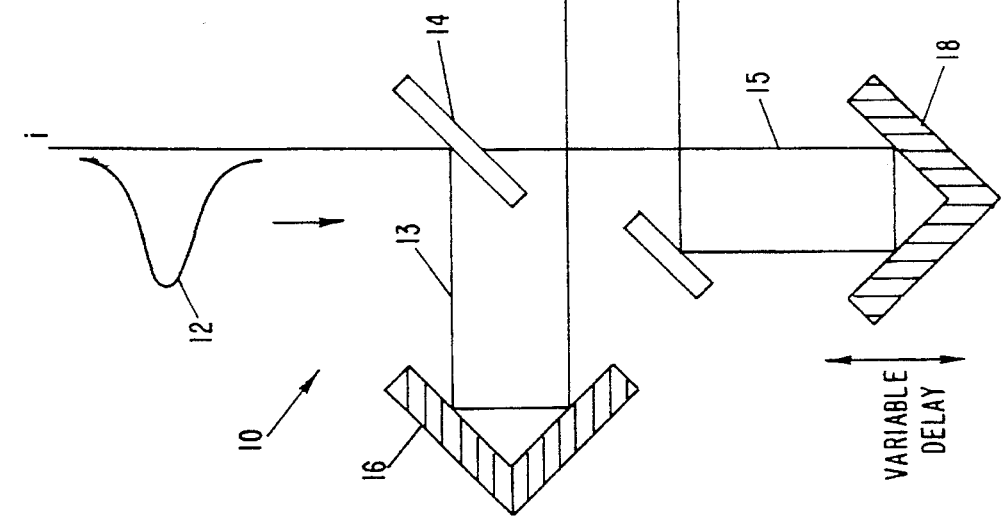
FIG-2
FIG-1C

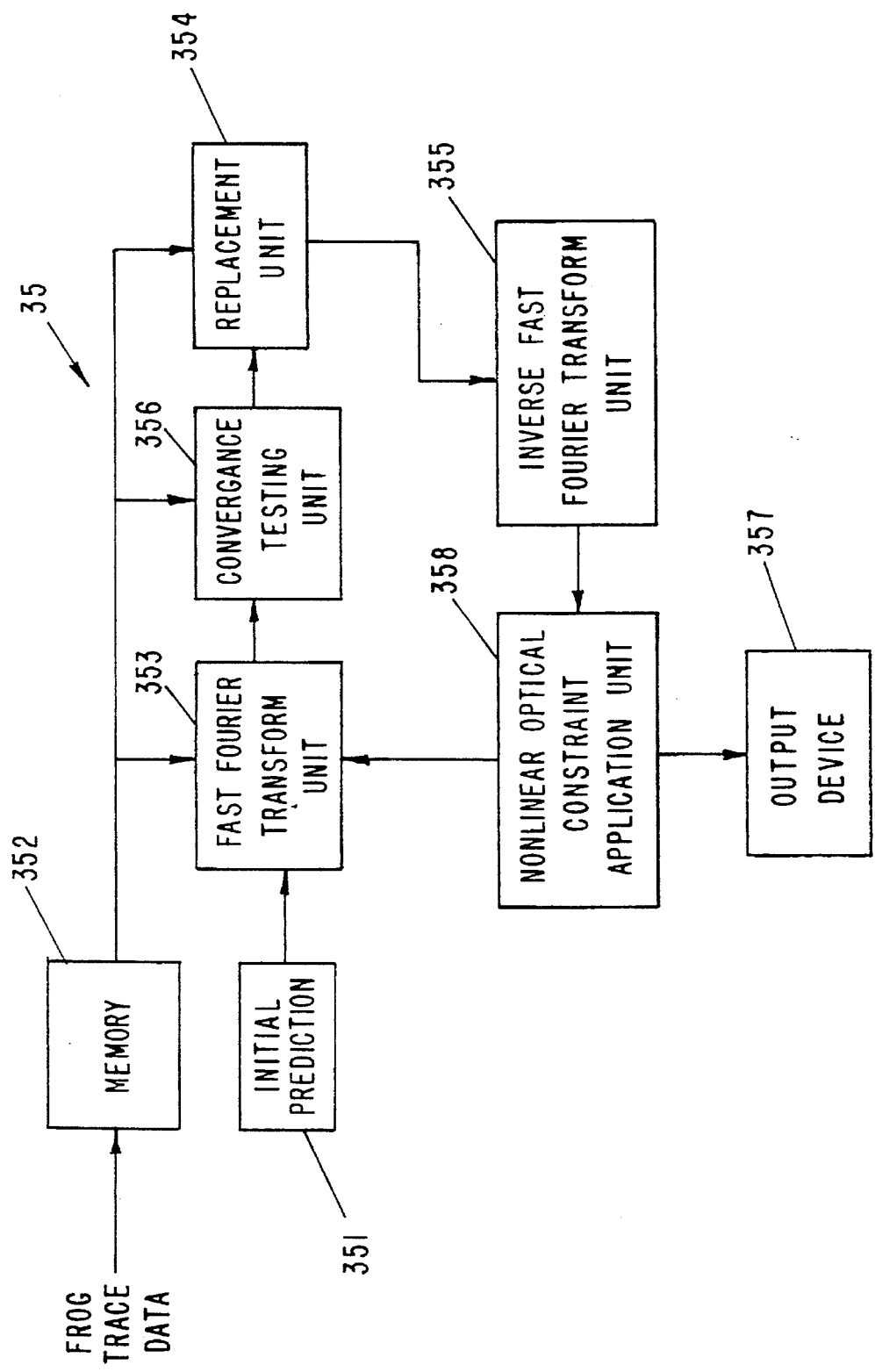
FIG—1D

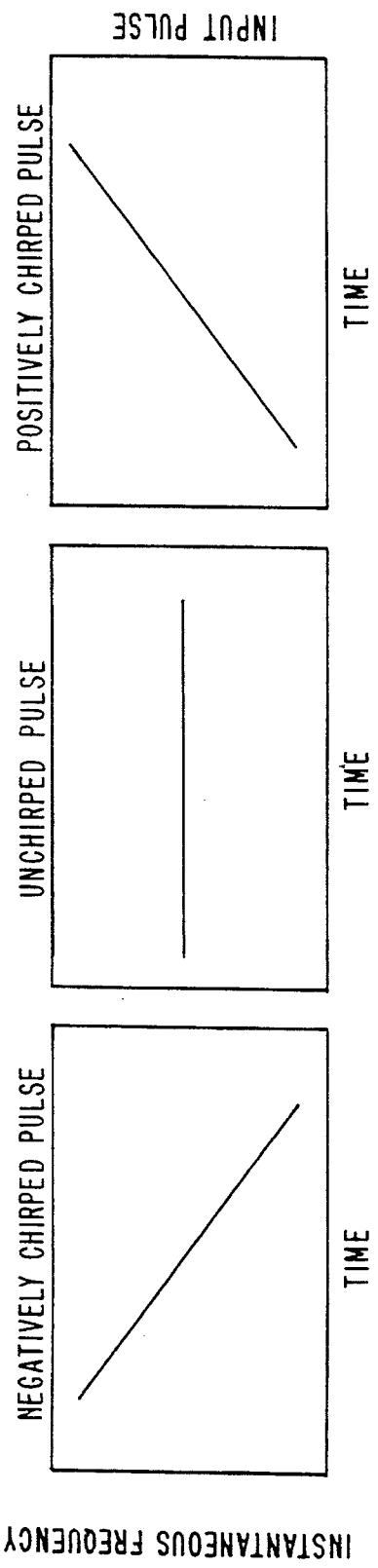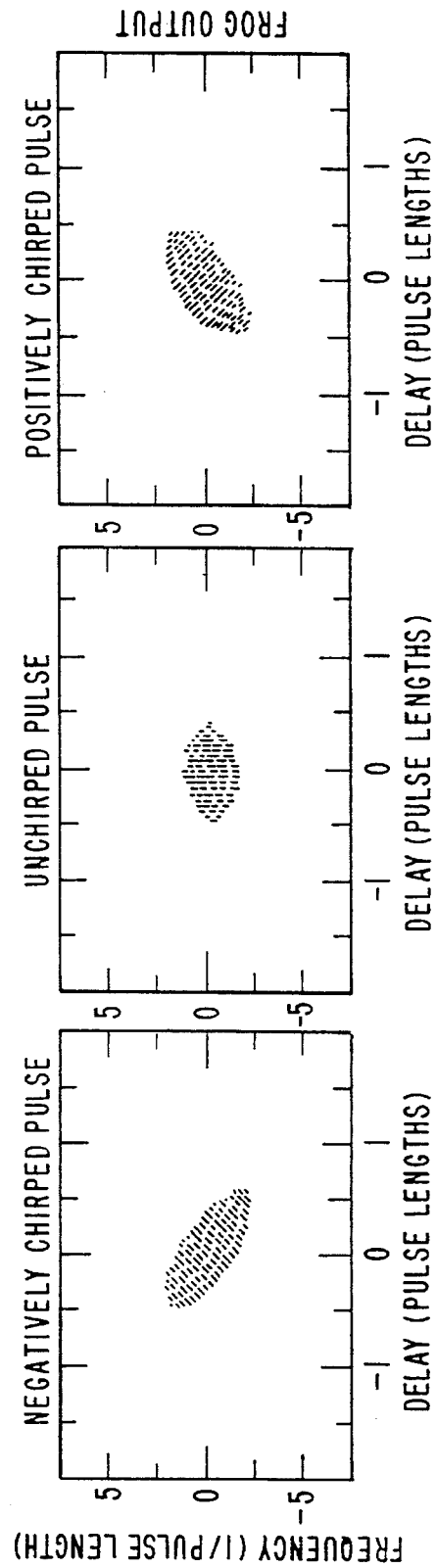

FIG—15

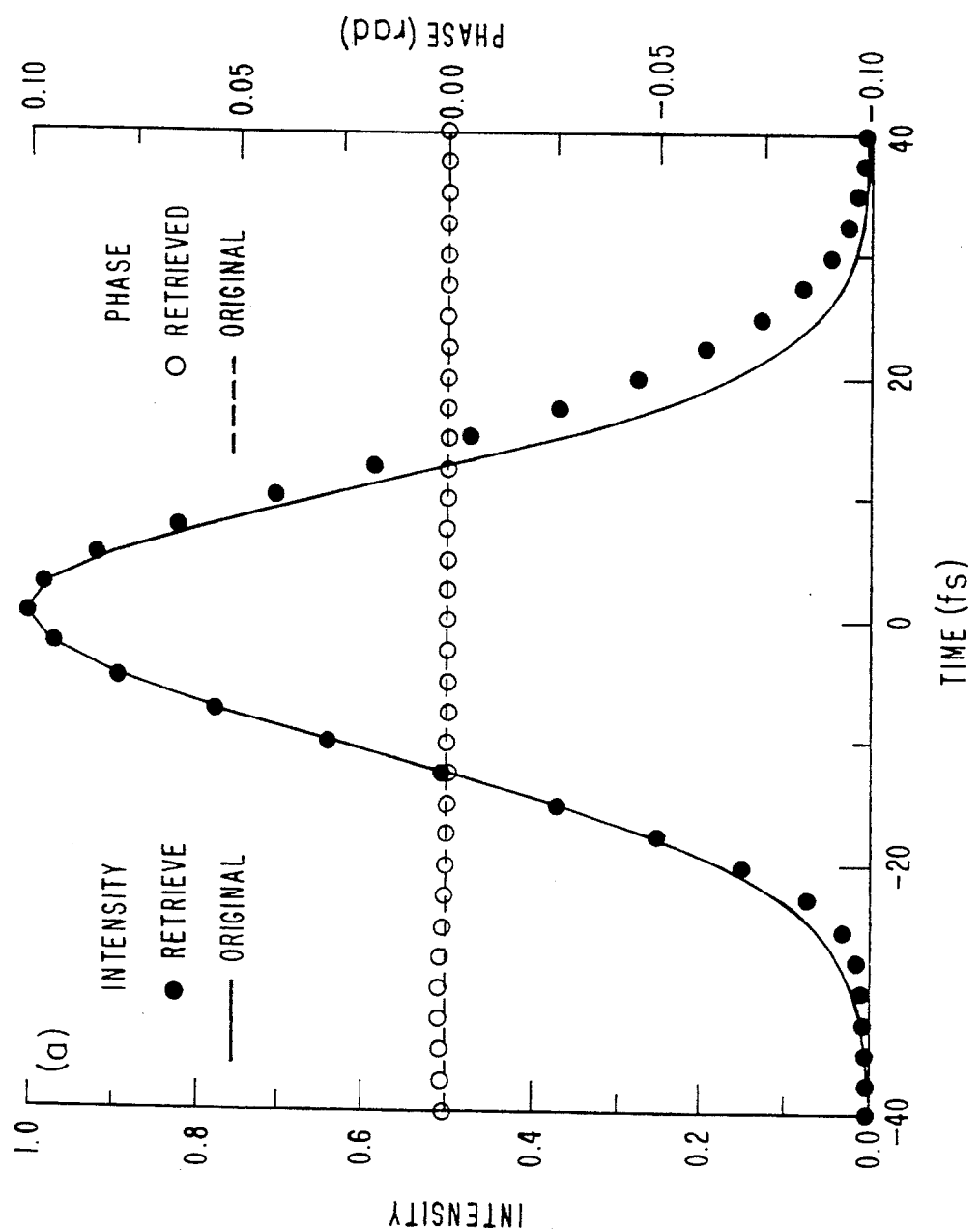

METHOD AND APPARATUS FOR MEASURING THE INTENSITY AND PHASE OF ONE OR MORE ULTRASHORT LIGHT PULSES AND FOR MEASURING OPTICAL PROPERTIES OF MATERIALS

BACKGROUND THE INVENTION

Continuation-in-Part of Ser. No. 07/966,644 filed Oct. 26, 1992.

This invention relates to the measurement of parameters for ultrashort pulses and, more particularly, to the measurement and analysis of data that directly yields the time dependent intensity and phase of ultrashort light pulses. It also relates to the application of this information to the measurement of material optical parameters. This invention is the result of a contract with the Department of Energy (Contract No. W-7405-ENG-36).

The generation of ultrashort laser pulses, i.e., laser pulse widths shorter than a nanosecond, has been under development for some time, and it is now possible to obtain ultrashort pulses as short as a few femtoseconds and over a relatively wide range of wavelengths. Measurement techniques to characterize these ultrashort pulses have not developed accordingly, however. The problem is difficult because the durations of ultrashort pulses are much less than the temporal resolution of available measuring devices. Early characterization techniques generated an intensity autocorrelation only, and later developments have allowed the determination of various phase distortions common to ultrashort pulses by, for example, such methods as interferometric autocorrelations or degenerate-four-wave mixing processes.

In a classic autocorrelator, an incoming laser pulse is split into two identical pulses. The two pulses arrive at a doubling crystal at about the same time and intersect to output second harmonic light. The intensity of the second harmonic light is measured as a function of delay between the two pulses. This yields an intensity autocorrelation. An interferometric autocorrelation can be produced when the second harmonic light from the individual pulses is also measured and the delay is stepped at a fraction of a wavelength while the device is stable and the fringes are observed.

Neither intensity autocorrelation nor interferometric autocorrelation provides full measure of the pulse intensity or phase, however. Further, stability of interferometric autocorrelation to less than one wavelength of light is required. Special materials are required to generate the second harmonic output, and available materials limit the technique to regions above 400 nm in wavelength (although less convenient processes such as two-photon absorption and multiphotonionization can be made to yield autocorrelations in this region). Finally, autocorrelation provides only a very approximate indication of the pulse width, and phase information is not available at all from the autocorrelation. Interferometric autocorrelation does give some phase information, but not much, and it cannot, for example, distinguish positive from negative linear chirp.

A recent development reported by J. D. A. Chilla et al., "Direct Determination of the Amplitude and the Phase of Femtosecond Light, Pulses," 16 Opt. Lett., No. 1, pp. 39–41 (1991), provides a method for directly obtaining the time-dependent pulse intensity and phase (in the frequency domain). The method involves frequency-filtering the pulse and cross-correlating the filtered pulse with the shorter unfiltered pulse, yielding the time (group delay) vs. frequency, which is integrated to yield the phase vs. frequency. This result, in conjunction with the spectrum, is a complete characterization of the pulse field in the frequency domain provided that certain approximations are met. Fourier transformation then yields the intensity and phase in the time domain if desired. While this method does provide full structural information for most ultrashort pulses, the method is complex and time-consuming to perform and requires multiple pulses to acquire the required information. It also fails when phase discontinuities occur.

Yet another technique for characterization of single ultrashort pulses is reported by A. Brunet al., "Single-shot Characterization of Ultrashort Light Pulses," 24 J. Phys. D: Appl. Phys., pp. 1225–1233 (August 1991). A beam splitter produces two replicas of the incident pulse. In one embodiment, one of the beams is focused in a water cell to output a pulse with a continuum chirp, i.e., different frequencies are distributed along the continuum temporal profile. This continuum pulse is then linearly polarized and combined with the other beam in a Kerr medium to transform the temporal modulation of the pulse into a spectral modulation. A spectrograph converts the wavelength-encoded temporal information to the spatial domain for readout. While spatial information may be obtained for a single pulse, multiple pulses are needed to first characterize the continuum. Further, a portion of the continuum having a linear chirp must be used. A variety of pump pulse delays were used to verify that the measured response was only slightly dependent on delay so long as the chirp was generally linear over the central wavelength selected for beam crossing. A good approximation of the ultrashort light pulse temporal shape is reported, but this method did not produce phase information.

Accordingly, it is an object of the present invention to obtain time-dependent intensity and phase information of an ultrashort light pulse using alternative measurement techniques.

It is another object of the present invention to obtain intensity and phase information of an ultrashort pulse using spectrally resolved nonlinear optical spectroscopy techniques.

Another object of the present invention is to obtain intensity and phase information of a single ultrashort pulse.

Yet another object of the present invention is to obtain an intuitive display that embodies phase and intensity characteristics of ultrashort pulses.

Still another object of the instant invention is to retrieve intensity and phase information of ultrashort pulses of a wide class of pulses having different characteristics.

Another object of the instant invention is to determine intensity and phase information of ultrashort pulses of a wide class of pulses having different characteristics which are combined in a nonlinear optical medium which includes both nearly-instantaneous responses and slower non-instantaneous responses such as a Raman effect, or which includes simply a non-instantaneous effect.

Yet another object of the instant invention is to retrieve intensity and phase information of ultrashort pulses from two different ultrashort pulses by combining the pulses in a nonlinear-optical medium. The simultaneous retrieval of the information of the two pulses allows an ultrashort laser to be used to probe optical characteristics of various media by splitting a single ultrashort pulse into a reference (or gate) pulse and a probe pulse and interacting the probe pulse with the medium and recombining the pulses in a nonlinear optical medium.

Yet another object of the instant invention is to measure the intensity and phase of an ultrashort pulse or pulses using optical heterodyne (or homodyne) methods, in which the signal light is interfered with another pulse or pulses, in order to enhance the signal strength, provide some phase information regarding the signal field, yield a more direct and, hence, rapid pulse-retrieval method, and/or improve signal-to-noise ratio.

Yet another object of the instant invention is to measure the intensity and phase of weak and very weak pulses by measuring the spectrum or spectra of coherent superposition(s) of the weak pulse and a previously characterized pulse. This method yields a direct and rapid pulse-retrieval formula.

Yet another object of the instant invention is to use an artificial neural network to retrieve the pulse intensity and phase in a direct and, hence, rapid manner, rather than using an iterative method.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the present invention may comprise a method and apparatus to directly obtain intensity and phase information of an ultrashort light pulse. An input light pulse is formed into a probe pulse. A gate pulse is provided either from the probe pulse or from a separate beam with a variable delay relative to the probe pulse. The gate pulse and the probe pulse are then combined in a nonlinear medium to form a signal pulse representing the probe pulse characteristics at a time functionally related to the delay of the gate pulse to provide a series of temporal slices of the probe pulse. A spectrometer receives the output pulse to generate an intensity signal as a function of delay and wavelength.

In one embodiment, the gate pulse is delayed with various values to provide a plot of signal intensity vs. wavelength and gate pulse delay. In another embodiment, the gate pulse and probe pulse are propagated through the nonlinear element at an angle to output a signal having a linear range of gate pulse delay times vs. position that directly yields the plot of signal intensity vs. wavelength and gate pulse delay on a single pulse (or which can also be averaged over many pulses) without the need for a delay line.

In another embodiment, the signal pulse is combined coherently with another known or unknown pulse (referred to as a "local oscillator"), and the spectrum of the total light wave is measured vs. delay.

In another embodiment, a potentially very weak pulse is measured by simply interfering the weak pulse itself with a known, i.e., fully characterized, pulse and measuring the spectrum of the total light wave. In this embodiment, it is only necessary to measure the spectrum for two values of relative delay or relative phase of the two pulses; it is not necessary to scan over a range of delays.

In another embodiment, the measured experimental trace from any of the above embodiments is used as input to an artificial neural network for retrieval of the pulse intensity and phase.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 1A–1D schematically illustrate ultrashort pulse characterizing device and geometries according to the present invention;

FIG. 2 graphically depicts the sampled pulse output from the nonlinear medium for the case of the self-diffraction geometry;

FIGS. 3A–3F pictorially show examples of traces of the signal intensity vs. frequency and time delay for three types of input pulses, a negatively chirped, an unchirped, and a positively chirped pulse, the experimental trace (lower row) mirrors the instantaneous frequency vs. time (upper row);

FIGS. 19A–19B illustrate the intensity and phase in the time domain and the frequency domain of the pulse retrieved by a standard FROG method for a 25 fsec FWHM pulse when fused silica (including Ramantenus) is used as the nonlinear-optical medium that generates the trace;

DETAILED DESCRIPTION OF THE PREFERRED EMBODIMENTS

Figure 1A:
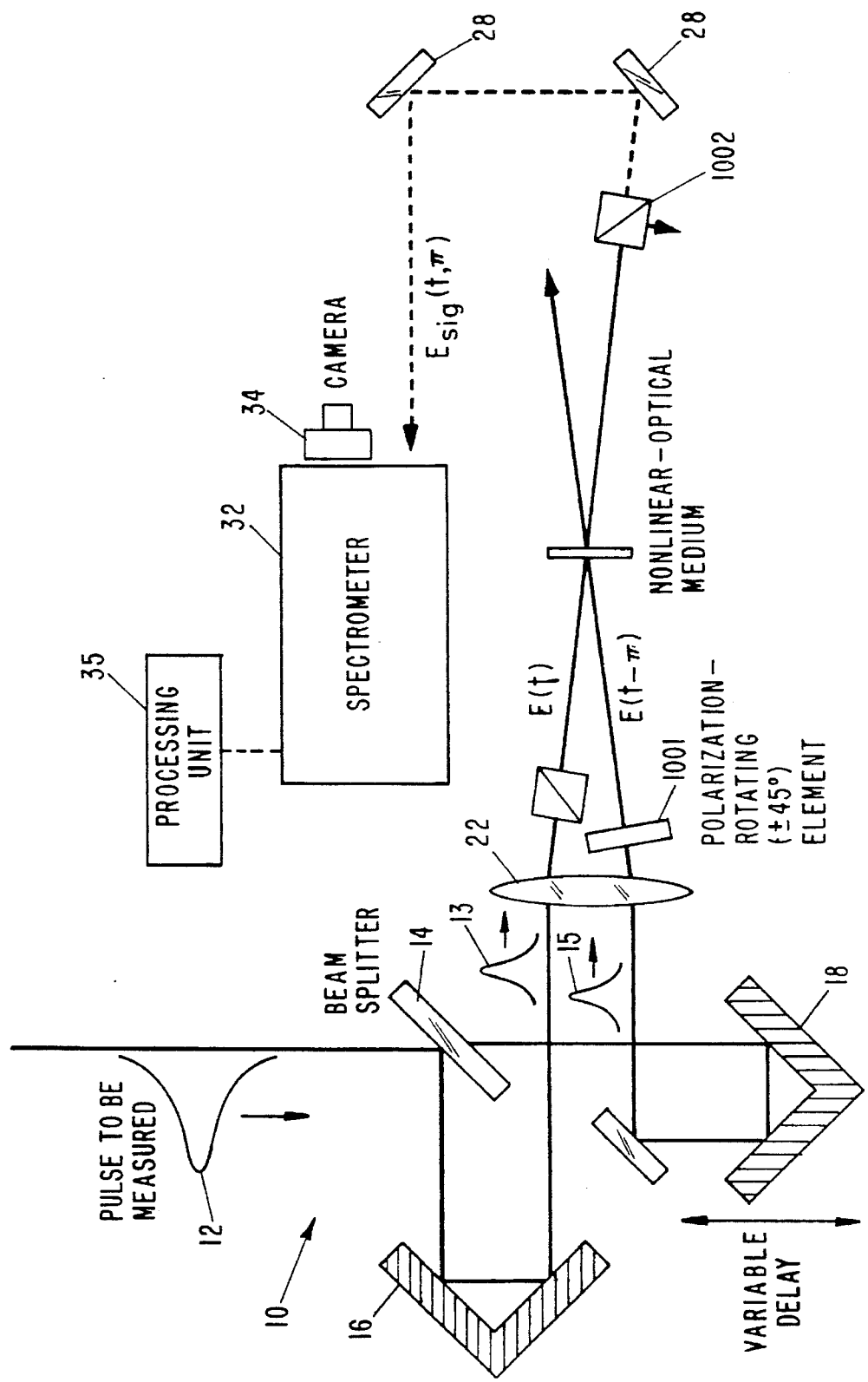

The present invention provides a method, referred to herein as a frequency-resolved optical grating (FROG), to determine the intensity and phase of an ultrashort light pulse. FROG acts to provide an output signal or display related to the spectrogram of the pulse. FROG then uses phase retrieval techniques to obtain the intensity, $I(t)$, and phase, $\phi(t)$, of the pulse. Two pulses are combined in a nonlinear optical medium: one variably delayed pulse acts as a gate pulse and the pulse to be measured is the probe pulse which is gated by the gate pulse in the nonlinear optical medium. The resulting signal-pulse electric fields for a polarization-gate optical Kerr effect second-harmonic generation, or self-diffraction (also cascaded parametric interaction) embodiment are given by $$E_{sig}(t,\tau) \propto E(t)|E(t-\tau)|^2; \text{ or} \qquad (0)$$
$$\propto E(t)E(t-\tau); \text{ or}$$
$$\propto E(t)^2 E^*(t-\tau); \text{ or}$$

other nonlinear optical responses, in which t is the time, $\tau$ is the delay and $E(t)$ is the electric field of the pulse (i.e., the intensity and phase of the pulse).

The output signal spectrum is then measured, and is a function of the delay between the two input pulses, i.e., the spectra of a series of temporal slices of the probe pulse. The measured signal, $I_{FROG}$, is a function of frequency, $\omega$, and delay, $\tau$:

$$I_{FROG}(\omega,\tau) \propto |\int E_{sig}(t,\tau)\exp(-i\omega t)dt|^2. \qquad (1)$$

The full pulse field is essentially uniquely determined by the FROG output, even for pathological pulse shapes and/or phases, as shown by rewriting Eq. (1) as a two-dimensional phase retrieval problem:

$$I_{FROG}(\omega,\tau) \propto |\int\int E_{sig}(t,\Omega)\exp(-i\omega t - i\Omega\tau)dt d\Omega|^2. \qquad (2)$$

where $E_{sig}(t,\Omega)$ is the one-dimensional Fourier transform of $E_{sig}(t,\tau)$ with regard to the delay variable, $\tau$. Eq. (2) is the mathematical statement of the two-dimensional phase-retrieval problem. It is known to have an essentially unique solution, provided that $E_{sig}(t,\Omega)$ is nonzero over a finite region of t-$\Omega$-space, which is the case here. Thus, unique solutions for $E_{sig}(\tau,\Omega)$ exist in essentially all cases. In addition, it is straightforward to obtain $E(t)$ from $E_{sig}(t,\tau)$:

$$E(t) \propto \epsilon \int E_{sig}(t,\tau)d\tau, \qquad (3)$$

where $\epsilon$ is inversely proportional to the pulse energy per unit area, a constant. Slightly different expressions result for $E(t)$ for different nonlinear effects or geometries.

While a variety of ways exist to find $E_{sig}(\Omega,\tau)$ from $I_{FROG}(\omega,\tau)$, a phase-retrieval technique is the preferred method. Such a method requires a constraint of some nature. In principle, the finite extent of $E_{sig}(t,\Omega)$ in the t-$\Omega$-space could be used, in analogy with phase-retrieval work. Here, however, the nonlinear-optical form of the signal field $E_{sig}(t,\tau)$ (i.e. Eq. (0)) provides an excellent constraint on the solution. Thus, an estimate for $E_{sig}(t,\tau)$ gives an estimate for $E(t)$ using Eq. (3) or another method, which can then be used to give a new estimate for $E_{sig}(t,\tau)$ using Eq. (0).

In a preferred form of solution, a simple iterative one dimensional Fourier-transform method is used and involves Fourier transforming back and forth between $E_{sig}(t,\tau)$ and $E_{sig}(\omega,\tau)$. In the $\omega$-domain, the magnitude of Equation $E_{sig}(\omega,\tau)$ is replaced with the square root of $I_{FROG}(\omega,\tau)$. The above constraint on the form of the signal field is used in the t-domain, generating the (k+1)st iteration for $E_{sig}(t,\tau)$ by first setting:

$$E(t)^{(k+1)} = \int E_{sig}^{(k)}(t,\tau)d\tau \qquad (4)$$

Using Eq (0), $E_{sig}(t,\tau) \propto E(t)|E(t-\tau)|^2$, in the case of the polarization-gate (PG) geometry, the (k+1)st iteration for $E_{sig}(t,\tau)$ is constructed:

$$E_{sig}^{(k+1)}(t,\tau) = E^{(k+1)}(t)|E^{(k+1)}(t-\tau)|^2. \qquad (5)$$

The application of the iterative method shown in Eqs. (4) and (5) requires an initial "guess" for $E(t)$. The preferred initial guess $E^{(0)}(t)$ for most cases has been found to be noise unless a very accurate guess is available from additional prior information. Occasionally, however, a Gaussian-intensity flat-phase pulse yields better convergence. The initial guess is input to Eq. (5) to derive an $E^{(0)}_{sig}{}^{(0)}(t,\tau)$. A one dimensional Fourier transform is then performed to provide $E^{(0)}_{sig}(\omega,\tau)$. The magnitude of $E_{sig}^{(0)}(t,\tau)$ is then replaced with the square root of the detected signal $I_{FROG}(\omega,\tau)$ and the resulting $E'^{(0)}_{sig}(\omega,\tau)$ is inverse transformed to provide $E'^{(0)}_{sig}(t,\tau)$ for input to Eq. (4) to form $E^{(1)}(t)$. The iterations continue until the results converge.

An alternative initial guess can be produced in the following manner. The approximate pulse time vs. frequency, $t(\omega)$, is given by:

$$t(\omega) \propto \int I_{FROG}(\omega,\tau)\tau d\tau \qquad (6)$$

Integration of $t(\omega)$ yields the approximate pulse phase vs. frequency, $\phi(\tau)$. The pulse spectrum, $I(\omega)$, is also naturally obtained by FROG, either precisely by a separate and simultaneous measurement or approximately by integrating $I_{FROG}(\omega,\tau)$ with respect to $\tau$ and deconvolving out the intensity autocorrelation. These results yield the approximate full amplitude and phase of the pulse field in the frequency domain, $E(\omega)$. Fourier transformation then yields an approximate result for $E(t)$. Generally, however, noise provides an initial guess that rapidly converges to a pulse shape using Eq. (5) and a more precise guess is not necessary.

The technique according to the present invention is particularly adapted to single shot measurements rather than the "average" measurements required in the prior art. It will be understood, however, that multi-shot pulse trains can be analyzed according to the method and apparatus described herein. In the case of a multi-shot pulse train, the derived intensity and phase information is the average intensity and phase of the pulse train and not the intensity and phase of any single pulse.

As used herein, the term "ultrashort" refers to pulse durations shorter than a few tens of picoseconds. These are the pulses of interest to measure and are well within the regime of pulses that can be analyzed from the FROG data. Long pulses can also be analyzed according to the present invention, provided that sufficient temporal delays and spectral resolution are available. Delays greater than nanoseconds may be produced electronically and high spectral resolution may be obtained using interferometers. No fundamental limit exists. It should be noted that there is also no fundamental limit to the wavelength of the pulse to be measured. Limiting factors are the detectors and spectrometers and not the FROG technique. Thus, the above technique may be used, for example, in the vacuum UV and x-ray regions of the spectrum when suitable detectors and nonlinear materials become available.

As noted, the preferred form of light pulse is a laser light pulse since laser light is generally coherent. In principle, any light pulse can be measured using FROG. Practically speaking, however, any ultrashort light pulse with enough intensity to be measured via FROG will be produced in some way by a laser. Further, any lack of spatial coherence may degrade the quality of the measurement. The desired material should have a response that is faster than the duration of the pulse, although a response on the order of the pulse duration can be accommodated.

A preferred nonlinearity is associated with $X^{(3)}$ since it provides a more intuitive trace and yields more robust pulse retrieval. Any other odd order of X will provide the same information, but with weaker signals. Even X's will not provide information on the direction of time, but since $X^{(2)}$ offers greater signal efficiency, it is often useful.

Figure 1B:
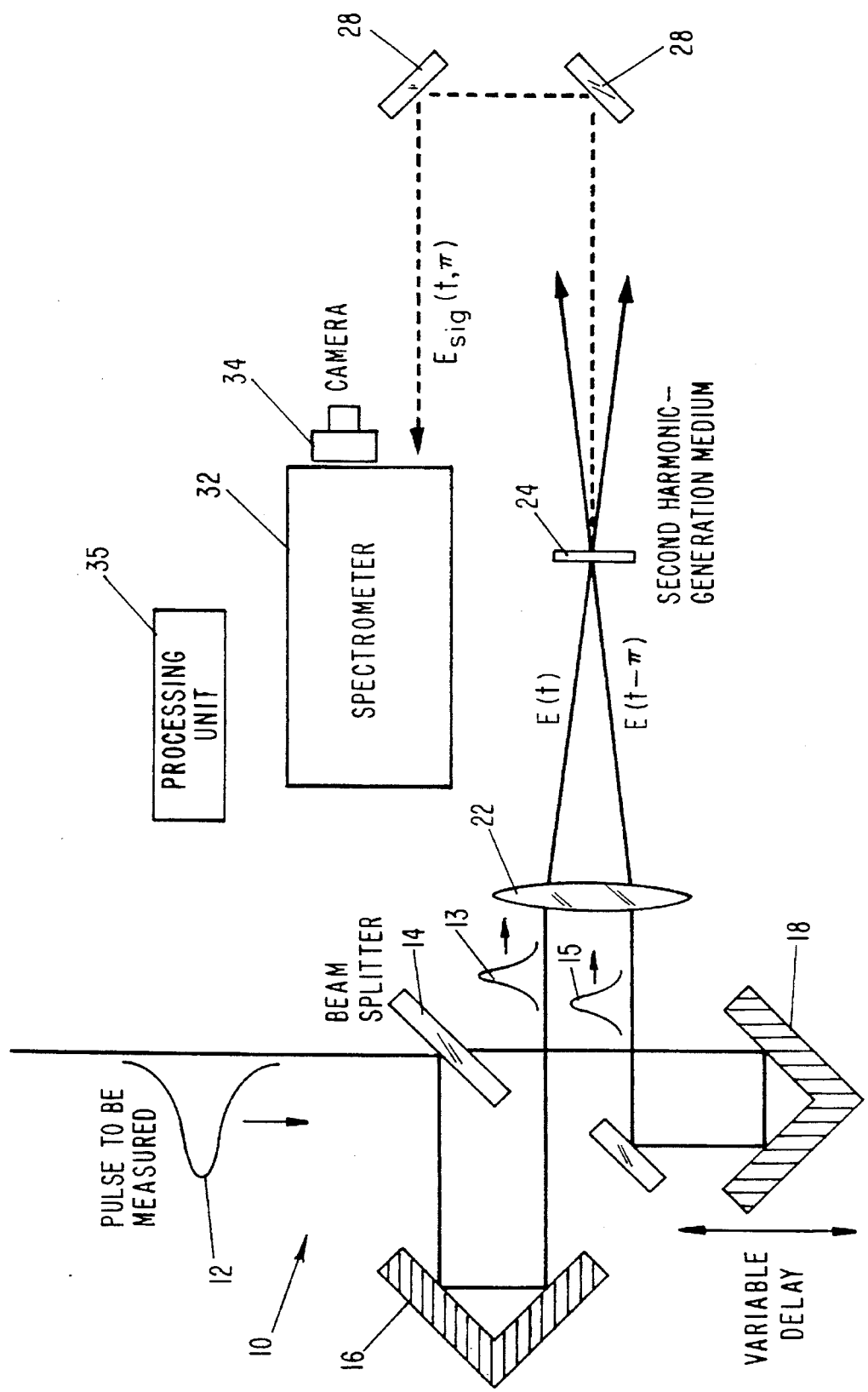

Three different FROG apparatus 10 geometries are shown in FIGS. 1A–1C and illustrate three of many geometries useful for FROG. In all three geometries, an ultrashort light pulse 12 is input to beam splitter 14 to form probe pulse 13 and gate pulse 15. Probe pulse 13 is directed by optical alignment system 16 through lens 22 into rapidly responding nonlinear medium 24. Gate pulse 15 is provided with a variable delay τ by delay 18. The probe pulse and the gate pulse are focused into nonlinear medium 24 through lens 22. Thus, beams having electric fields E(t) and E(t−τ) intersect in nonlinear medium 24.

The interaction of two laser beams in a nonlinear medium can occur via many processes, and many are treated in, e.g., H. J. Eichler et al., *Laser-Induced Dynamic Gratings*, Springer-Verlag, New York (1988), the contents of which are incorporated herein by reference. One such geometry is the polarization-gate geometry, shown in FIG. 1A. In this geometry, the gate pulse 15, which is polarized at ±45° with respect to the probe pulse by polarization element 1001, excites the medium, causing a slight birefringence in the medium, through, for example, the electronic-Kerr effect. If the effect is rapid compared to the length of the gate pulse 15 (the response of the electronic-Kerr effect and other nonresonant effects is sub-femtosecond and, as a result, is generally referred to as "instantaneous"), the slight birefringence will be present only for the time the gate pulse is present Because the gate pulse 15 is polarized at ±45° the principal axes of the birefringence will be at ±45°, also. As a result, the medium will, for the time the gate pulse 15 is present, act like a wave plate for the 0° or 90° polarized probe pulse 13. This will cause that slice of the probe pulse 13 present during this time to be polarization-rotated, and hence leaked through the polarization analyzer 1002 disposed after the medium. The effect is that the gate pulse 15 has gated a slice of the probe pulse 13, and the particular slice is determined by the delay between the two pulses. In this case, the leaked field, considered as the signal field, will be given by the first expression in Eq. (0).

Alternatively, the geometry shown in FIG. 1B, utilizing second-harmonic generation as the nonlinear-optical effect, may be used. In this case, the two pulses 13 and 15 enter the second-harmonic-generation (SHG) medium 24, which is phase-matched for noncollinear SHG, so that neither pulse alone achieves much SHG, but the two pulses together achieve measurable SHG. In this case, the signal field is given by the second expression in Eq. (0). Here again the gate pulse 15 can be seen as gating the probe pulse 13, i.e., gating out a temporal slice of the probe pulse 13. Of course, in this case, the roles of the pulses may be reversed; it does not matter which pulse is considered as gating which.

As a third alternative, consider the geometry shown in FIG. 1C. Here, the two pulses combine to produce an induced grating, which diffracts each beam off to the side. Both beams are shown, but it is only necessary to collect one of them. The expression for the signal field is given as the third expression in Eq. (0). Clearly, each beam can be seen as gating the other. In addition, the interaction of the beams can also be considered to produce an "induced-grating" gate in the medium so that an incident probe beam, E(t), can be diffracted by the induced grating gate E(t)×E*(t−τ), during the period of beam coincidence. Again, a temporal slice of the probe beam is selected by the gate as graphically shown in FIG. 2. For not-too-pathological pulse shapes, the induced-grating gate will be centered at and have maximum strength at about the time (τ/2), i.e., the midpoint between pulse peaks. The probe pulse will typically have an intensity gradient at this time, however, so the component of the probe pulse contributing the most intensity to the diffracted pulse will be at ≈τ/3 (an exact result for Gaussian-intensity pulses). The instantaneous frequency of the probe pulse is selected at that time, as a result.

Referring again to FIGS. 1A–1C, in accordance with these three devices for accomplishing the present invention, the signal pulse is directed by output optics 28 to a wavelength-selective device 32, e.g., a spectrometer, to resolve the frequency components in the selected temporal slice of probe pulse 13. Camera 34 records the spectrum as a function of time delay of probe pulse 13 to produce an intensity plot vs. frequency and delay hereafter referred to as the "FROG trace." FIGS. 3A–3F graphically illustrate the FROG traces for various types of femtosecond pulse 12. FIG. 3A depicts a negatively chirped pulse, i.e., a pulse with decreasing frequency with time; FIG. 3C depicts an unchirped pulse, i.e., a constant frequency pulse; and FIG. 3E depicts a positively chirped pulse, i.e., a pulse with increasing frequency with time. FIGS. 3B, 3D, and 3F are the corresponding camera 34 records of intensity as a function of frequency and delay and illustrate that the present technique uniquely determines the phase characteristics of the femtosecond pulse. As hereinafter shown, these plots further contain all of the information necessary to reconstruct the intensity and phase characteristics of the incident pulse.

The recorded FROG trace is provided to a processing unit 35 to carry out the above described basic FROG retrieval method. Such a calculation unit may be a digital computer operating in accordance with a stored program or a neural net which is trained to recognize the output in accordance with the principles of the invention. One example of a processing unit 35 is depicted in FIG. 1D. The processing (or calculation) unit 35 depicted in FIG. 1D includes an initial prediction supplying unit 351, a memory 352 for holding the FROG trace data, a fast Fourier transform unit 353, a replacement unit 345, and inverse fast Fourier transform unit 355, a unit 358 that incorporates the nonlinear-optical constraint, a convergence testing unit 356, and an output device 357.

The FROG trace data generated by the above described apparatus is supplied to the processing unit 35 and stored in the memory 352. An initial prediction or "guess" for the complex electric field E(t) is provided by the initial prediction supplying unit 351. The guess of E(t) is used to generate a signal field $E_{sig}(t,\tau)$ using the appropriate result from Eq. (0). The $E_{sig}(t,\tau)$ is Fourier transformed by the fast Fourier transform unit 353 to produce a Fourier transformed signal field $E_{sig}(\omega,\tau)$. The Fourier transformed signal field $E_{sig}(\omega,\tau)$ is supplied to the replacement unit 354. The replacement unit uses the magnitude of the experimentally measured FROG trace, i.e. the data held in memory 352, and replaces the magnitude of the signal field $E_{sig}(\omega,\tau)$ with the magnitude of the experimentally measured FROG trace to produce a new signal field $E'_{sig}(\omega,\tau)$. The phase of the signal field $E_{sig}(\omega,\tau)$ is left unchanged in the new signal field $E'_{sig}(\omega,\tau)$.

The new signal field $E'_{sig}(\omega,\tau)$ is supplied to the inverse fast Fourier transform unit 355 which produces an inverse Fourier transformed signal field $E'_{sig}(t,\tau)$. The nonlinear-optical-constraint unit uses one of a variety of methods to force $E'_{sig}(t,\tau)$ to be consistent or approximately consistent with the nonlinear-optical constraint, given by Eq. (0). The signal field then provides a next guess for E'(t) using Eq. (3) or another method. This new signal field, $E''_{sig}(t,\tau)$, is then fast-founer-transformed to $E_{sig}(\omega,\tau)$. This time, and all subsequent times, the squared magnitude of $E''_{sig}(\omega,\tau)$ is supplied to the convergence testing unit 356. The convergence testing unit determines whether the processing unit has converged to a correct result by examining whether the new signal field $E''_{sig}(\omega,\tau)$ has the same (or within an acceptable range) squared magnitude as the experimentally measured FROG trace. If there is not convergence, the convergence testing unit supplies new signal field $E''_{sig}(\omega,\tau)$ to the replacement unit 354 to repeat the process. Once the convergence testing unit determines that the retrieval process has converged, this signal field is provided to the output device 357, which may include a screen, printer or further processing equipment to evaluate the resultant signal field.

In order to assess the progress of convergence of the algorithm, a measure describing how closely the procedure has converged, i.e., how close the current guess for E(t) is to the field that generated the FROG trace data must be used. In practice this quantity cannot be measured directly, since the original field is unknown.

Due to the uniqueness of two-dimensional phase retrieval, there is a one-to-one correspondence between all possible fields and their FROG traces. This means that if two FROG traces are identical using the device described herein, then the fields that generated them are identical; whereas if the FROG traces differ, then the fields also must differ. Thus, a meaningful measure of convergence is the difference between the experimental FROG trace $I_{FROG}(\omega\tau)$ and the FROG trace generated by the current guess for E(t). This difference serves as an error that measures how closely the FROG trace has retrieved the correct field.

The difference between the two FROG traces can be quantified by the error $$G = \left( \frac{1}{N^2} \sum_{\omega,\tau=1}^{N} [I_{FROG}(\omega,\tau) - |E_{sig}(\omega,\tau)|^2]^2 \right)^{1/2} \quad (7)$$

which is the root mean square error of the difference between the experimentally generated FROG trace $I_{FROG}$ and the square magnitude of the signal field generated by the current guess for E(t). Before the error is calculated, both are normalized to a peak intensity of unity. Here $\omega$ and $\tau$ index the elements of the two-dimensional arrays used to hold $I_{FROG}$ and $E_{sig}$, and take on integer values.

In order to determine how sensitive G is to variations in the pulse, the value of G for various pairs of fields that are similar to each other, but differ in some small way was calculated. The calculations were done on fields sampled at 64 points, leading to a 64×64 pixel FROG trace. For this set of examples, a pulse electric field that is given by the sum of two Gaussian pulses, $$E(t)=E_1(t)+E_2(t), \quad (8)$$

was used where $$E_1(t)=exp\{-2\epsilon(2)\ (t/t_p)^2+i[At^2+Q|E_1(t)|^2]\} \quad (9)$$

$$E_2(t)=B\ exp\{-2ln(2)[(t-d)/T_p]^2+i[A(t-D)^2+D|E_2(t)|^2]\} \quad (10)$$

where $t_p$ is the intensity full-width at half-maximum (FWHM) of the pulse, A and Q describe the amount of linear chirp and self-phase modulation respectively, and B is the amplitude and D is the separation of the second pulse in the double pulse case. Table 1 shows the results.

TABLE 1

| Field 1 | Field 2 | G |
| --- | --- | --- |
| Single pulse (B = 0) | | |
| $t_p$ = 8, A = Q = 0 | $t_p$ = 8, A = 0, Q = 1 | 0.0185 |
| $t_p$ = 8, A = Q = 0 | $t_p$ = 8, A = 0, Q = 2 | 0.0414 |
| $t_p$ = 8, A = Q = 0 | $t_p$ = 8, A = 0.01, Q = 0 | 0.00988 |
| $t_p$ = 8, A = Q = 0 | $t_p$ = 8, A = 0.02, Q = 0 | 0.0196 |
| $t_p$ = 8, A = Q = 0 | $t_p$ = 7, A = 0, Q = 0 | 0.0121 |
| Double pulses ($t_p$ = 6, A = Q = 0) | | |
| B = 1, D = 12 | B = 0.99, D = 12 | 0.000318 |
| B = 1, D = 12 | B = 0.9, D = 12 | 0.00352 |
| B = 1, D = 12 | B = 1, D = 11 | 0.0139 |

From this table it can be seen that phase differences of even much less than one radian across the FWHM of the pulse result in errors on the order of G=0.01. In general, a value of G=0.0001 or less indicates quite good convergence.

Figure 4A:
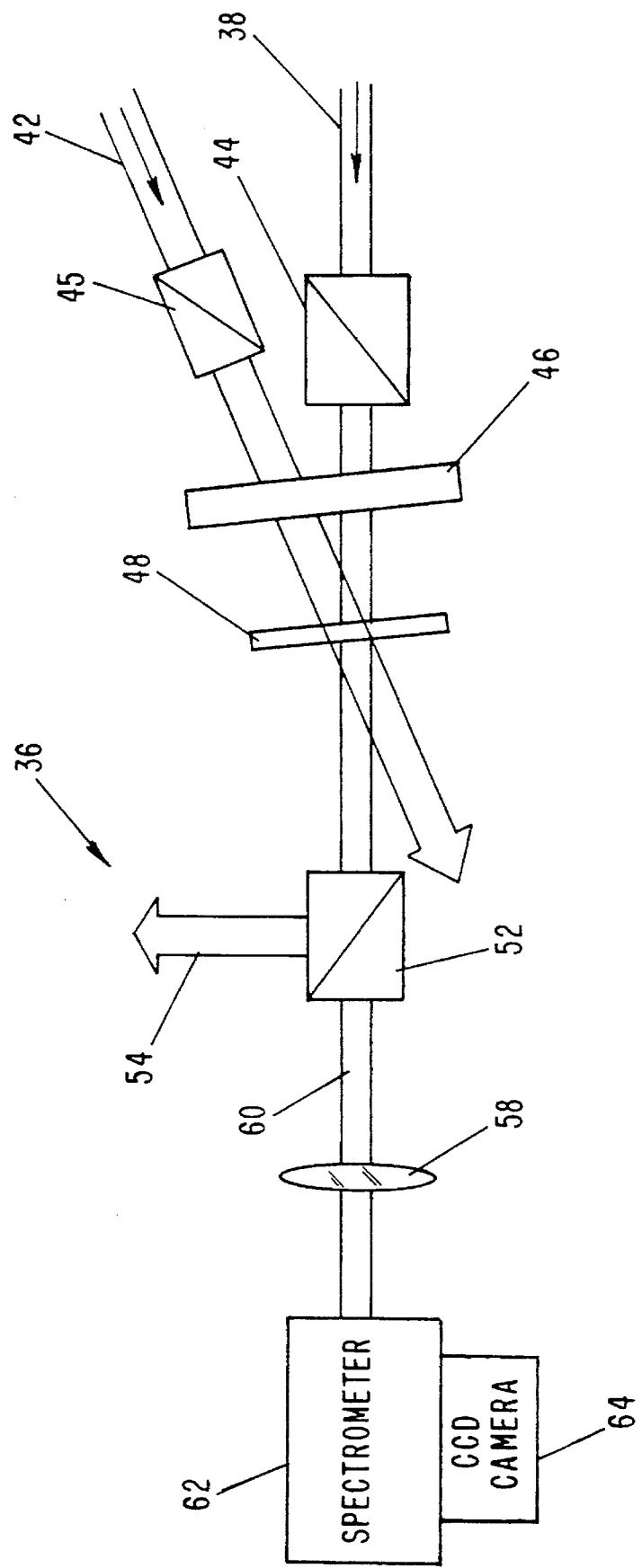
FIGS. 4A–4B schematically illustrates an ultrashort light pulse characterizing device according to a second embodiment of the present invention that can characterize a single pulse.

A FROG device useful for single pulse analysis is shown in FIG. 4A as FROG apparatus 36. An incoming pulse is provided as probe light pulse 38 and gate light pulse 42, where probe light pulse 38 is an ultrashort light pulse whose pulse characteristics are to be determined. Gate pulse 42 may be formed from the same light pulse as pulse 38 or may originate from an independent source. Gate pulse 42 is polarized to 45° by polarizer 45 and probe pulse 38 is vertically polarized by polarizer 44. If gate pulse 42 is nominally polarized (more than about 90%), the polarization may be rotated 45° by changing the direction of the pulse by 90° after an initial change of direction, up or down, out of the plane.

Polarized gate pulse 42 and probe pulse 38, which are propagating at an angle to one another, are overlapped into nonlinear optical medium 48. The effect of overlapping the pulses at an angle is to map a range of time delays between the two beams onto spatial coordinates within medium 46 to provide spatial resolution over the range of time delays. In other words, as shown in FIG. 4A, the intersection of probe pulse 38 and gate pulse 42 in nonlinear medium 48 provides a portion where gate pulse 42 leads probe pulse 38 (the upper region as shown) and a portion where probe pulse 38 leads gate pulse 42 (the lower region as shown). In this device, a cylindrical lens of focal length 10 cm focuses the two ≈1-cm diameter beams to increase the intensity of the pulses at nonlinear medium 48 and increase the resulting signal 60 intensity. The two beams cross at an angle of about 20° yielding a range of delays of about 1.2 psec.

Signal light output from nonlinear medium 48 is input to polarizer 54, which rejects any component of the vertically polarized probe pulse 38 and passes the signal pulse 60, which has horizontal polarization. Signal pulse 60 is then focused through imaging lens 58 into the input slit of imaging spectrometer 62. Spectrometer 62 forms an output intensity distribution vs. wavelength and time delay for recordation by CCD camera 64. It will be appreciated that crossing the beams at a large angle enables the characteristics of a single pulse to be determined since a range of delay times is inherent in the intersection of the beams. A cylindrical lens may be used to increase signal intensity if needed. A processing unit (not shown) would also be used.

Figure 4B:
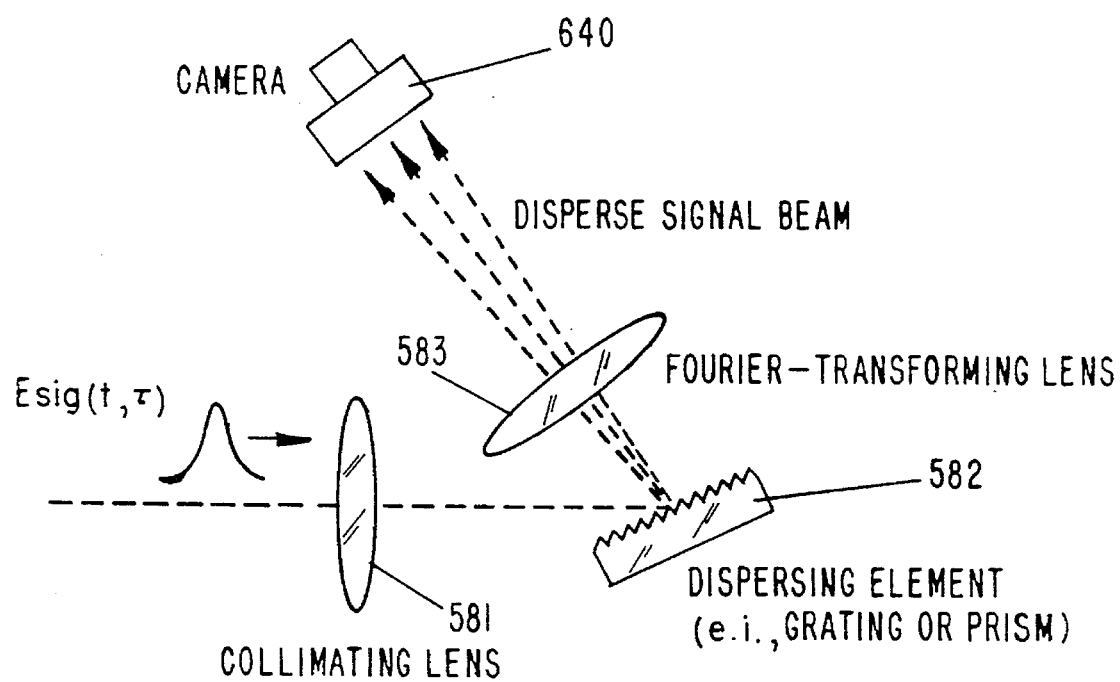

FIG. 4B gives an alternative, simpler arrangement for the required components that occur after nonlinear medium. A collimating lens 581 collimates the beam if it has been focused into the nonlinear medium. A grating 582 disperses the signal pulse, and a Fourier-transforming lens 583 focuses the signal beam onto a camera 64. In this way, an expensive spectrometer (equivalent to this arrangement) is not necessary. This arrangement is simpler because it does not involve off-axis lenses or curved mirrors, which are used in commercial spectrometers.

Figure 5A:
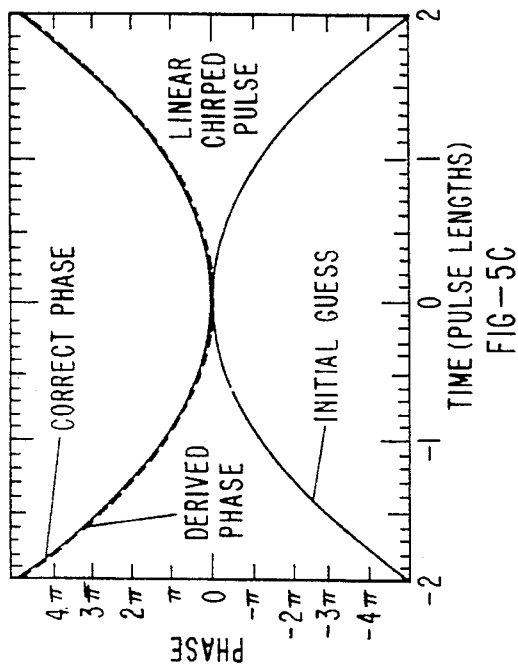
FIGS. 5A–5D graphically depict theoretical derivations of pulse shape information using theoretical output according to the present invention.
Figure 5C:
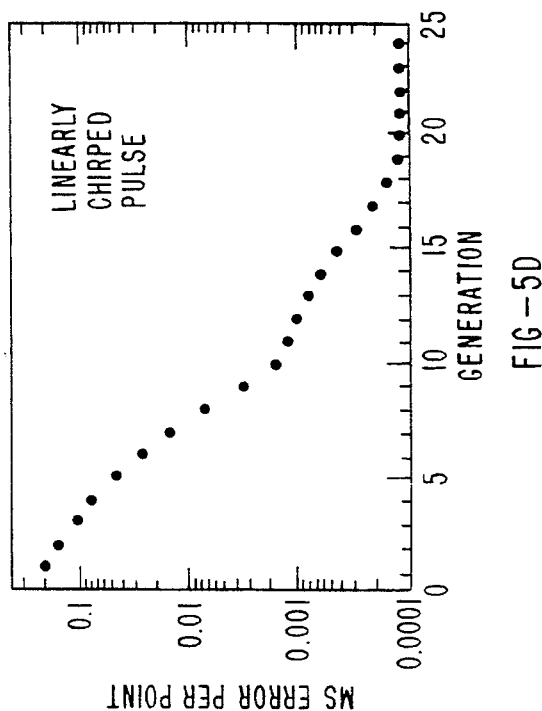
Figure 5B:
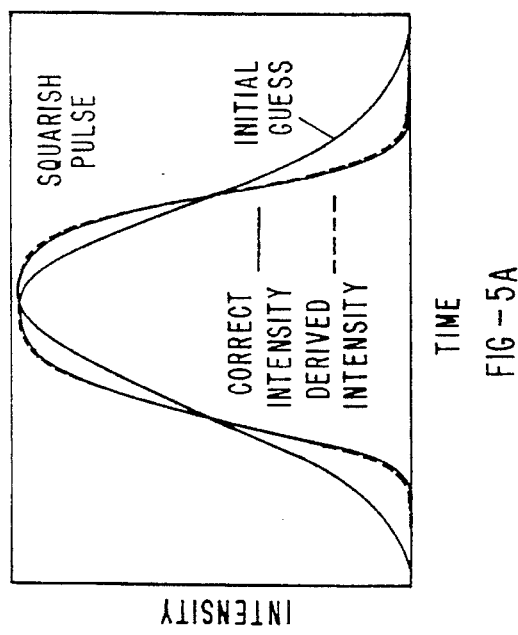
Figure 5D:
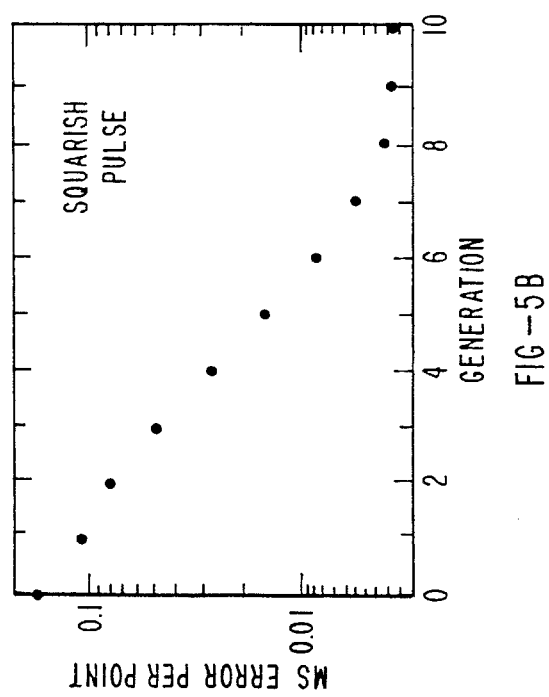

FIGS. 5A through 5D graphically illustrate the capability of the apparatus 36 shown in FIGS. 4A and 4B and the basic FROG method of Eqs. (1)–(6) to determine the characteristics of an ultrashort light pulse. FIGS. 5A–5D show theoretical results using the above method for two commonly encountered ultrashort pulses, (1) a nearly square pulse intensity with linear chirp (FIGS. 5A and 5B) and (2) a Gaussian intensity with positive linear chirp (FIGS. 5C and 5D). FIG. 5A illustrates an initial guess for a pulse shape involving the correct phase but a Gaussian intensity and the iterative evolution to a pulse shape that is very nearly the correct pulse shape. FIG. 5B illustrates the relatively rapid convergence of the retrieval method. FIG. 5C illustrates an initial guess involving the correct intensity, but with a very bad estimate of the phase, i.e., the correct magnitude but opposite sign. Again, as shown in FIG. 5D, the retrieval method converged to the correct phase in relatively few iterations.

Figure 6A:
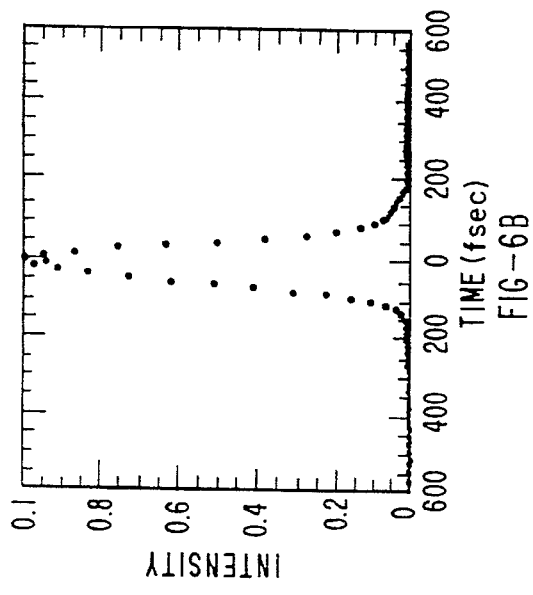
FIGS. 6A–6D graphically depict an actual FROG output and derived pulse shape and phase information using noise as an initial guess.
Figure 6B:
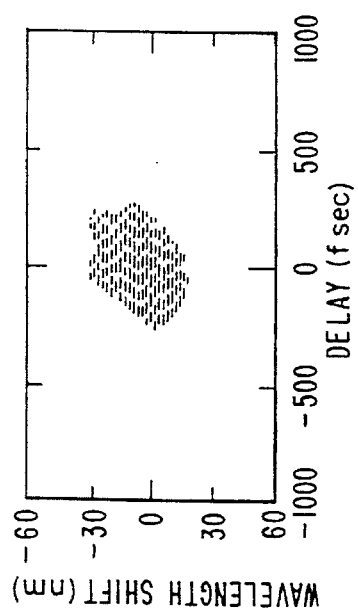
Figure 6C:
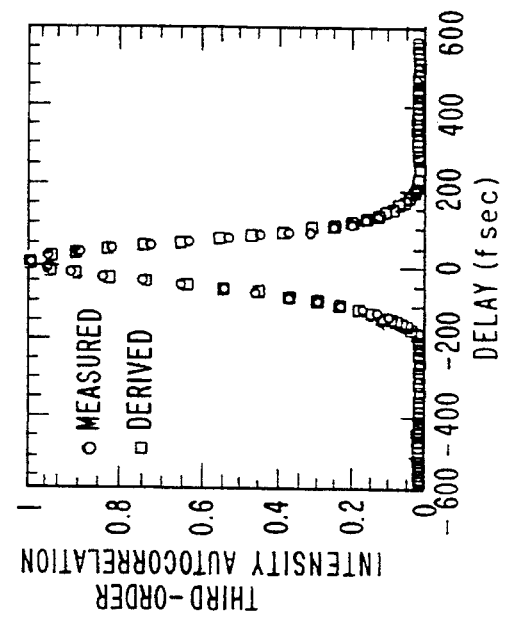
Figure 6D:
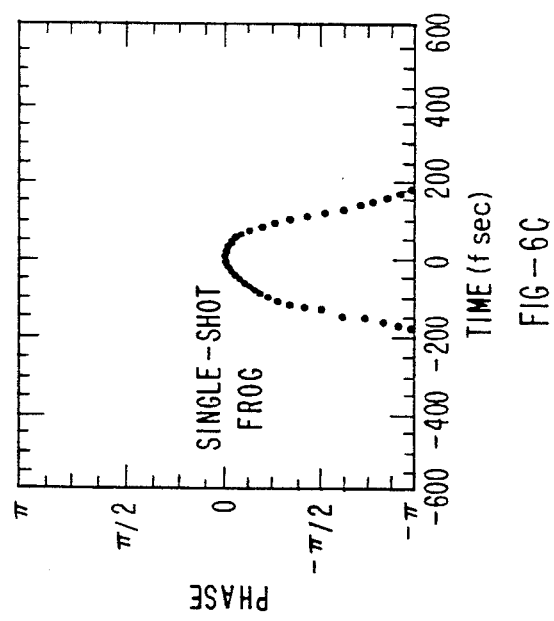

A FROG output for an experimentally measured single positively chirped pulse about 100-fsec in duration is shown in FIG. 6A. The positive chirp is clearly seen. FIGS. 6B and 6C illustrate the pulse characteristics I(t) and φ(t). Use of the basic FROG method on FIG. 6A data points extracts the pulse shape I(t) shown in FIG. 6B with a pulse Width of about 110-fsec (FWHM). Noise was used as the initial guess for the pulse and convergence occurred in 50 iterations. The derived phase evolution φ(t) is shown in FIG. 6C. The inverted parabolic shape indicates positive chirp, that is, linearly increasing frequency vs. time, as also indicated by FIG. 6A. As a check of the FROG output, the pulse third-order intensity autocorrelation was computed and compared with the simultaneously obtained experimental third-order intensity autocorrelation obtained by integrating the FROG output over frequency for a given value of the delay. A good agreement between the computed and measured values is apparent from FIG. 6D.

Thus, a basic FROG method and various apparatus for determining the intensity and phase of femtosecond pulses using frequency resolved optical gating has been described herein according to a first embodiment. The FROG technique is relatively simple to implement, has zero or negligible phase-mismatch in polarization gate and self-diffraction geometries, and is very broadband. Also, the technique is well-suited to the UV spectral range of femtosecond pulses since diffraction efficiencies are relatively high in that wavelength range.

The above described basic FROG method of the first embodiment is fairly robust and powerful. It suffices in recovering the amplitude and phase of many different pulses. However, there is one class of pulses which have proven extremely difficult for the basic FROG method. This class is typified by a so called "double pulse," a waveform with two distinct peaks of roughly equal intensities. The basic FROG method of the first embodiment has not proven satisfactory in recovering the double pulse from its FROG trace data. In addition, other pulses with complex intensity profiles—for example, sequences of independent pulses—have also defeated this retrieval method. These types of pulses are becoming increasingly important in experiments, especially in pulse shaping applications.

In accordance with a second embodiment of the instant invention additional retrieval techniques are used which achieve convergence for a much larger class of pulses, including the troublesome double pulse, as well as pulses with more complicated intensity and phase profiles. This embodiment is based on the use of an intensity constraint, an overcorrection method, and a multidimensional minimization technique in conjunction with the above described basic FROG technique of the first embodiment. The intensity constraint of the second embodiment employs a technique that allows the determination of the gate function used to make the FROG trace, which is identical to the pulse intensity profile. The overcorrection technique overcorrects the guess for the complex signal field where it deviates from the actual FROG trace. Finally, the multidimensional minimization scheme treats sample points in the electric field envelope of the pulse as independent variables, and tries to minimize an error function by adjusting these values. The overcorrection speeds convergence of otherwise slowly converging pulses, while the intensity constraint improves upon the results of the basic FROG method and generates a pulse that is close enough to the correct answer for the minimization routine to converge.

In accordance with the second embodiment, a composite methodology, which combines all of the above techniques in an intelligent and self-regulating way is used. The composite method monitors its own progress, and combines the above techniques in a way that is heuristically found to be effective.

The above approach was tested using a certain class of pulses which is physically relevant and representative of pulses one may expect to encounter in real experiments. The test pulses were constructed as the coherent sum of up to four Gaussian intensity profile pulses of varying heights and widths. Each pulse could be assigned an arbitrary amount of linear chirp or self-phase modulation. Test pulses with discrete phase jumps, cubic phase distortion, and other more complicated phase profiles were also used. Using the combined approached described herein, all of the test pulses could be retrieved from the FROG trace.

Figure 7:
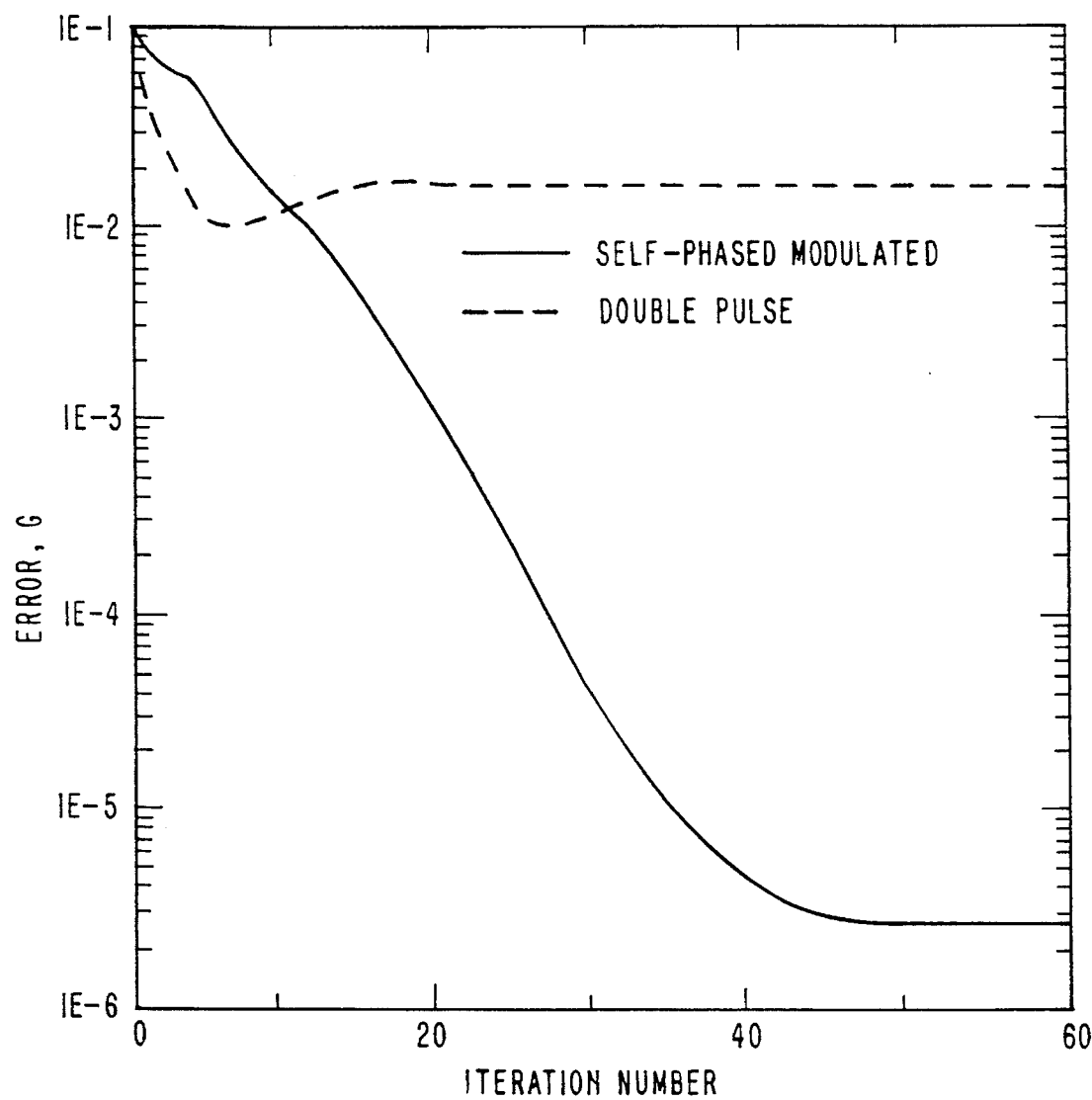
FIG. 7 depicts an error as a function of iteration number for two different types of pulses using the basic FROG method of a first embodiment of the instant invention.

FIG. 7 shows the performance of the basic FROG method on two initial pulses, one a pulse with self-phase modulation, and the other a double-peaked pulse in which the peaks are of equal intensity, and separated by twice their intensity FWHM. As shown in FIG. 7, although the basic FROG method very easily converges to the self-phase modulated pulse, it does not converge to the double pulse. Instead, the error remains at a very high value, and the method stagnates, i.e., the current guess for E(t) ceases to change, despite the high error value.

The cause of the failure of the basic FROG retrieval method in the double pulse case is not easily discernible. Even when an initial guess for E(t) of the double pulse is exactly correct, except that the intensity of the one of the peaks is reduced by 1%, the basic FROG method will diverge, and move to a stagnating solution with a higher error G than it began with. The cause of this problem seems to be associated with the common problem of striping in the usual phase-retrieval problem and described in J. R. Fienup and C. C. Wackerman, J. Opt. Soc. Amer. A vol 3, pp. 1897–1907 (1986), the contents of which are incorporated herein incorporated by reference. In the cases where the basic FROG stagnates while attempting to retrieve a double pulse, the presence of anomalous stripes in the reconstructed FROG trace can be detected. In normal phase retrieval, striping in the image domain is associated with stagnation of the iterative method at high error values. The striping problem has been a particularly vexing one (for both FROG and standard phase retrieval), and the solutions used by the phase-retrieval community are either inapplicable or ineffective when applied in the FROG retrieval methods.

The device of the second embodiment is employed in such a manner as to overcome the above problems with the basic FROG method of the first embodiments. The second embodiment can be implemented using the apparatus described above in connection with the first embodiments and shown in FIGS. 1A–1D and 4A–4B. The principle difference is the pulse retrieval method as more fully described below. The failure of the basic FROG retrieval method to converge to the double pulse is apparently due to underconstraint—the constraints that have been used (i.e., the particular implementations of the experimental FROG trace and the equations associated with the nonlinear optical medium used) are insufficient to force convergence to the correct field. Therefore additional constraints (based on the experimental FROG trace and the equations associated with the nonlinear-optical medium used) may be used to improve the performance of the system.

The first additional constraint found to be effective is an intensity constraint. While below the use of the intensity constraint is illustrated in a PG FROG apparatus, other geometries can easily be adapted to its use. The intensity constraint is formed by using additional information from the signal field, in this case the form of the gate (which is the intensity envelope of the pulse in PG FROG). The use of this additional constraint allows the system to approach much closer to the correct solution in cases where the basic FROG does not converge.

In order to generate the gate function from the signal field, we note that a generic form of a FROG signal field can be written as $$E_{sig}(\omega,\tau) = \int_{-\infty}^{\infty} dt F(t) G(t-\tau) \exp(i\omega t) \quad (11)$$

where F(t) is the field and G(t) is the gate. To extract the gate function, we integrate with respect to $\omega$ to yield $$\int_{-\infty}^{\infty} d\omega\, E_{sig}(\omega,\tau) = F(0) G(-\tau). \quad (12)$$

The integration of the signal field in the $\omega,\tau$ domain thus yields a time-reversed version of the gate function, which in the case of polarization-gate FROG is just the intensity envelope of the pulse: $G(t)=I(-t)$. (Integrating Eq. (11) with respect to $\tau$ yields $E(\omega)$, which can be inverse Fourier transformed to yield E(t) as described above.) To apply the intensity constraint, the intensity of the current guess for E(t) is replaced with the intensity derived above by integrating $E'_{sig}(\omega,\tau)$ with respect to $\omega$, while leaving the phase unchanged. (Note that this method which has been described for the polarization gate nonlinearity, requires significant modification for other nonlinearities. In SHG FROG interestingly, it yields the pulse itself, but this is still useful when alternated with the basic FROG method, as discussed below.)

Repeated application of the intensity constraint alone leads to large errors in the phase of the current guess field, as well as noise in the wings of the field. However, if combined in an alternating fashion with the basic FROG method with two iterations using the intensity constraint followed by one iteration using the basic FROG convergence can be improved. The error G actually gets larger during the application of the intensity constraint, and is reduced with the application of the basic FROG method. The overall result is a much smaller error than that attainable with the basic FROG method alone.

Figure 8:
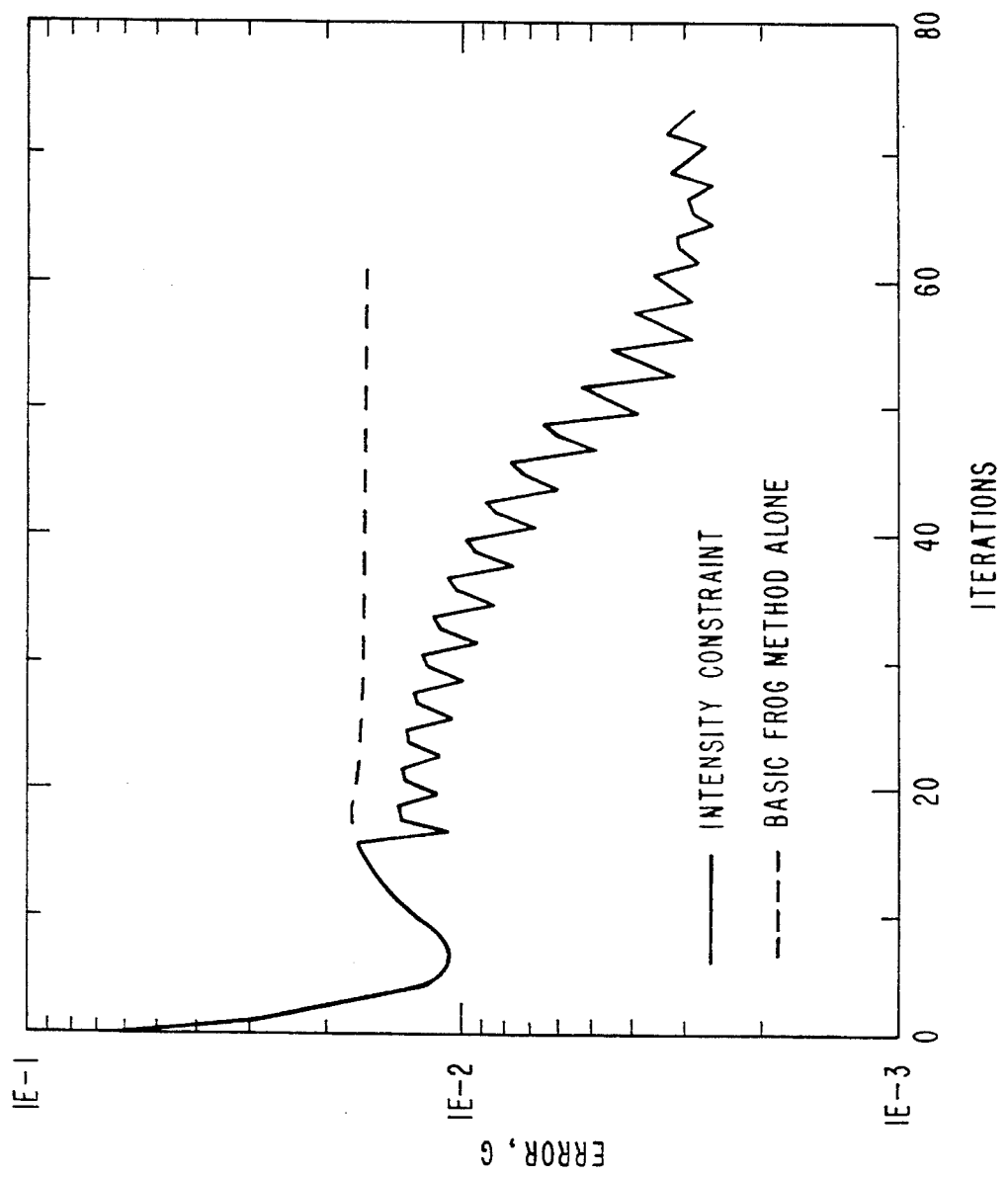
FIG. 8 depicts the convergence of a method using an intensity constraint compared to a method using the basic FROG retrieval technique.

This intensity-constraint method was tested using a FROG trace generated by a double pulse of equal intensities as an input. The results are seen in FIG. 8, which shows the error as a function of iteration number for both the basic FROG method and the intensity constraint method. The basic FROG method was applied until a minimum error level was reached, and then the alternation of the basic FROG method and the intensity constraint described above was used. This combination reaches much smaller error values than the basic FROG method alone. However, for the double pulse, the combination still does not converge to a stable, low-error solution.

Another modification of the basic FROG method employed in the second embodiment is overcorrection. In the basic FROG, we replace the magnitude of the signal field $E_{sig}(\omega,\tau)$ generated by the current guess for E(t) with the magnitude of the experimentally generated FROG data, as described above. Specifically, this operation involves replacing $E_{sig}(\omega,\tau)$ with:

$$E_{sig}(\omega,\tau) = \frac{E_{sig}(\omega,\tau)}{|E_{sig}(\omega,\tau)|} \sqrt{I_{FROG}(\omega,\tau)} \quad (13)$$

This replacement "corrects" the magnitude of $E_{sig}(\omega,\tau)$—it increases the magnitude where it is too small, and decreases it where it is too large, yielding $E_{sig}(\omega,\tau)$ with a magnitude that is equal to that of the actual FROG trace.

For overcorrection, the errors between $|E_{sig}(\omega,\tau)|^2$ and $I_{FROG}$ are overcorrected to speed the convergence. For example, an overcorrection term (the bracketed quantity) that is proportional to the deviation between the two FROG traces can be added, such as $$E'_{sig}(\omega,\tau) = \qquad (14)$$

$$\frac{E_{sig}(\omega),\tau)}{|E_{sig}(\omega,\tau)|} \sqrt{I_{FROG}(\omega,\tau)} \left[ 1 + \frac{I_{FROG}(\omega,\tau) - |E_{sig}(\omega,\tau)|^2}{|E_{sig}(\omega,\tau)|^2} \right]$$

The inclusion of the factor in square brackets has the effect of overcorrecting when creating $E'_{sig}$: where the square magnitude of $E_{sig}$ is smaller than $I_{FROG}$, the new square magnitude of $E'_{sig}$ will be larger than that of $I_{FROG}$, and vice versa.

Eq. (14) becomes $$E'_{sig}(\omega,\tau) = \frac{E_{sig}(\omega,\tau)}{|E_{sig}(\omega,\tau)|} \sqrt{I_{FROG}(\omega,\tau)} \left[ \frac{I_{FROG}(\omega,\tau)}{|E_{sig}(\omega,\tau)|^2} \right] \qquad (15)$$

$$= E_{sig}(\omega,\tau) \left[ \frac{\sqrt{I_{FROG}(\omega,\tau)}}{|E_{Sig}(\omega,\tau)|} \right]^3$$

We can generalize this replacement step to $$E'_{sig}(\omega,\tau) = E_{sig}(\omega,\tau) \left| \frac{\sqrt{I_{FROG}(\omega,\tau)}}{E_{sig}(\omega,\tau)} \right|^\alpha, \qquad (16)$$

where $\alpha$ is an adjustable exponent. In the basic FROG method, $\alpha=1$. This approach is similar to that used in standard phase retrieval and blind deconvolution techniques described in J. H. Seldin and J. R. Fienup, *J. Opt. Soc. Amer. A*, vol. 7, pp 428–433 (1990), the contents of which are incorporated herein by reference.

Values of $\alpha$ slightly larger than unity can speed convergence. However, values larger than roughly 1.5 can cause the method to become unstable. The value of $\alpha$ at which the instability begins is dependent on the size of the error G: the smaller G is (the closer to convergence), the larger the value of $\alpha$ that can safely be used. The reason for the instability can be easily seen. A field with a large error, G, by definition has large deviations from the correct FROG trace. When the value of $\alpha$ is high, a large error will lead to a large correction. If the correction is too large, this will lead to even greater errors in the field, which then lead to larger corrections, etc. An unstable positive feedback cycle is created, and the error (and field) diverges.

Figure 9:
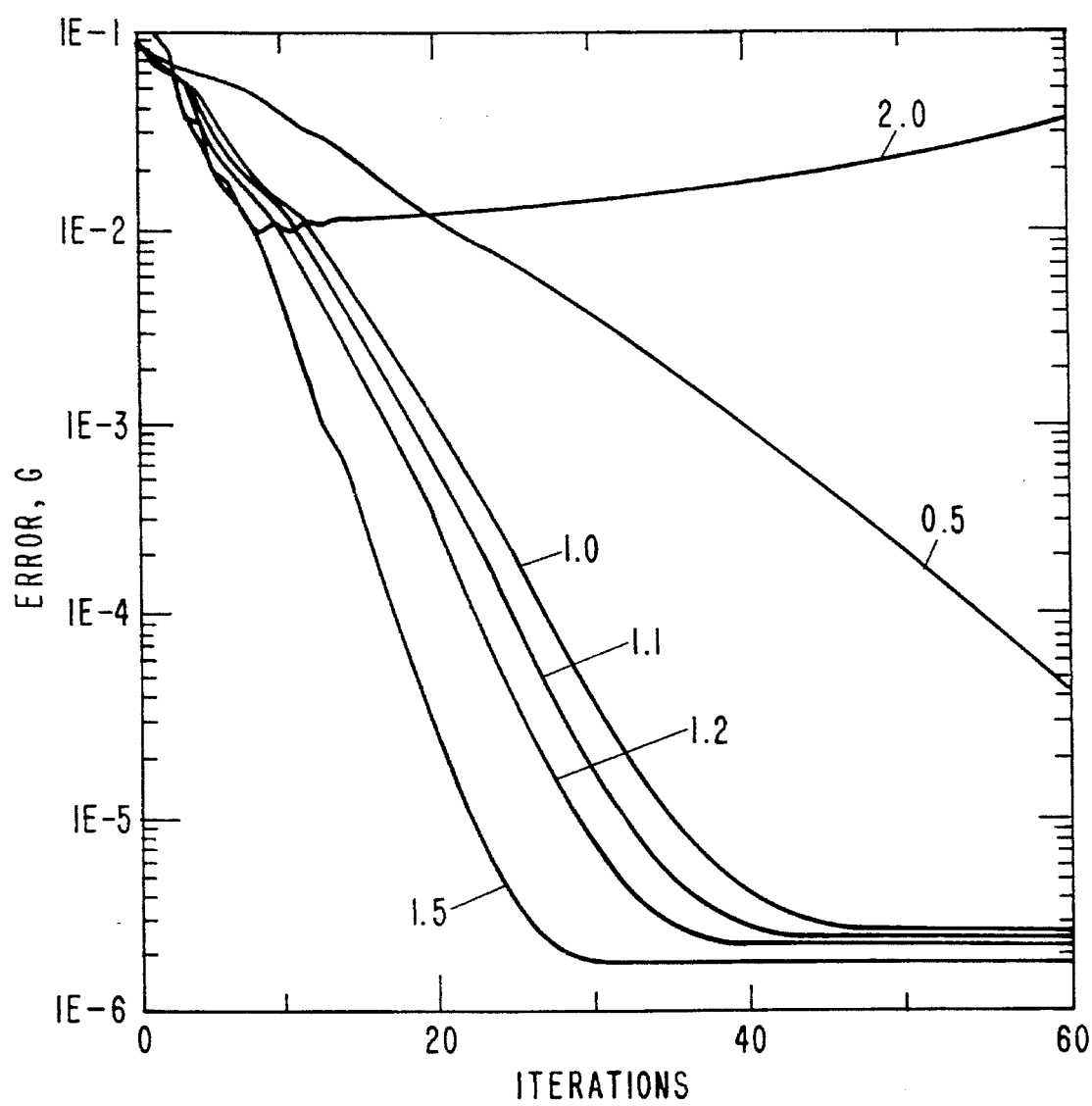
FIG. 9 illustrates the effect of different values of the exponent alpha in the over-correction method of an embodiment of the invention.

FIG. 9 shows the effect of different values of $\alpha$ on the convergence of the retrieval method for a self-phase modulated pulse with Q=4. As illustrated in FIG. 9 although increasing to about 1.5 speeds convergence, values of 2.0 or larger cause the retrieval method to diverge. Larger values of $\alpha$ can be used, however, if the basic FROG is used to first reduce the error before the larger $\alpha$ values are used. Alternatively, a value of e that begins at unity and slowly increases with iteration number can be used. Using such a scheme, the system behaves in a stable manner with values of $\alpha$ larger than 3.

Another modification to the basic FROG of the second embodiment uses principles of minimization. Multidimensional minimization, causes convergence in essentially all cases of interest, including the double pulse.

Minimization involves considering the FROG error G to be a single-valued function of 2N variables. The 2N variables are the values of the real and imaginary parts of the electric field at each of the N sampling points of the array which holds the field. Thus the pulse-retrieval problem is treated as a multidimensional minimization, where the goal is to minimize the FROG error, J. R. Fienup, *"Phase Retrieval Algorithms: a Comparison,"* Appl. Opt. 21, pp. 2758–2769 (1982), the contents of which are incorporated herein by reference.

In a multidimensional minimization problem, considerable computational effort can often be saved if we can calculate the gradient of the function at an arbitrary point. We first define a new error function, $$H = \sum_{\omega,\tau=1}^{N} [I_{FROG}(\omega,\tau) - |E_{sig}(\omega,\tau)|^2]^2 \qquad (17)$$

which is related to our usual error function G through the simple relation $H=G^2N^2$. The signal field is defined as $$E_{sig}(\omega,\tau) = \sum_{t=1}^{N} E(t)|E(t-\tau)|^2 \exp(i\omega t), \qquad (18)$$

where $\omega=2\pi f/N$, and f takes on integer values when sums over $\omega$ are performed.

The objective is to take the derivative of H with respect to E(t) for every point in the field E(t). The derivatives for the real, $E^r(t_0)$, and imaginary parts, $E^i(t_0)$ of $E(t_0)$ are taken separately. Here to is a generic value of the time. The result, after some algebra is $$\frac{dH}{dE^r(t_0)} = -4 \sum_{\omega,\tau}^{N} [I_{FROG}(\omega,\tau) - |E_{sig}(\omega,\tau)|^2] \qquad (19)$$

$$XRe\{[|E(t_0-\tau)|^2\exp(i\omega t_0) + 2E^r(t_0+\tau)\exp(i\omega(t_0))] E^*_{sig}(\omega,\tau)\}$$

and for the imaginary part of the field, we have $$\frac{dH}{dE^i(t_0)} = -4 \sum_{\omega,\tau}^{N} [I_{FROG}(\omega,\tau) - |E_{sig}(\omega,\tau)|^2] \qquad (20)$$

$$XRe\{[iE(t_0-\tau)|^2\exp(i\omega t_0) + 2E^i(t_0)E(t_0+\tau)\exp(i\omega(t_0+\tau))] E^*_{sig}(\omega,\tau)\},$$

using the relations $$\frac{dE(t)}{dE^r(t_0)} = \delta_{t,t_0} \text{ and } \frac{dE(t)}{dE^i(t_0)} = i\delta_{t,t_0} \qquad (21)$$

where $\delta_{ij}$ is unity for i=j and zero for i≠j.

With the gradient of the error function, a minimization technique can be applied. Consider the standard Fletcher-Reeves and Polak-Ribiere methods, which are conjugate gradient methods. These involve a series of one-dimensional minimizations along directions that are selected with the aid of the gradient. The details of this method are described in W. H. Press, W. T. Vetterling, and S. A. Teukolsky, *Numerical Recipes in C*, 2nd ed. (Cambridge Univ. Press, U.K., 1992), the contents of which are incorporated herein by reference.

In contrast to the previously discussed iterative Fourier-transform methods, the minimization routine will necessarily always act to reduce the error. However, it cannot distinguish between global and local minima. The multidimensional surface of H(E) is fraught with a plethora of local minima, and therefore the minimization routine needs a fairly good initial guess in order to insure convergence. Even so, one cannot determine whether a given input will converge to the global minimum or get caught in one of the numerous local minima. In the general case, the minimization routine often becomes trapped in local minima.

In order to "kick" the minimization routine out of local minima, the surface of the error function may be altered by constructing a modified error, $$H_W = \sum_{\omega,\tau}^{N} \left[ \frac{I_{FROG}(\omega,\tau) - |E_{sig}(\omega,\tau)|^2}{I_{FROG}(\omega,\tau)} \right]^2. \qquad (22)$$

The only difference between $H_W$ and the previous error H is the denominator which acts to weight the contribution to each point by its multiplicitive inverse signal intensity. This error function has the effect of emphasizing the areas of the FROG trace that are small in intensity, and one of the resulting effects is that it emphasizes the convergence in the wings of the reconstructed pulse. The local minima associated with this new error function generally are located at different positions, so that switching to this new error function can serve to "kick" the minimization routine out of a local minimum and send it closer to the global minimum. This technique is sometimes effective, while in other cases, switching to the new error function does not serve to free the minimization routine from the local minimum.

As mentioned, due to the abundance of local minima, a good initial guess is required for the minimization scheme. Using the combination of the basic FROG, the intensity constraint, and overcorrection, we can get an initial guess for the minimization routine that allows it to converge to a satisfactory solution for the vast majority of cases.

The second embodiment combines the above described techniques—the basic FROG method, the intensity constraint method, the overcorrection technique, and the multidimensional minimization techniques—to retrieve an electric field from the FROG trace that it created. A composite method is used which is able to monitor its own progress, decide when a particular technique is failing to converge, and select a new technique to try.

In order to monitor its progress, the device according to the second embodiment examines the error G after every iteration of each technique used. It stores the error for the previous nine iterations, as well as the smallest error $G_{min}$ achieved and its associated field, $E_{min}$. This can be accomplished with virtually any computer. In addition, most of these methods lend themselves to parallel processing.

The composite method continues using a selected technique until one of two conditions is detected: convergence or stagnation. For example, convergence may be defined as an error G of less than 0.0001. Stagnation may be defined by the condition that the error G has decreased by less than 0.5% from the value nine iterations prior to that. When the composite method switches to a new technique, it resets the current guess for the field to $E_{min}(t)$, that field which generated the lowest previous error. In this way, techniques that occasionally diverge (increase the error) will not reduce the efficiency of the composite method.

Figure 10:
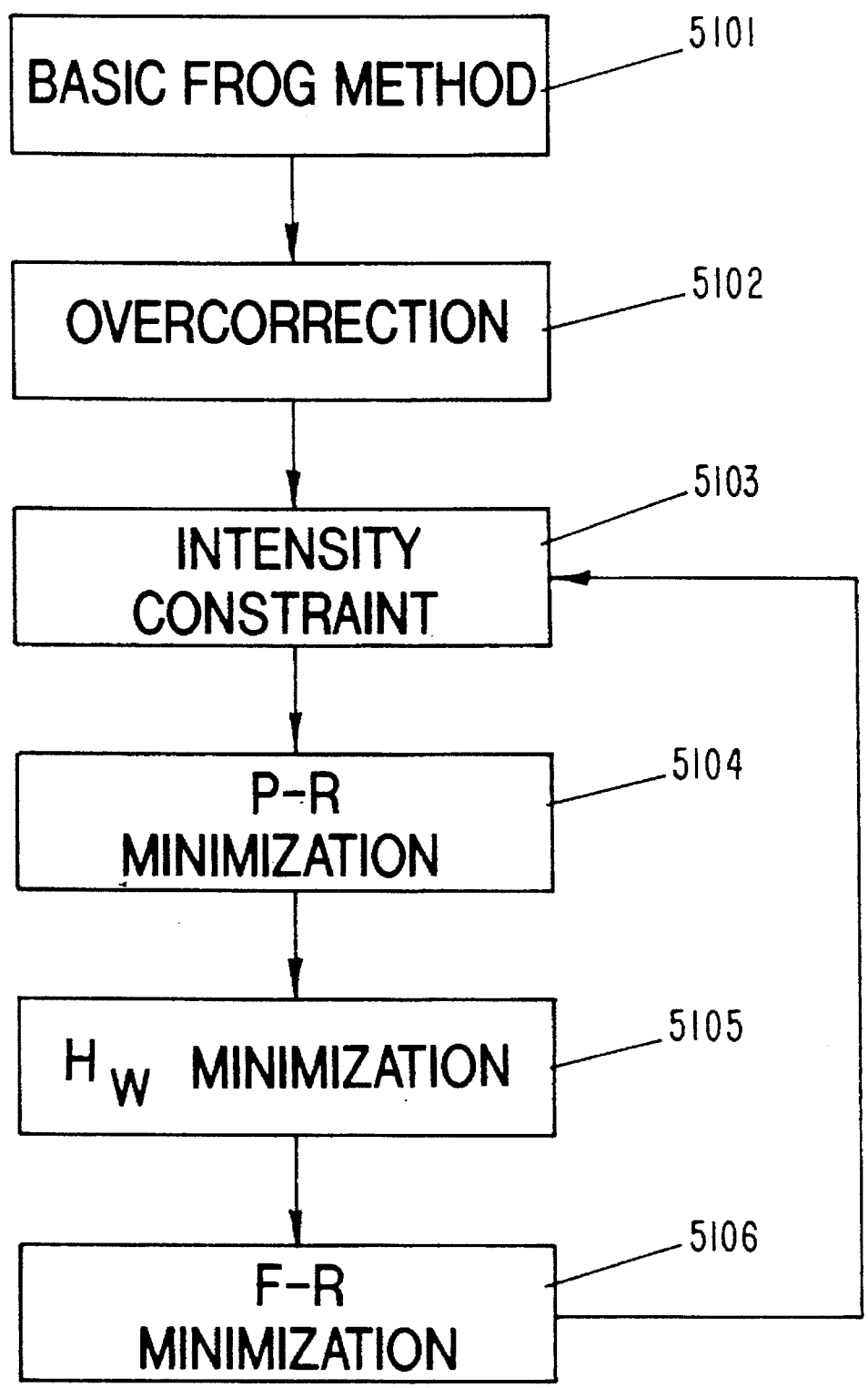
FIG. 10 illustrates a flow chart of a composite FROG method according to an embodiment of the instant invention.

The flow of the composite method is diagramed in FIG. 10.

At step S101, the basic FROG techniques is applied, which uses the iterative Fourier transform with the nonlinear optical constraint applied using Eq. (3), the simplest, most robust, and quickest of the methods available. It generally suffices in most instances, excluding those where stagnation is a problem, as in the double pulse case discussed above. If stagnation is detected, the method moves on to the overcorrection method at step S102. The value of α used increases with the number of iterations k of the overcorrection method through $$\alpha = (1.1)^{1+k/5} \quad (23)$$

If the value of α increases too quickly, the technique may become unstable and diverge, as discussed previously. If α increases too slowly, however, its effect will be minimal at first, and the self-regulating portion of the composite method may decide that convergence is occurring too slowly and skip to the next method.

If the retrieval method has not yet converged, we next apply the intensity-constraint method at step S103. During the application of the intensity-constraint method, the error fluctuates quite a bit, so caution must be exercised when testing for convergence or stagnation. The intensity constraint method, performs two iterations using the intensity constraint followed by one iteration of the basic FROG retrieval method, so that the period of these fluctuations is three iterations. The error over three iterations is averaged before comparing it to the error nine iterations before (which has also been averaged over three iterations.) Also, if the field with the lowest error $G_{min}$ occurred within the last nine iterations, the intensity constraint portion of the composite method is continued, even if it meets the other criteria for stagnation. These considerations allow for the often complex dynamics of the intensity constraint method.

If the intensity constraint method stagnates, the composite method proceeds to the minimization schemes. These are computationally more expensive than the iterative Fourier-transform methods (order $N^3$, versus $N^2 v \ln(N)$ for the iterative Fourier-transform techniques). The method begins with the Polak-Ribiere method at step S104. When using the minimization schemes, the system keeps track of the error values of only the previous four iterations.

If the Polak-Ribiere method stagnates, we switch to the new error function $H_w$ of Eq. (22). This error function presents some unique problems, since it often happens that H increases as $H_w$ decreases, at least initially. In the case where the method is converging to the global minimum, this is rarely a problem, as convergence is usually swift and smooth. In the rare case that the minimization technique operating on the error H has stagnated in a particularly deep local minimum, although the method may make progress in minimizing $H_w$, the new field may be lost because the error H increased (causing the self-monitoring portion of the program to discard that field). To guard against this occurrence, the new field generated by minimizing $H_w$ is passed to the next routine, even if H increased, on alternate passes through this portion of the minimization technique.

If this method also stagnates, the retrieval method then switches back to the original error function H but uses the Fletcher-Reeves method at step S106. The Fletcher-Reeves method differs from the Polak-Ribiere method in the way it generates new directions in which to minimize the error function. Finally, if this fails, the composite method switches back to the intensity constraint method, and the cycle begins again, as shown in FIG. 10.

Figure 11:
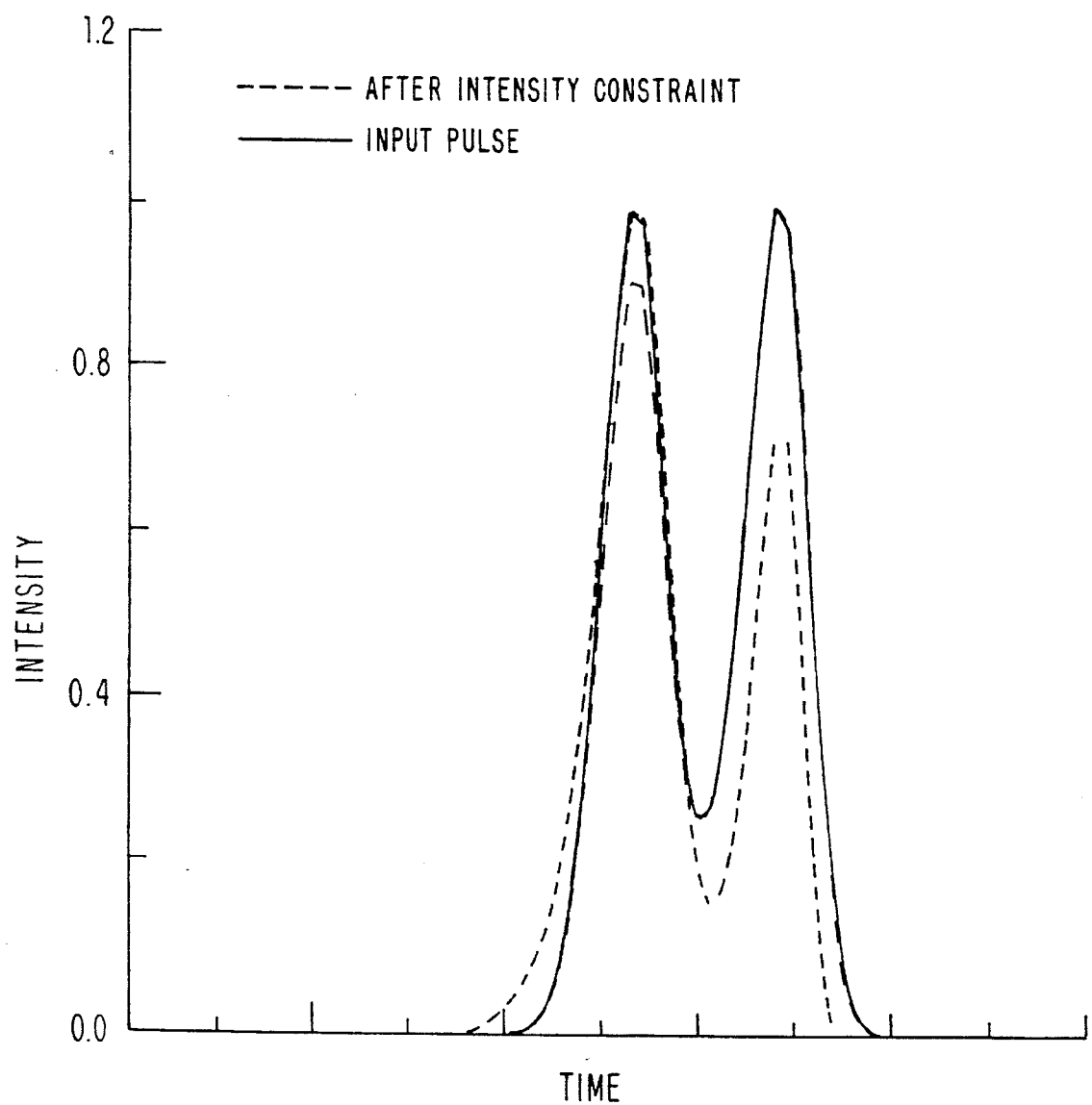
FIG. 11 illustrates intensity profiles of fields with the lowest error produced by the basic FROG method and the intensity constraint method when presented with a double pulse.

This composite method converges for a much broader class of pulses than the basic FROG retrieval method. FIG. 11 shows the performance of the basic FROG, the intensity constraint method, and the entire composite on the case of a double pulse with two equal intensity peaks. The intensity constraint method gets significantly closer to convergence than the basic FROG (G=0.00226 versus G=0.0105), but the minimization routines are required to ensure complete convergence. The field retrieved by the full composite method in FIG. 11 is visually indistinguishable from the field used to generate the FROG trace.

Figure 12A:
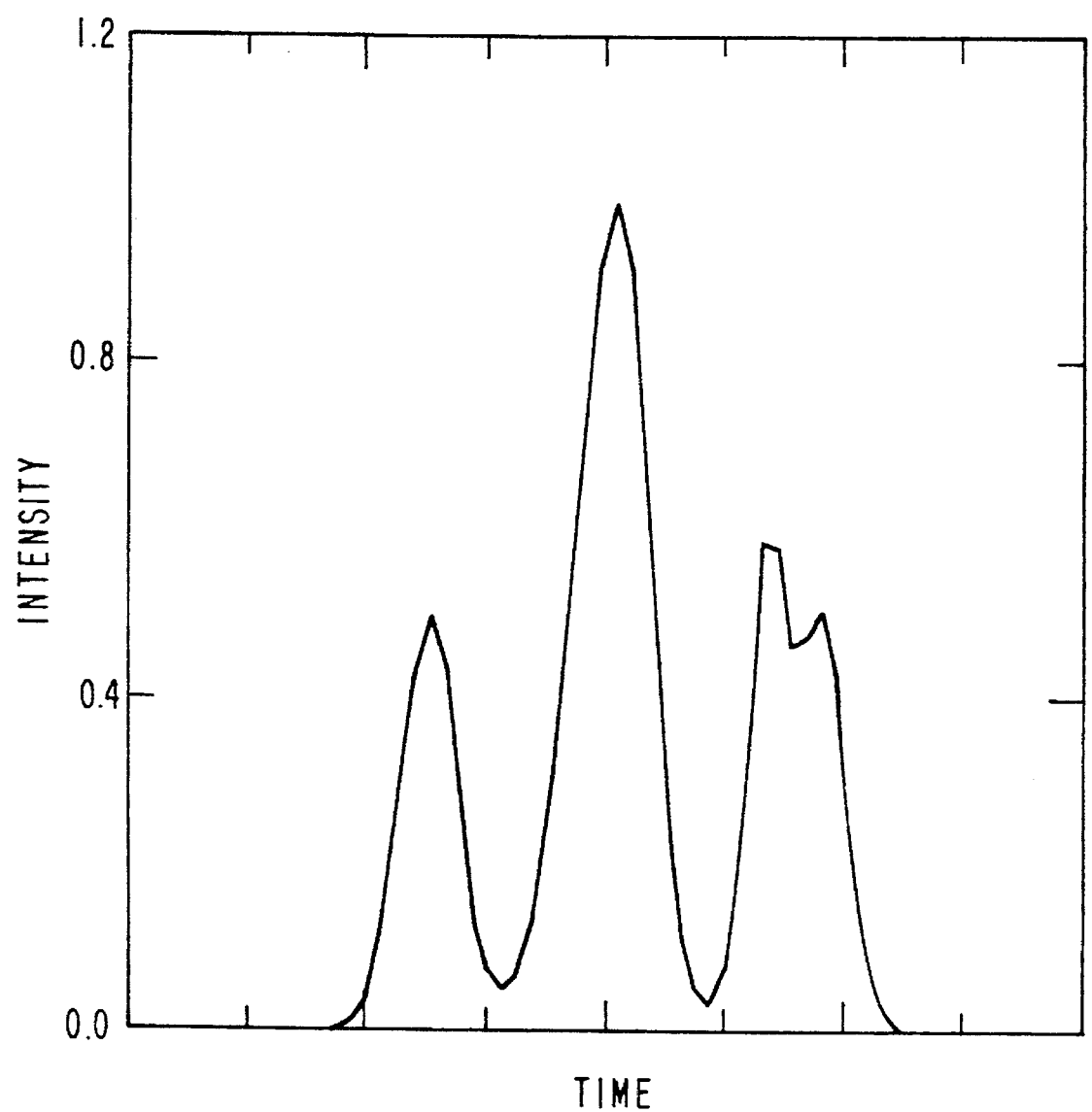
FIGS. 12A–12C depict the intensity and phase of three highly structured pulses as retrieved by the composite retrieval method which could not be retrieved using the basic FROG method.
Figure 12B:
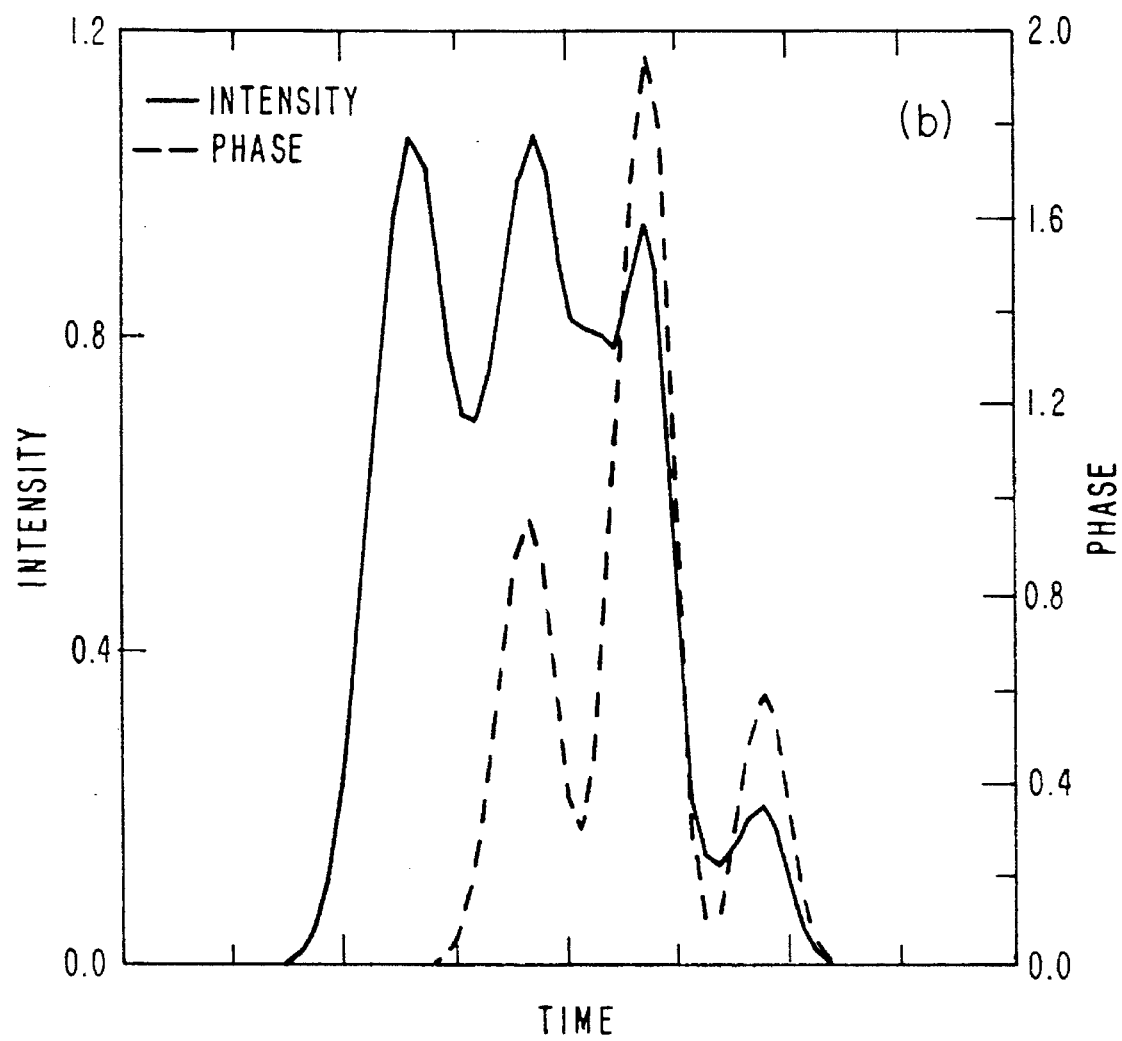
Figure 12C:
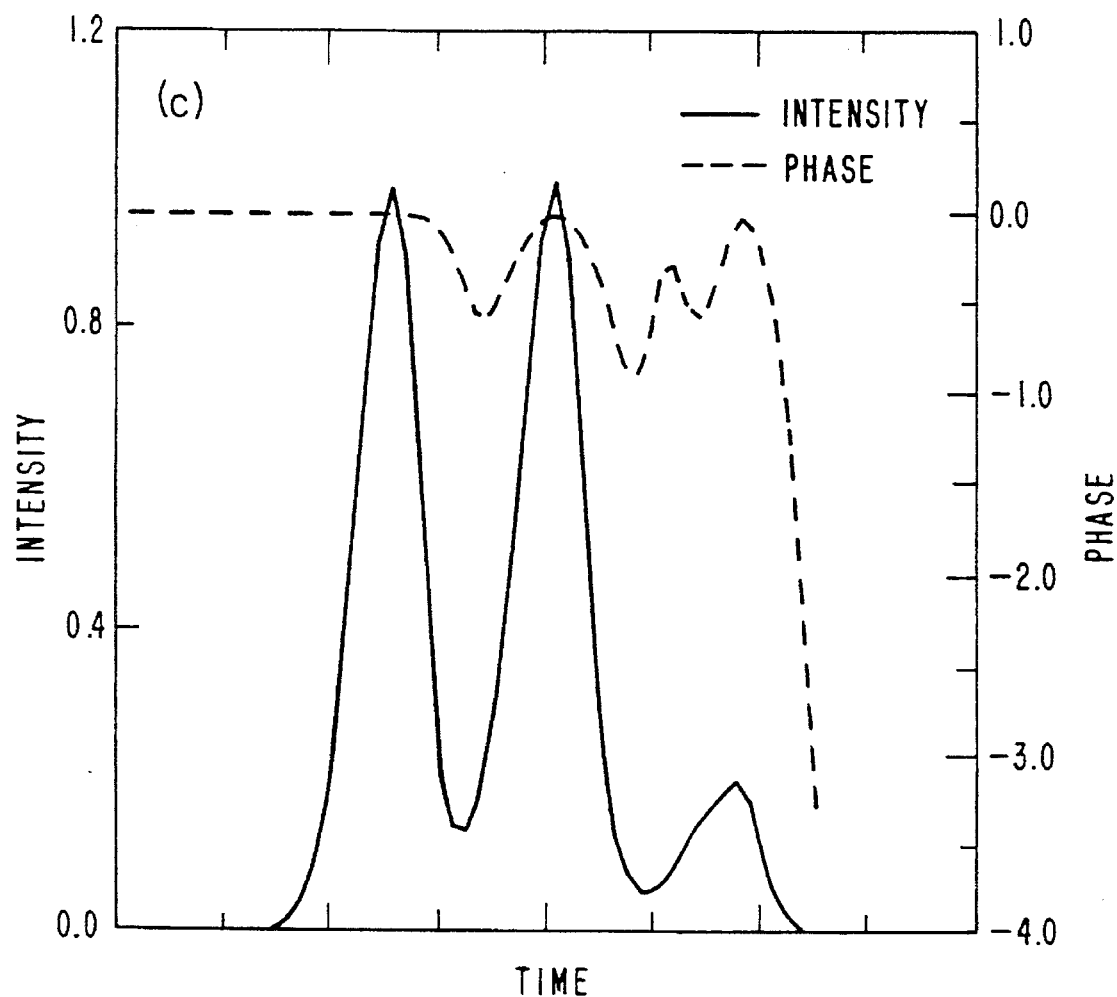

Nearly all pulses with complicated intensity and/or phase profiles that we tried were retrieved by tests of the composite method, and some examples are shown in FIG. 12A–12C. These waveforms are sums of four individual Gaussian pulses, each with varying height, width, and various phase distortions. All of these pulses were successfully retrieved using the composite method.

The composite method was also tested on pulses with abrupt jumps in phase. The method was able to retrieve these pulses as long as the phase jump was not too sharp (less than two array elements wide) and as long as the phase change between adjacent points was less than roughly $0.5\pi$ to $0.3\pi$. Also, the composite method had no trouble with phase ramps, where the trailing half of the pulse has a linear phase ramp (frequency shift), again assuming that the phase shift between adjacent points was not too large. In the few cases where the composite method did not converge initially, we found that after increasing the point density the composite method converges without difficulty.

The above-described second embodiment greatly improves the convergence of the apparatus of the instant invention. In a third embodiment, an even more robust convergence technique is used. The third embodiment applies a method of generalized projections to solve problems associated with both the first and second embodiment. The basic principles of the method of generalized projections are described in A. Levi and H. Stark, in "Image Recovery: Theory and Applications," H. Stark, ed. (Academic Press, San Diego, 1987), the contents of which are incorporated herein by reference. The third embodiment sets forth an extremely powerful technique, which is both simple to implement and has great intuitive appeal. The device and method of the third embodiment using generalized projections (GPs), generally yields convergence of the FROG device even when the above first FROG embodiment fails. While the second embodiment rarely fails, it is slow, and the third embodiment, in comparison, is much faster.

Generalized projections are useful in all FROG variations, but we will describe the basic elements of their use for the polarization-gate (PG) geometry of FROG, where the FROG signal field takes the form $$E_{sig}(t,\tau) = E(t)|E(t-\tau)|^2, \quad (24)$$

and $E(t)$ is the pulse electric field vs. time and $\tau$ is the delay between the two pulse replicas. The FROG trace is the squared magnitude of the Fourier transform of this signal, $$I_{FROG}(\omega,\tau) = \left| \int_{-\infty}^{\infty} dt E_{sig}(t,\tau)\exp(i\omega t) \right|^2 \quad (25)$$

As with the first two embodiments, the task of the third embodiment is to find a signal field $E_{sig}(t,\tau)$ that not only satisfies the mathematical constraint of Eq. (24) (that of being generatable from a physically realizable field $E(t)$), but that also satisfies Eq. (25) (that the magnitude squared of its Fourier transform matches the experimentally measured FROG trace). In other words, the third embodiment, like the others, provides a method of locating a signal field that satisfies two distinct mathematical constraints. One subset of all the possible signal fields will satisfy the first constraint, while a (generally) different subset will satisfy the second constraint. The correct signal field is one that satisfies both constraints, i.e., an intersection of these two constraint sets.

Figure 13:
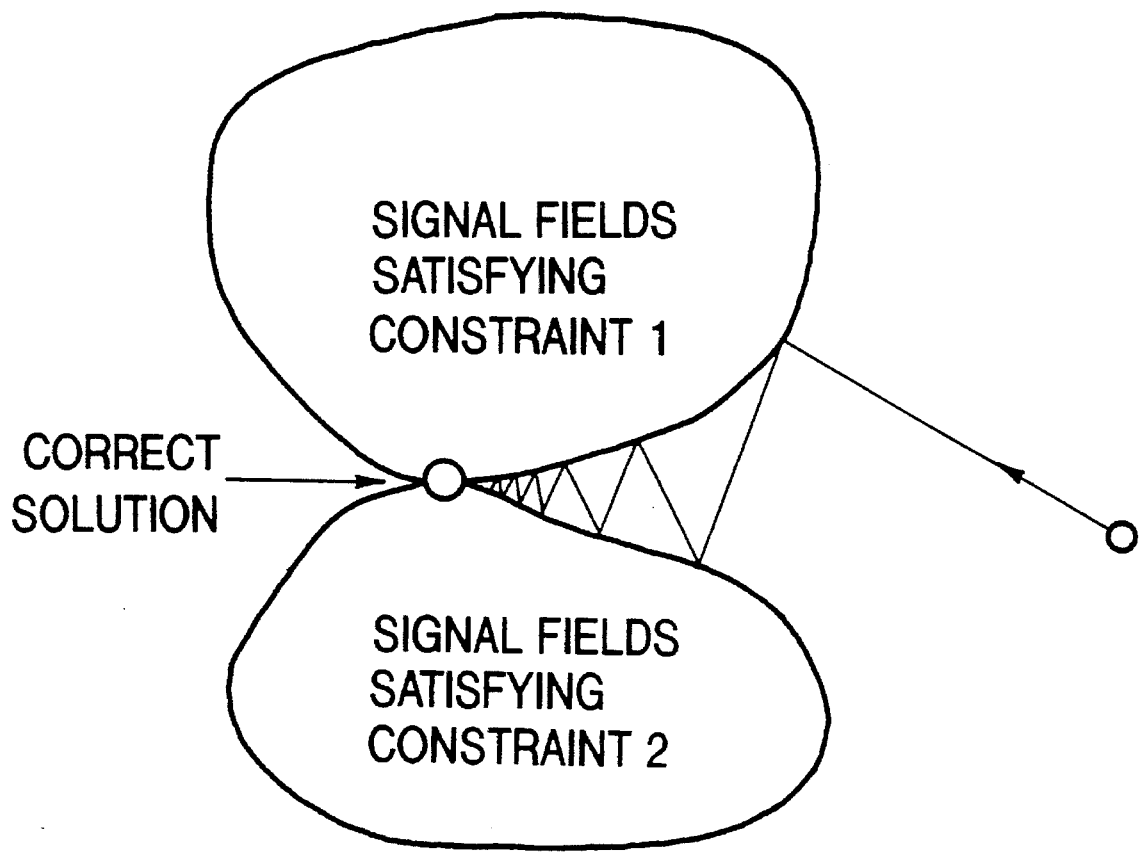
FIG. 13 illustrates a method of generalized projections.

This situation is illustrated in FIG. 13, which shows the two constraint sets intersecting at the correct solution, and which also diagrams the method of the third embodiment using projections. Starting with an arbitrary signal field (which is most likely not in either constraint set), a projection onto the first constraint set is made. A projection of a point onto a constraint set is a map to the point in the constraint set that is closest in some sense to the starting point. From this new point, a projection onto the second set is then performed, followed by a projection back onto the first set, etc. By iteratively projecting onto the two sets, this process will eventually arrive at the intersection of the two sets, i.e., at the correct answer.

The shape of the two sets is important when performing projections. If a line between any two points in a set never leaves the set, the set is said to be convex. When both constraint sets are convex, we speak of the method of projections, and convergence is guaranteed. In the case where one or both of the constraint sets are non-convex the projection may not be unique—in this case a generalized projection must be defined (which is still the closest point in the constraint set). In addition, convergence cannot be guaranteed mathematically (the method tends to get stuck on protrusions in the constraint sets), but the method is often found to work effectively despite this. This is the case in FROG since both constraint sets used in the third embodiment are non-convex. Nevertheless, GPs work well in extracting information about the short laser pulses from the FROG trace.

The above described basic FROG method involves Fourier transforming the signal field back and forth between the time and frequency domains. The method satisfies the constraint specified by Eq. (25) by replacing the magnitude of the current signal field in the frequency domain by the square root of the intensity $I_{FROG}(\omega,\tau)$ of the experimental FROG trace, $$E'_{sig}(\omega,\tau) = \frac{E_{sig}(\omega,\tau)}{|E_{sig}(\omega,\tau)|} \sqrt{I_{FROG}(\omega,\tau)} \quad (26)$$

Magnitude replacement in this fashion is already a type of GP. See, Levi and Stark.

Satisfying the constraint indicated by Eq. (24) does not, however, involve a GP in either of the above first and second embodiments. In order to implement a GP for this constraint, in accordance with the third embodiment a projection must be made to move to the point in this constraint set that is closest to the original point. In other words, the system must carry out an operation to minimize a distance function. In PG FROG, the following distance function can be employed:

$$Z = \sum_{i,j=1}^{N} |E_{sig}(t_i,\tau_j) - E(t_i)|E(t_i - \tau_j)|^2|^2 \quad (27)$$

where $E'_{sig}(t,\tau)$ is the inverse Fourier transform with respect to $\omega$ of $E'_{sig}(\omega,\tau)$ as defined in Eq. (26). The quantity $E(t)|E(t-\tau)|^2$ forms the signal field for the next iteration of the retrieval method, and is written such that it explicitly satisfies Eq. (24). (Other FROG geometries using other non-linear properties would necessitate the use of an appropriately and easily modified distance function. K. W. DeLong, D. H. Fittinghoff, R. Trebino, B. Kohler, and K. Wilson, "Pulse Renewal in Frequency, Resolved Optical Gating Using the Method of Generated Projections," submitted to Opt. Lett. 1994. A GP is implemented by minimizing the error function Z with respect to E(t). For many applications, a single one-dimensional minimization along the gradient of Z rather than a full multi-dimensional minimization, is sufficient, and is computationally less expensive. DeLong, supra.

Figure 14:
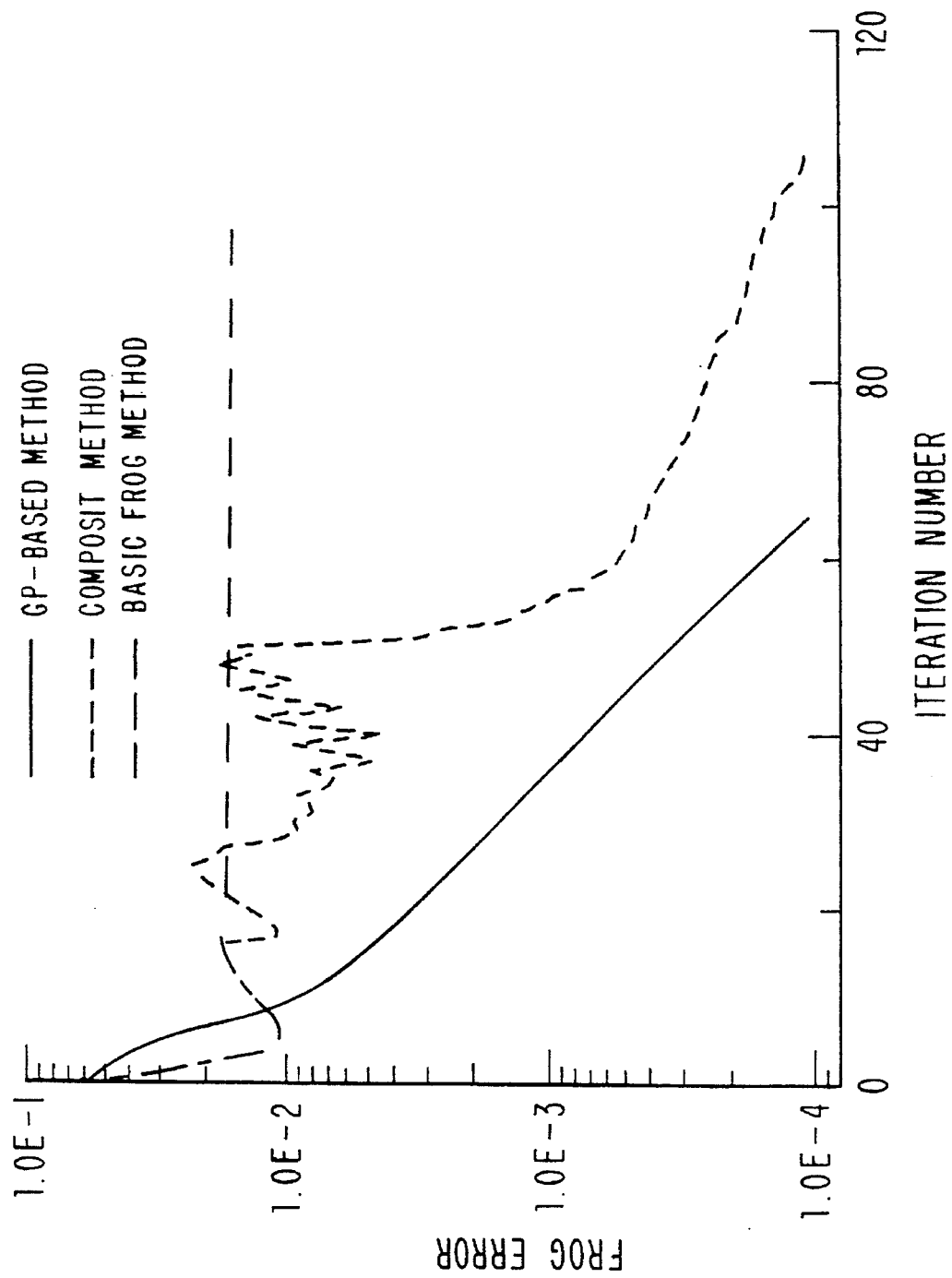
FIG. 14 illustrates an error in pulse intensity and phase retrieved for the double pulse from FROG traces using various retrieval methods.

A device constructed using the method of GPs according to the third embodiment successfully inverts pulses that were previously extremely cumbersome, including the double pulse. FIG. 14 shows the performance of the first embodiment basic FROG method, the composite method of the second embodiment and the GP-based FROG method in retrieving the double pulse. Whereas the basic FROG method stagnates at a very high error, and the composite algorithm converges slowly, the GP-based method of the third embodiment successfully inverts the double-pulse FROG trace fairly rapidly. Tests have demonstrated that the third embodiment successfully extracts fairly quickly the desired information about all pulses with significant intensity substructure: whereas the basic FROG method stagnates and the composite algorithm converges slowly.

Due to noise in experimental data, and because the pulse intensity and phase are not independently measurable, the performance of the GP method in practice is difficult to quantify in many instances. The only quantitative measure of performance is the rms difference between the experimental FROG trace and the trace of the retrieved field. Using this measure, we find that the GP-based method of the third embodiment performs significantly better than either the FROG method of the first embodiment or the second embodiment on experimental data. In actual tests using a series of PG FROG traces of pulses from a regeneratively-amplified Ti:Sapphire laser system, for 19 of 20 traces the GP method performed better than the basic FROG method. The average reduction in error for these 19 traces was 35%, with the largest reduction being 50%. These results are also typical of results using second harmonic generation SHG FROG.

Figure 15:
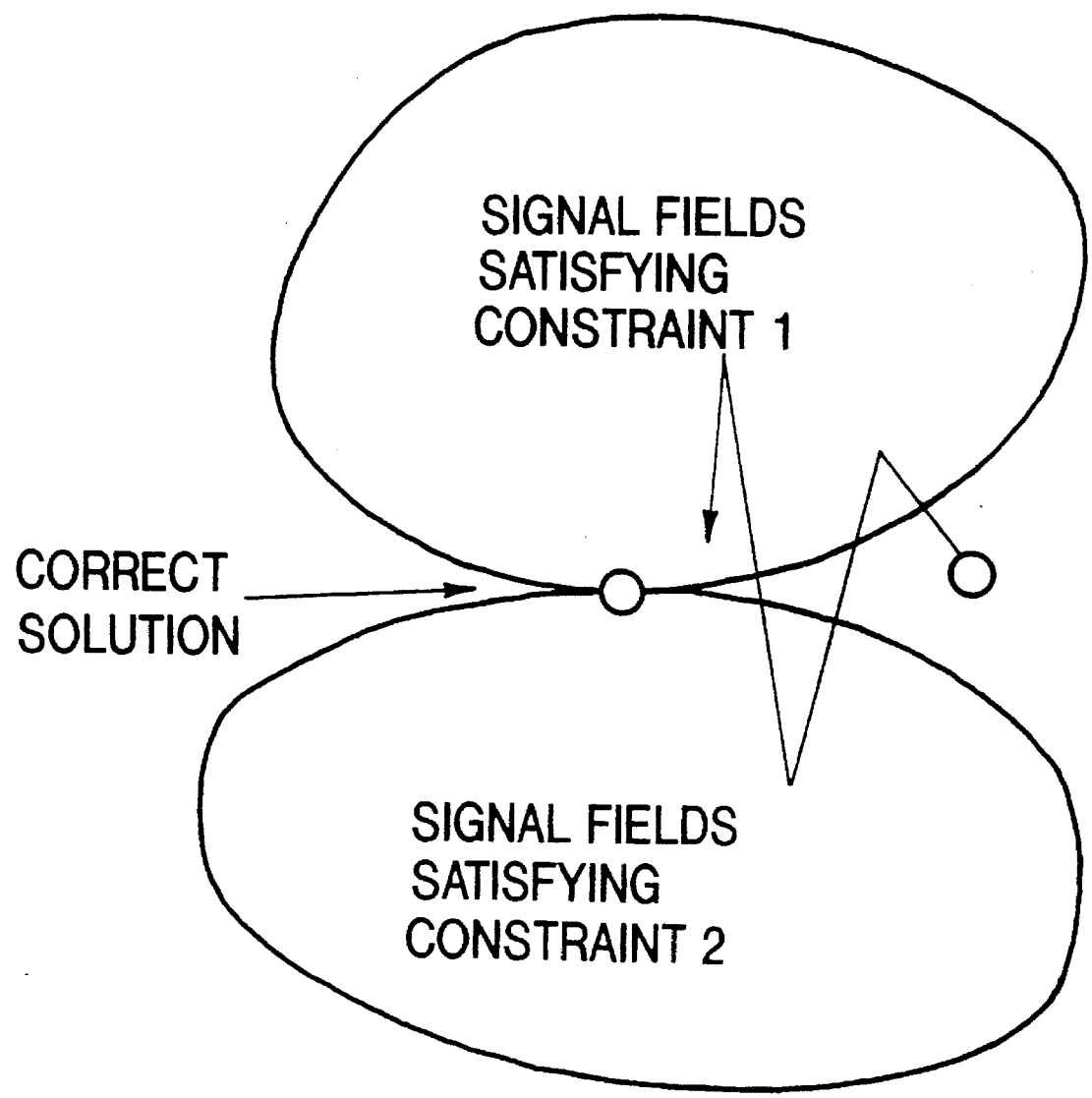
FIG. 15 illustrates the principle of an overstep method utilizing generalized projections.

The convergence of the GP-based method of the third embodiment can be further enhanced by occasionally using a larger step size in the projection onto the constraint set specified by Eq. (24). In other words, instead of projecting onto the surface of that set, the correction added to E(t) is doubled. This technique is illustrated in FIG. 15. This method, combined with the minimization techniques described above in connection with the second embodiment, yields even faster convergence.

Figure 16:
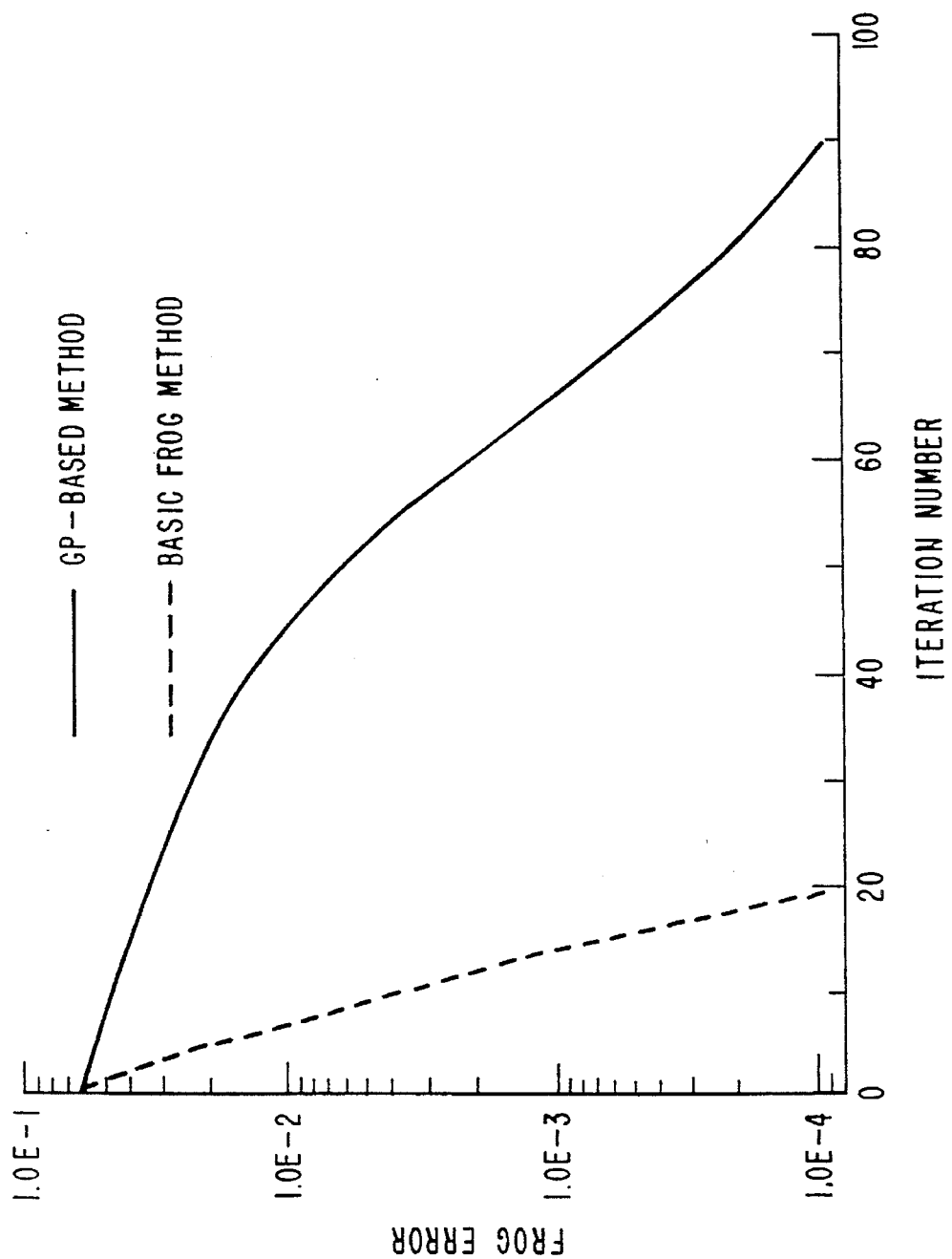
FIG. 16 illustrates the error in the retrieved FROG trace as a function of iteration number for a simple pulse with self-phase modulation for both the basic FROG method and the GP-based method.

It is noted that the GP-based method of the third embodiment does not entirely supplant the basic FROG methods described above. Rather, the first, second and third embodiment can be combined in a complementary fashion. In other words, the basic FROG method—for pulses that it is able to retrieve—converges significantly faster than the GP-based method. FIG. 16 shows the performance of the first and third embodiments (in PG FROG) on a Gaussian pulse with self-phase modulation. Although both methods converge, the basic FROG method converges significantly faster than the GP-based method. When the FROG trace has noise, the GP-based method is more sensitive to the field used as the initial guess. In certain instances, the final error is different for various initial guess fields. It is thus generally advantageous to apply the basic FROG method first and then switch to the GP-based method.

Each of the above described first through third embodiments explicitly or implicitly assumes a nearly-instantaneous material response. However, in a fourth embodiment using the principle of GPs an arbitrary material response function is included in the FROG retrieval system. An arbitrary material response can be written as $$E_{sig}(t,\tau) = f[E(t),\tau], \quad (28)$$

where $f$ can be any response function, and may include non-instantaneous terms. In order to use GPs to retrieve a pulse from a FROG trace generated in a material with the response $f$, the distance function Z can be rewritten as $$Z = \sum_{t,\tau=1}^{N} |E_{sig}(t,\tau) - f[E(t),\tau]|^2. \quad (29)$$

This new distance function is then minimized with respect to E(t) in the same fashion as Eq. (27) in order to implement the projection onto one of the constraint sets. In this manner, effects such as non-instantaneous response, Raman effects, and saturation can be included in the FROG pulse-retrieval system. By way of example, the manner in which the fourth embodiment can be used to account for Raman effects is described more fully below.

In accordance with the fourth embodiment, the Raman response of fused silica for the case of self-action is formulated as a time-domain response function as shown by Stolen and coworkers and described in the publication R. H. Stolen, J. P. Gordon, W. J. Tomlinson and H. A. Haus, J. Opt. Soc. Am. B 6, 1159 (1989); R. H. Stolen and W. J. Tomlinson, J. Opt. Soc. Am. B 9, 565 (1992), the contents of which are incorporated by reference. Experimentally measured Raman spectra were used to determine the form of the response function.

In the Born-Oppenheimer approximation, which is valid when the optical frequencies are well below the electronic resonances and well above the nuclear resonance frequencies, the formalism developed by Hellwarth to write the nonlinear polarization in terms of response function integrals can be used. This is described in a publication by R. J. Hellwarth, in Progr. Quant. Electron. vol. 5, pg. 1 (1977) the contents of which are incorporated herein by reference. For the case of self-action in an isotropic medium we can write $$P^{(3)}(t) = \frac{3}{2} \sigma E(t)|E(t)|^2 + 2E(t) \int_{-\infty}^{t} dt'[a(t-t') + b(t-t')]|E(t')|^2, \quad (30)$$

where terms in the integral that oscillate on the order of twice the optical frequency are ignored. This approximation is justified since these terms vary quickly on the time scale of a(t) and b(t) (that of the nuclear motion) and therefore tend to average to zero. In this equation, $\sigma$ represents the strength of the instantaneous nonlinearity, while a(t) and b(t) characterize the component of the nonlinearity due to the nuclear motion, i.e., the Raman component of the nonlinear response. The term $N_{2\infty}$ of Stolen is equal to $3\sigma/2$, and assuming that the function [a(t)+b(t)] has unit integrated area, $N_{2R}$ is equal to 2. See, *Stolen*, (1989) and (1992). Stolen's result of $N_{2\infty}/N_{2R}=0.82/0.18$ allows calibration of the ratio of the instantaneous to non-instantaneous response ($\sigma=6.07$).

In the case of PG FROG, the equation describing the nonlinear response is more complicated. Assuming that the probe and gate fields are of the same form, with the gate field delayed by a time T and polarized at a 45° angle with respect to the probe, the nonlinear polarization can be obtained (again following Hellwarth) as $$P^{(3)}(t,\tau) = \sigma E(t)|E(t-\tau)|^2 + E(t) \int_{-\infty}^{t} dt' b(t-t')|E(t'-\tau)|^2 + \\ E(t-\tau) \int_{-\infty}^{t} dt'[2a(t-t') + b(t-t')]E(t)E^*(t-\tau). \quad (31)$$

Again the terms inside the integral that oscillate at twice the optical frequency are neglected.

All that remains is to determine suitable functional forms for a(t) and b(t). Blow and Wood in, K. J. Blow and D. Wood, IEEE J. Quant. Electron., vol. 25, p. 2665 (1989), the contents of which are incorporated herein by reference, show that a reasonable approximation to the response function in the self-action case is an exponentially damped sinusoid. A separate work by Hellwarth et al. shows that in fused silica the area of a(t) is 43/14 times larger than the area of b(t) as published in R. Hellwarth, J. Chevlow, and T-T. Yang, Phys. Rev. B., vol. 11, p. 964 (1975) incorporated herein by reference. These two observations are then combined with an assumption that the functional form of a(t) and b(t) is the same. This assumption is reasonable since the two functions are of similar magnitude and their sum is reasonably well-approximated by a single function (that of Blow and Wood). Combining all of the above, yields $$a(t) = -\frac{43}{57} \frac{\tau_1^2 + \tau_2^2}{\tau_1 \tau_2^2} \exp(-t/\tau_2)\sin(t/\tau_1) \qquad (32)$$

and $b(t)=14a(t)/43$, and where $\tau_1=12.2$ fsec and $\tau_2=32$ fsec.

Figure 17:
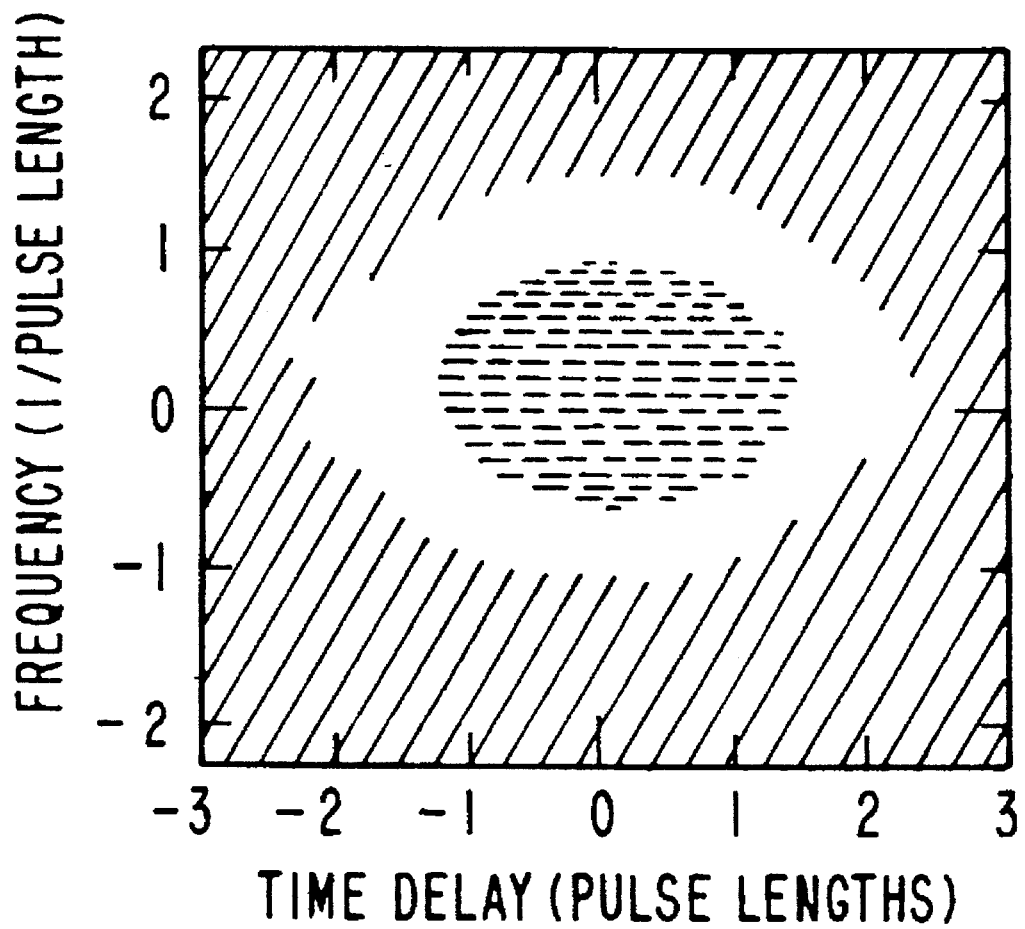
FIG. 17 illustrates a FROG trace using a material which includes the effects of non-instantaneous RAMAN terms to generate the trace.

The polarization of Eq. (31) serves as the signal field in PG FROG. This signal field is Fourier transformed, and its squared magnitude becomes the FROG trace. PG FROG traces using this response function for fused silica for a number of pulses were calculated. A typical trace is seen in FIG. 17. This is the FROG trace of a Gaussian, transform-limited pulse with a full-width at half-maximum (FWHM) of 25 fsec. The small tails seen extending to negative delay times are a result of the non-instantaneous Raman response of fused silica. On the other hand, the PG FROG trace of a transform-limited pulse using a purely nearly-instantaneous response is a perfect ellipse, without any such tails.

When we input the FROG trace illustrated in FIG. 17 to the standard FROG pulse-retrieval methods which explicitly assumes a totally nearly-instantaneous response, the method attempts to fit the Raman-induced features of the trace by modifying the retrieved pulse. As a result, the standard FROG pulse-retrieval method does not retrieve the correct pulse when the traces are generated in a medium with a non-negligible non-instantaneous component of the response.

Figure 18:
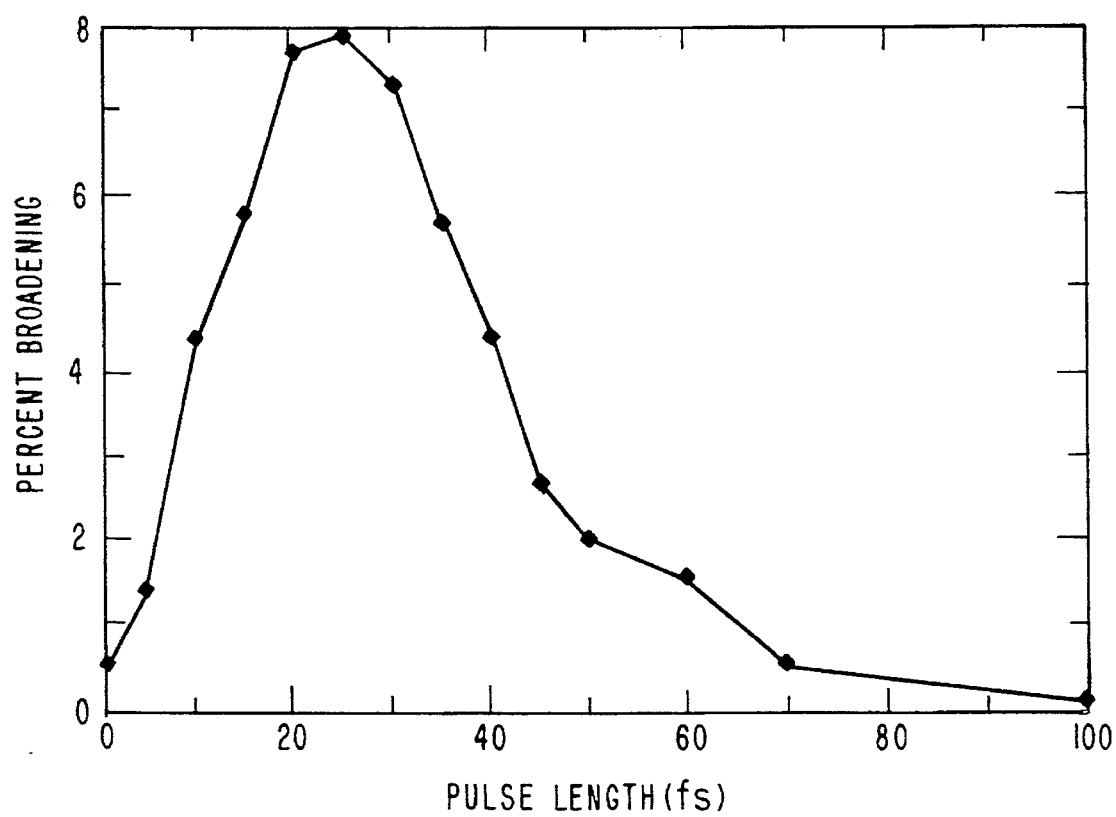
FIG. 18 illustrates temporal broadening in a pulse retrieved with a standard FROG method when the FROG trace is created by a material with a Raman response equivalent to that of fused silica.

In order to determine how severely the Raman-response-induced features of the FROG trace affect the retrieved pulse, a series of FROG traces using the response of Eq. (31) were generated and used as input to the standard FROG method, which included the composite method, including GP's but which assumed an instantaneous response. We used Gaussian, transform-limited pulses with a FWHM of 10 elements on a 64 element array as input. The resulting retrieved pulse is longer than the actual pulse, and slightly asymmetric. The amount of broadening is largest for pulses of 25 fsec FWHM, as seen in FIG. 18. Longer pulses are not affected, because the non-instantaneous response is short compared to the pulse length. Extremely short pulses are not affected as strongly because the ratio of energy to intensity decreases with pulse length, so that the contribution from the integrals in Eq. (31) decreases relative to that of the nearly-instantaneous term.

Figure 19B:
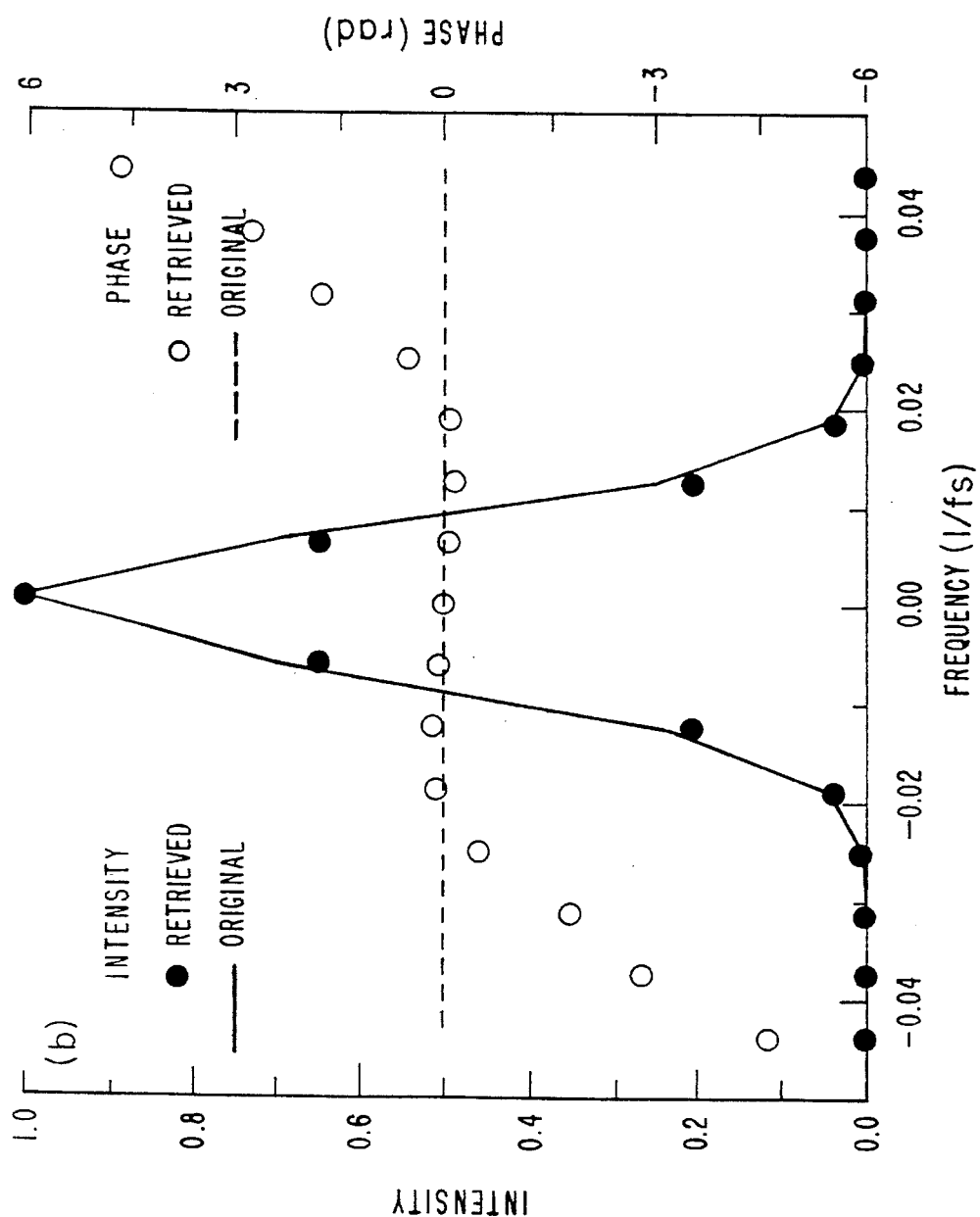

A sample of a pulse retrieved using the standard FROG method is shown in FIG. 19A and 19B. In the time domain, the pulse shape is slightly distorted, while in the frequency domain, the retrieved pulse has acquired a small amount of cubic phase. These results are typical of the effect of the Raman terms on the retrieved pulse.

The effect of the non-instantaneous response would appear to limit the accuracy of PG FROG in the case of 10 to 50 fsec pulses. However, in accordance with the fourth embodiment, this effect is completely accounted for by modifying the pulse-retrieval method using the generalized projections which allows the use of any arbitrary response function in the FROG retrieval method. By modifying the method to take into account the form of the non-instantaneous response of the medium, pulses can be exactly retrieved even in the presence of Raman effects. Numerical tests of the method of the fourth embodiment have been carried out for several types of pulses, including pulses with complicated intensity and phase structure. In the tests each of these pulses were retrieved exactly. A drawback to the increased accuracy of the fourth embodiment is speed, since the system runs much more slowly when it incorporates the non-instantaneous terms. The number of calculations scale like $N^3$ rather than $N^2$ in the purely nearly-instantaneous case (where $N^2$ is the number of pixels in the FROG trace).

Thus, in accordance with the fourth embodiment, effects of non-instantaneous response are compensated for by modifying the pulse-retrieval method used by the system. Through the use of generalized projections, any arbitrary material response can be accommodated. A device in accordance with the fourth embodiment is capable of exactly retrieving pulses even in the presence of non-instantaneous material response. Thus, the apparatus of the fourth embodiment can be used to obtain measurement of pulses of all lengths, and is not limited by the presence of a non-instantaneous component of the material response.

Each of the embodiments described above use a single light pulse to form both a probe pulse and a gate pulse. It will be understood that the probe pulse and the gate pulse may originate from independent ultrashort light pulses. The above embodiment could be used substantially unchanged if the pulse shape, i.e., intensity vs. time of an independent gate pulse is known. Alternatively, according to a fifth embodiment both the gate pulse and the probe pulse may be characterized.

The fifth embodiment may be used at times when it is necessary to measure the intensity and phase of more than one laser pulse on a multiple or single-shot basis. Indeed, most ultrafast experiments involve one (or more) input pulse(s) and an output pulse. In order to extract maximum information from the experiment it is important to fully characterize both pulses. For example, one could measure the complex transmission or other optical characteristics of a material by measuring the intensity and phase of both the incident and transmitted pulses, gaining femtosecond resolution by doing this on a single-shot basis. Also one might wish to use a smooth, but unknown reference pulse to measure a much more complicated pulse, which would yield more intuitive trace and faster convergence.

In accordance with the fifth embodiment, the basic FROG apparatus must be slightly modified to accommodate different pulses. The basic apparatus consists of splitting the pulse to measured into two replicas (called gate and probe), crossing these beams in a nonlinear optical medium, and recording the frequency spectrum of the resulting nonlinear mixing signal for all relevant time delays of the two beams to generate a FROG trace. The fifth embodiment extends the technique to allow the gate and probe pulses to be non-identical. In accordance with this embodiment the spectrum of the mixing signal of two different pulses is recorded vs. delay. The problem of retrieving the intensity and phase of both pulses from this data will be referred to as Twin Recovery of Electric field Envelopes using FROG, or TREEFROG. As in FROG, a TREEFROG trace can be obtained quite easily on a multi-shot or single-shot basis using variations of the apparatus depicted in FIGS. 1 and 4 respectively.

The problem of retrieving the intensity and phase of two separate pulses from a single TREEFROG trace is similar in essence to the problem of blind deconvolution. In blind deconvolution, one has for example a blurred image, and from this one wishes to obtain both the original image and the blurring function. Like phase retrieval, this problem is, in general, solvable for two-dimensional case, but not for the one-dimensional case. Fundamentally, however, TREEFROG remains a phase retrieval problem, but we will modify the GP algorithm in a manner that is reminiscent of algorithms used in blind deconvolution.

In TREEFROG, we generate a signal field from the nonlinear mixing of two optical fields, which we write here generically as P for probe and G for gate, $$E_{sig}(t,\tau)=P(t)G(t-\tau). \qquad (33)$$

As in FROG, the TREEFROG trace is the magnitude squared of the spectrum of this signal field, $$I_{TREEFROG}(\omega,\tau) = \left| \int_{-\infty}^{\infty} dt E_{sig}(t,\tau)\exp(i\omega t) \right|^2 \tag{34}$$

The task of the twin-pulse retrieval method is to find P(t) and G(t) from $I_{TREEFROG}(\omega,\tau)$. The TREEFROG pulse-retrieval method is carried out with an apparatus which remains nearly as simple as that of the usual FROG problem.

The main difficulty in retrieving the pulse information using a TREEFROG trace is the lack of uniqueness of the pulses that yield a given TREEFROG trace. In general, more than one pair of probe and gate fields can generate the same TREEFROG trace. Certainly if both pulses are transform limited, then one can generate the same TREEFROG trace using a short probe and long gate as a long probe and short gate. This ambiguity is especially vexing in SHG TREEFROG. In PG TREEFROG, this ambiguity is less severe; however, one cannot obtain the phase of the gate field, because in the PG geometry G(t) is the intensity envelope of the gate pulse. Nevertheless, useful information beyond the full characterization of a single pulse is achieved, and simple steps, such as the inclusion of pulse spectra effectively remove the ambiguities completely. Thus, some and potentially all, information regarding the gate pulse is achievable, depending on the amount of additional information.

The implementation of the TREEFROG method is similar to the FROG methods described above. It now begins with guesses for both of the fields P(t) and G(t), and uses these guesses to generate $E_{sig}(\omega,\tau)$ via a Fourier transform of Eq. (33) with respect to t. The magnitude squared of $E_{sig}(\omega,\tau)$ forms a trial TREEFROG trace (when this trial trace matches the experimental trace, we consider the method to have converged). Just as in the usual FROG method, the magnitude of $E_{sig}(\omega,\tau)$ is constrained to be equal to the square root of the experimentally measured TREEFROG trace intensity, while leaving the phase unchanged, to yield a modified signal field $E'_{sig}(\omega,\tau)$. An inverse Fourier transform with respect to $\omega$ generates $E'_{sig}(\omega,\tau)$. In TREEFROG the method of generalized projections is then used to generate new guesses for the fields. In applying the method of generalized projections in the TREEFROG embodiment, an error function Z, as $$Z = \sum_{t,\tau=1}^{N} |E'_{sig}(t,\tau) - P(t)G(t-\tau)|^2, \tag{35}$$

is used.

The implementation of generalized projections in the fifth embodiment proceeds exactly as in the FROG GP method, with one difference: only one of the fields, P(t) or G(t), is modified on a given iteration. For example, on even iterations, say a new guess for P(t) is generated by minimizing Z with respect to P(t), while on odd iterations a new guess for G(t) is generated by minimizing Z with respect to G(t). The method continues until the trial TREEFROG trace matches the experimentally generated trace (or until the error between these two reaches a minimum).

Due to the increase in the number of degrees of freedom in TREEFROG, the pulse-retrieval problem is significantly more difficult than standard FROG. Although some pairs of probe and gate fields are retrieved quite easily, other pairs prove more difficult. Pairs of linearly chirped Gaussian pulses are among the more difficult to retrieve. A series of numerical simulations were carried out and it was discovered that, using the spectrum of the fields (an easily measured quantity) as an additional constraint significantly improved the convergence of the TREEFROG method. The spectral constraint can be implemented by constraining the gate (probe) field to have a spectrum identical to the true spectrum before modifying the probe (gate) field using generalized projections. This constraint was implemented by Fourier transforming the field, adjusting the magnitude of its spectrum to match that of the experimentally measured spectrum (while leaving the phase unchanged), and finally inverse Fourier transforming. The inclusion of the spectral constraint in the fifth embodiment makes the TREEFROG method quite robust.

Figure 20:
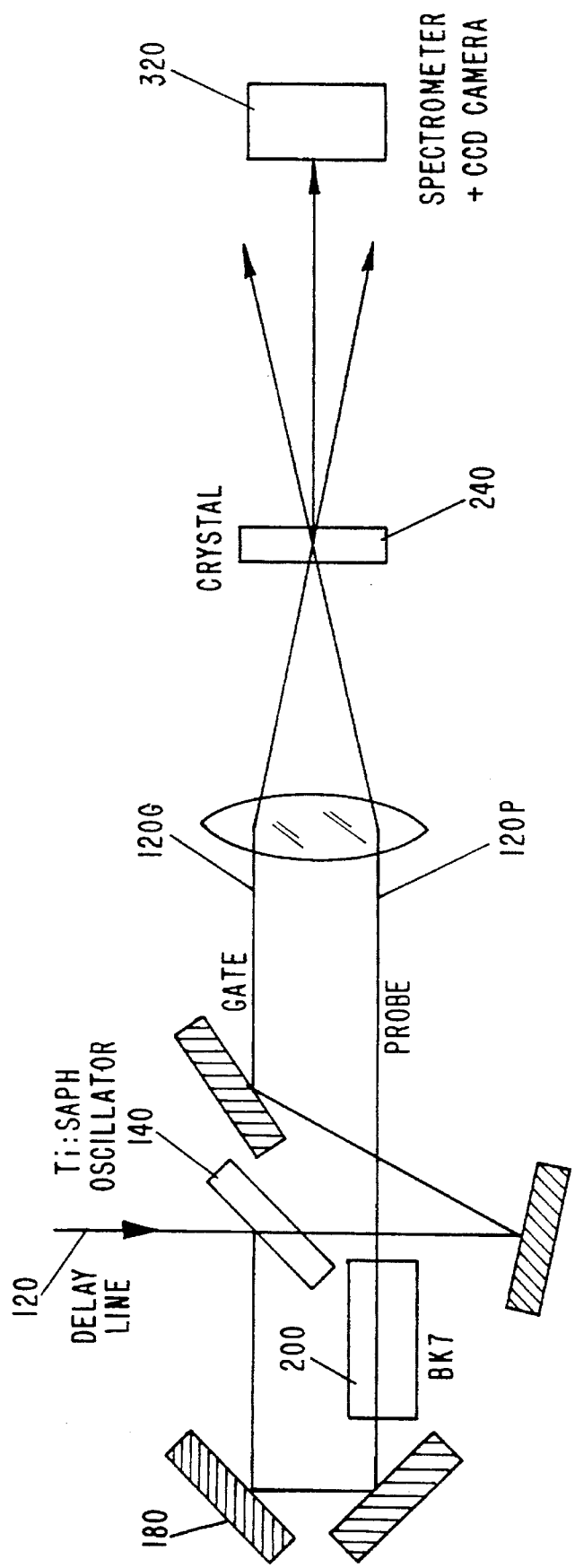
FIG. 20 illustrates an apparatus used to characterize two pulses according to an embodiment of the invention.
Figure 21:
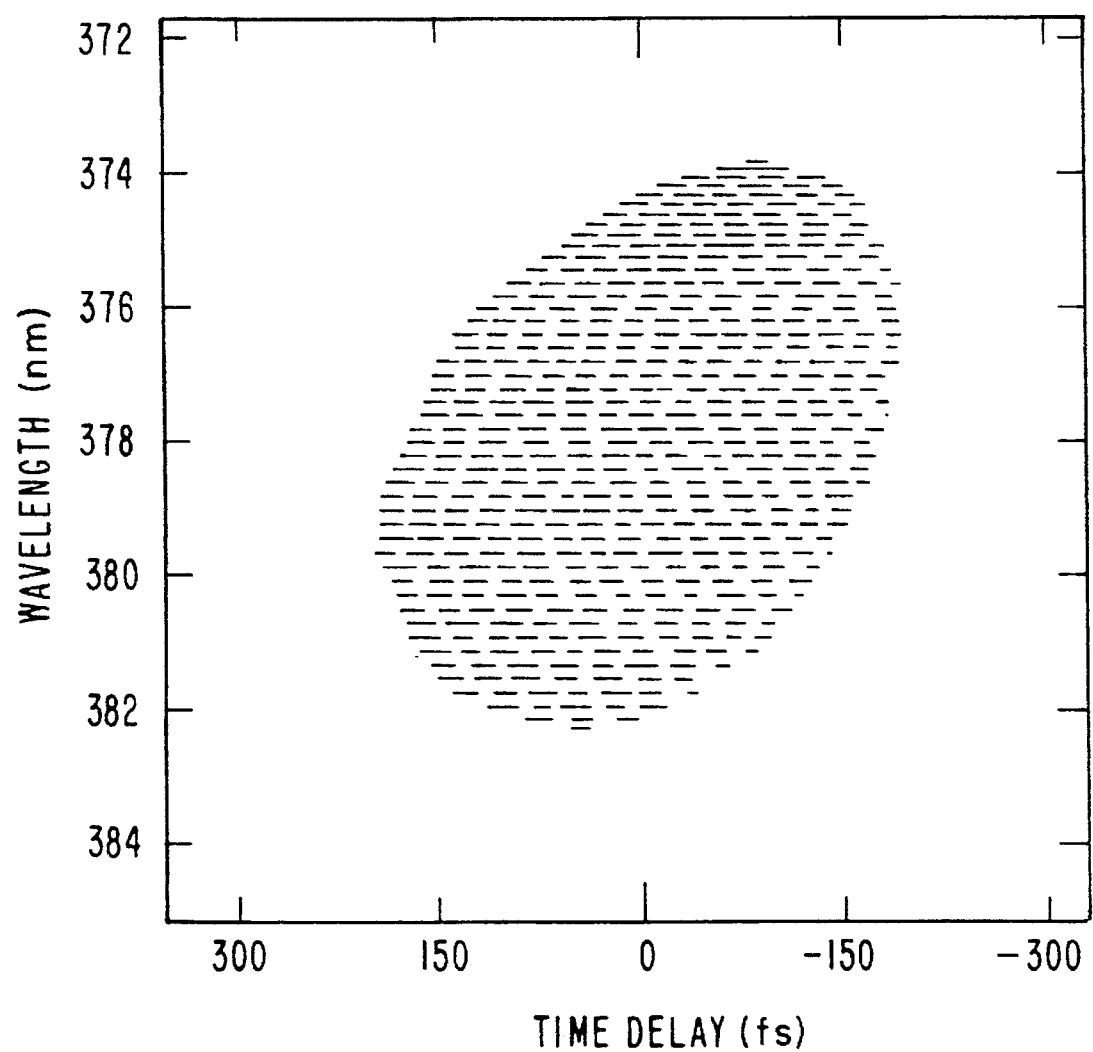
FIG. 21 illustrates the shape of a two-pulse FROG trace.

An apparatus for carrying out the method of the fifth embodiment is shown in FIG. 20. A beam 120 implemented, for example, with a Spectra-Physics Tsunami Ti:Sapphire laser oscillator operating at 757 nm was split into two beam splitter 140, a probe 120P and a gate 120G. The gate beam 120G was passed through a variable time delay 180 and a 6.5 cm length of BK7 glass 200. The two beams 120P and 120G were then focused by a lens 220 into a KDP frequency-doubling crystal 240, and the sum-frequency light was frequency resolved by a spectrometer 320. A TREEFROG trace which is a recording of the spectrum for all relevant values of the time delay between the two beams is depicted in FIG. 21. Unlike SHG FROG, the SHG TREEFROG trace acquires a tilt from the linear chirp, since the probe and gate fields are different.

Using the above TREEFROG method and apparatus, the intensity and phase evolution of both the gate and probe fields (pulses) were retrieved. As propagation through the BK7 glass 200 leaves the spectrum of this pulse unchanged, the same spectrum can be used to constrain both the probe and gate fields. Also, because inevitable noise in the measured spectrum caused the spectrum-constraining process to introduce excess noise into the fields, after the TREEFROG method reached what appeared to be its lowest obtainable error (after 100 iterations) six additional iterations of the method were carried out without the spectral constraint. This served to make the retrieved fields less noisy.

Figure 22A:
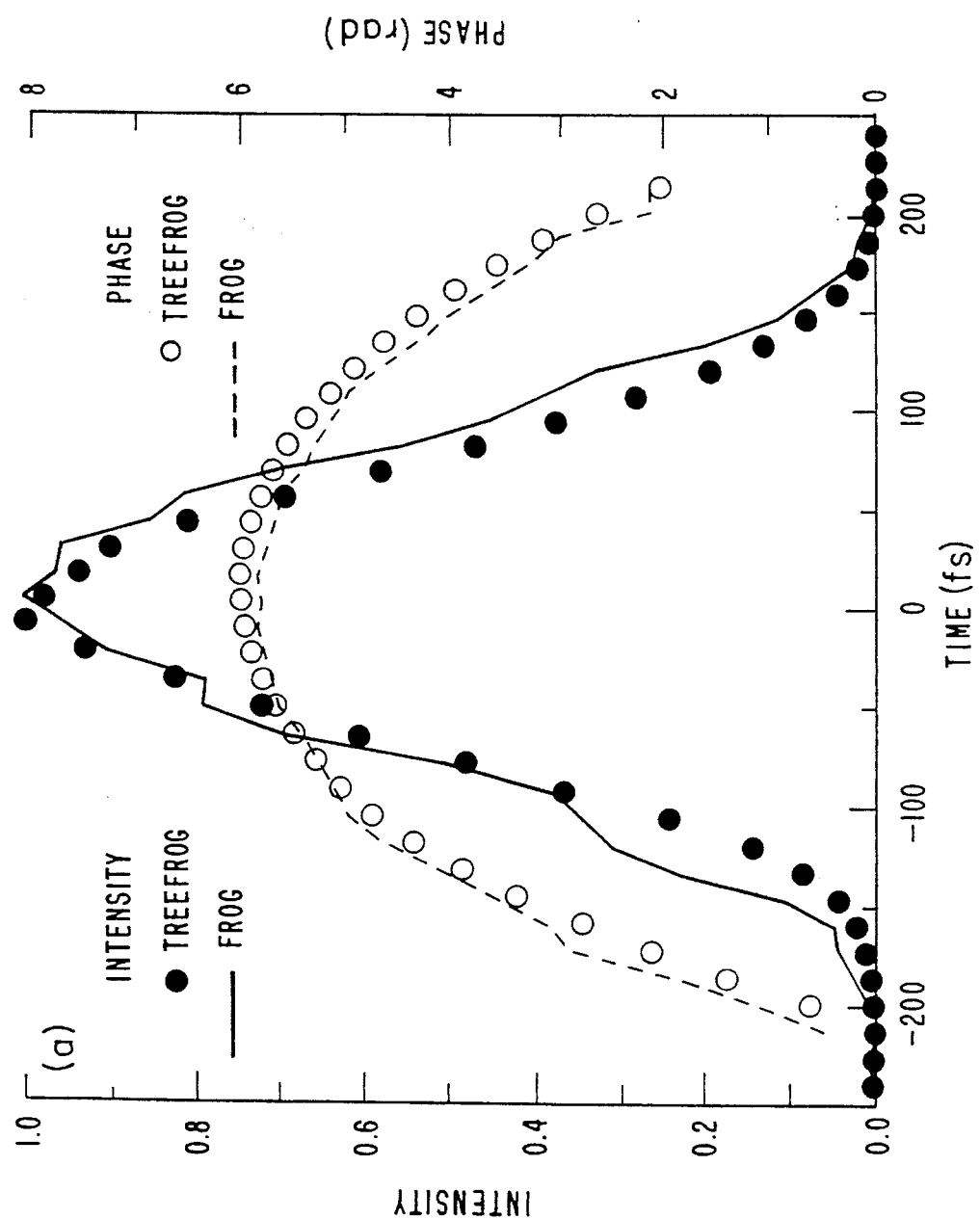
FIGS. 22A–22B depict the dual pulse retrieval method.
Figure 22B:
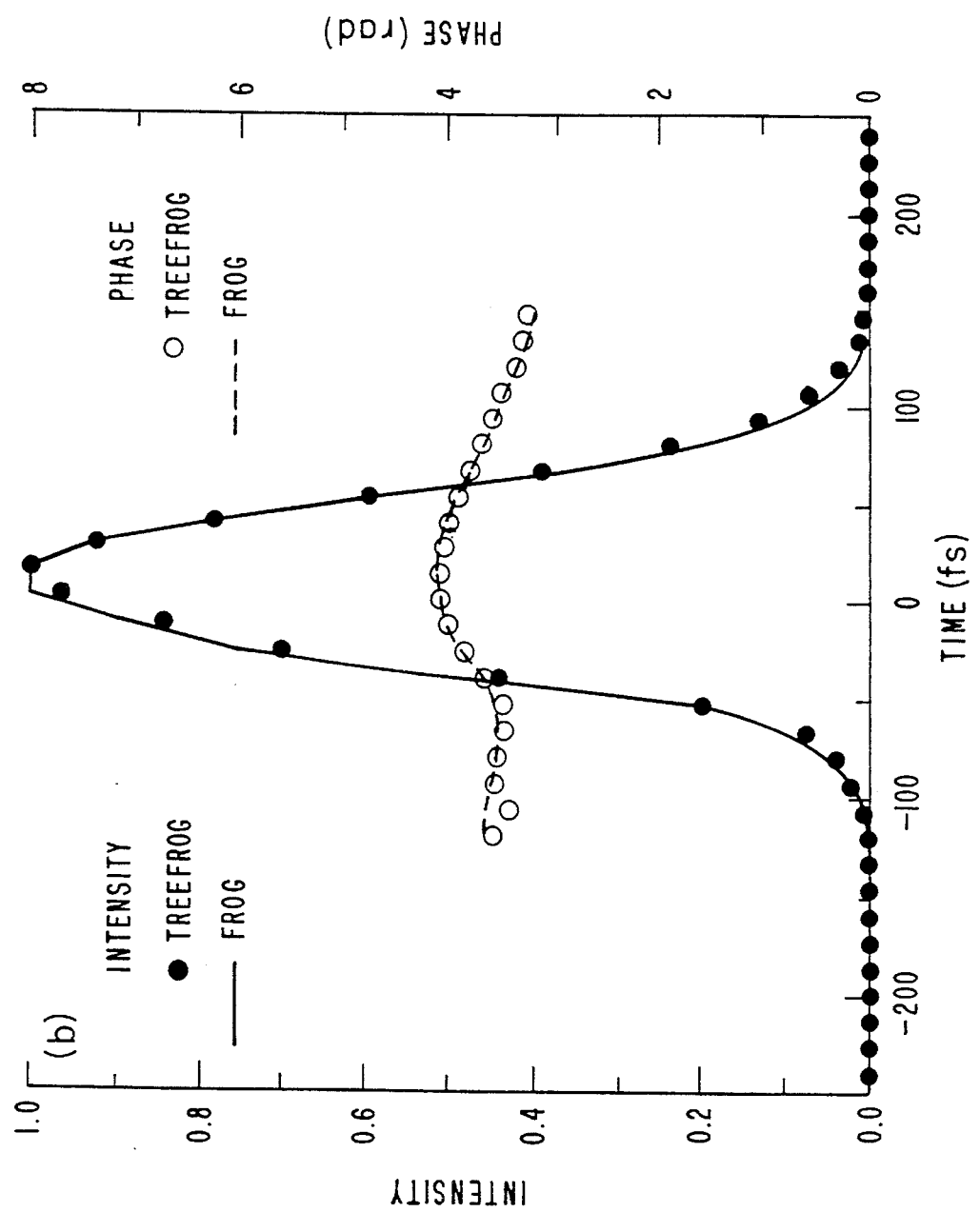

The results are shown in FIGS. 22A–22B. SHG FROG traces of the oscillator beam both with and without the BK7 present were made in order to determine the intensity and phase of each field for comparison with the TREEFROG result. FIGS. 22A and 22B illustrate the probe and gate fields, respectively. The agreement between the fields retrieved with TREEFROG and the fields derived with the usual SHG FROG are quite good. The TREEFROG method successfully retrieved the intensity and phase of both the probe and gate fields. While the above embodiment is described in a multi-shot configuration, a TREEFROG trace could easily be measured using a single-shot geometry. Other variations on TREEFROG could also be envisioned. One variation occurs when one of the pulses, typically called the gate, is known (probably due to a previous FROG measurement). Then the form of the field can be fixed and the retrieval method need only extract the form of the other field. This type of retrieval is computationally straightforward and can be used, for example, when the pulse to be measured is relatively weak (a strong gate pulse can be used) or when a pulse with a complex structure, such as the output of a pulse-shaping apparatus is to be used. In this case, the pulse-retrieval method is the same as previously discussed, except that the gate pulse field is known and therefore held fixed at the known value throughout the iteration.

A sixth embodiment involves the use of two FROG apparatuses or a TREEFROG apparatus to measure optical properties of a medium, such as the absorption coefficient and the index of refraction over a wide range of colors, in as little as a single shot.

Figure 23A:
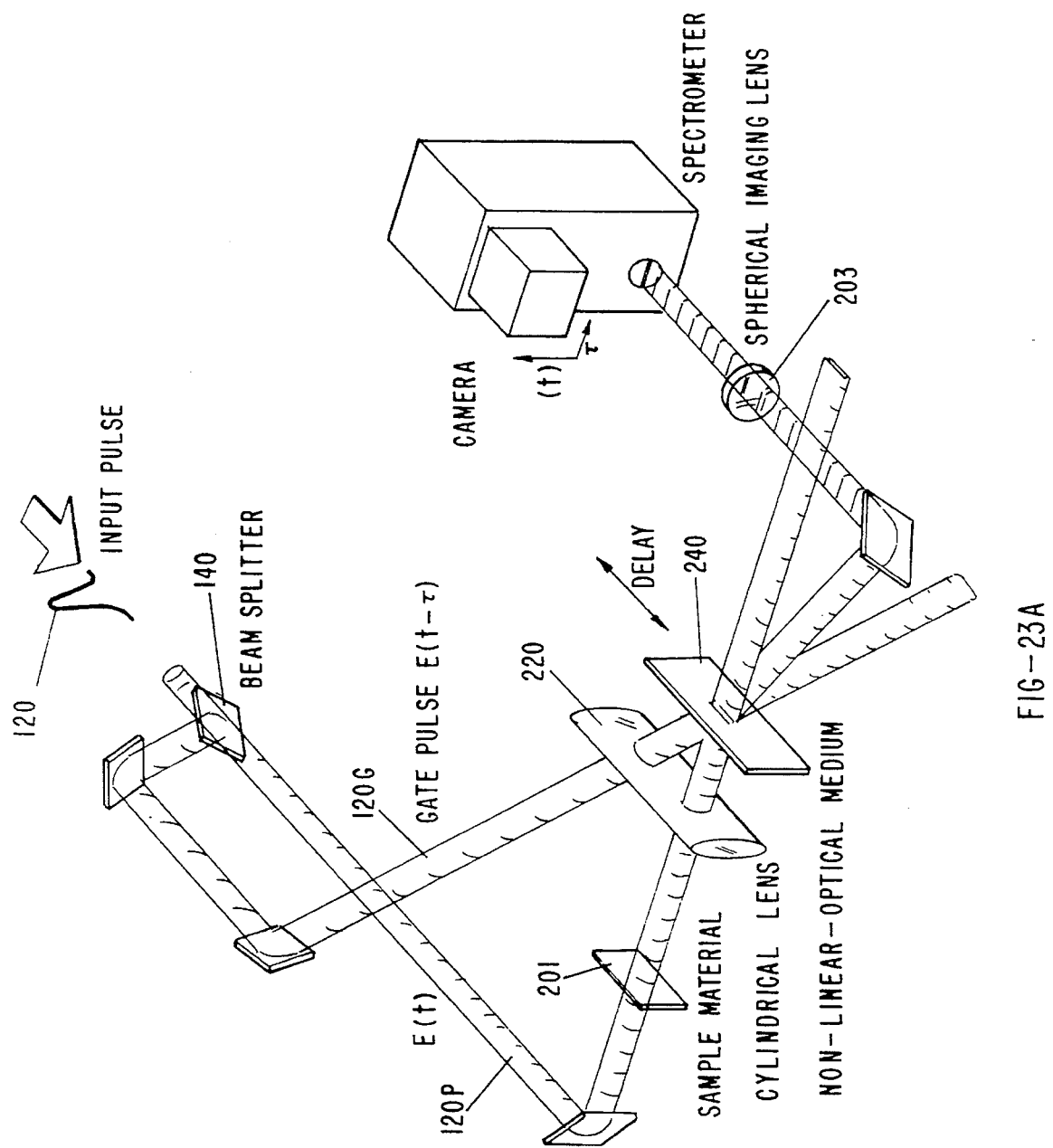
FIG. 23A–23B illustrates single-shot apparatus used according to another embodiment of the instant invention.

A single-shot geometry using the SHG TREEFROG method to determine optical properties of a material is illustrated in FIG. 23A. In FIG. 23A, an input pulse 120 is made incident upon a beam splitter 140. The beam is split into a gate pulse 120G and a probe pulse 120P. (In this geometry, it is generally not necessary to rotate the polarization of the gate pulse.) One pulse, here the probe pulse, passes through the medium 201 whose parameters are to be measured. A cylindrical lens 220 focuses the beams to a line. Crossing at an angle in the nonlinear medium 240 (SHG crystal or surface), the beams have their relative delay mapped onto position. (The cylindrical lens and large angle are only used in the single-shot arrangement.) A spherical lens 203 then images the medium onto the entrance slit of a spectrometer/camera apparatus or simpler dispersing arrangement, as described earlier. In SHG TREEFROG, to avoid ambiguities, single beam spectra must also be recorded of at least one of the input pulses, as well; additional mirrors to direct this beam or beams into the spectrometer or another spectrometer (not shown in the figure) can easily accomplish this.

Figure 23B:
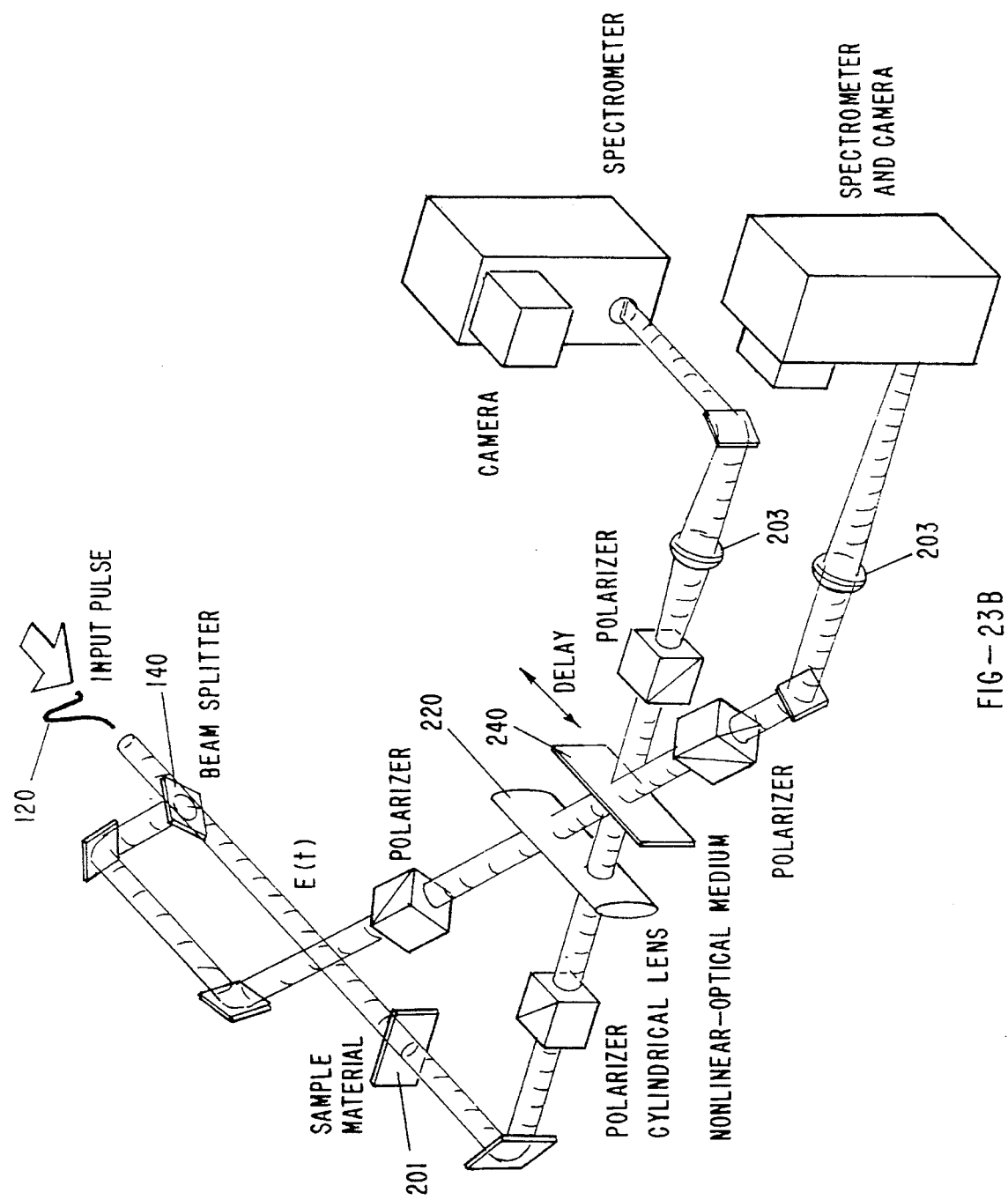

Another such geometry uses the polarization-gate geometry, shown in FIG. 23B. In this geometry, again, the medium is placed in one of the beams, but now reciprocal PG FROG arrangements are used. In one, the gate pulse gates the probe pulse in order to measure it, while in another, the probe pulse gates the gate pulse in order to measure the gate pulse. This is done by placing crossed polarizers at ±45° around the gate pulse as well and measuring its TREEFROG trace. (Additional optics shown in this figure have the same purpose as in previous figures.) As a result, two TREEFROG traces are obtained. This is necessary because, in PG TREEFROG, the full intensity and phase of the probe pulse are measured, but only the time-dependent intensity of the gate pulse may be measured; the time-dependent phase of the gate pulse cannot be measured. This is because the gate pulse enters into the equation for the signal field as the squared magnitude of the field, i.e., as the intensity. In order to overcome this loss of information, the reciprocal FROG apparatus is used to obtain a corresponding trace in which the full intensity and phase of the gate pulse are measured, but only the time-dependent intensity of the probe pulse may be measured; using this trace only, the time-dependent phase of the probe pulse cannot be measured. Thus, the combined information from both traces is sufficient to obtain the full time-dependent intensity and phase of both pulses without physically significant ambiguity. Indeed, the use of two traces in this manner serves to significantly improve convergence of the retrieval process.

As a third alternative, the two pulses combine to produce an induced grating, which diffracts each beam off to the side. Both diffracted beams are then collected. The expression for the signal field is given by:

$$E_{sig}(t,\tau) \propto P^2(t) G^*(t-\tau) \quad (36)$$

The remaining analysis is similar to that for the PG TREEFROG arrangement discussed above.

In all of these configurations, by splitting off some of the pulse before it enters the sample, the input beam as well as the beam leaving the sample material 202 is used to generate the TREEFROG trace. The TREEFROG method is then used to determine the amplitude and phase as a function of frequency (the complex spectrum) of both the unaltered pulse $E_{in}(\omega)$ and the pulse after propagating through the medium $E_{out}(\omega)$. By taking the ratio of these two complex spectra, the complex transmission coefficient can be calculated as a function of frequency, and therefore the absorption spectrum and index of refraction of the sample across the entire band width of the ultra-sort pulse can be determined:

$$t(\omega) = \frac{E_{out}(\omega)}{E_{in}(\omega)} \text{ where } t(\omega) = \exp^{-[\alpha(\omega)+in(\omega)k_0]L} \quad (37)$$

wherein $\alpha(\omega)$ is the absorption coefficient, $n(\omega)$ is the refractive index and $k_0$ is the free-space k-vector. In this manner, using the TREEFROG of the fifth embodiment, the absorption and index of refraction of a sample material 220 can be obtained over a large range of frequencies using a single laser shot, i.e. with excellent temporal resolution. Similarly, TREEFROG could be used to obtain information when studying the nonlinear properties of the sample material, as well as the linear properties just described.

It is noted that such measurements could also be obtained using the basic FROG method described earlier. In this case, two separate FROG traces of the pulses, one before and one after propagation through the medium, are obtained. Again, the amplitude and phase of the input and output pulses can be determined and the complex transmission or nonlinear properties can be calculated.

Figure 24:
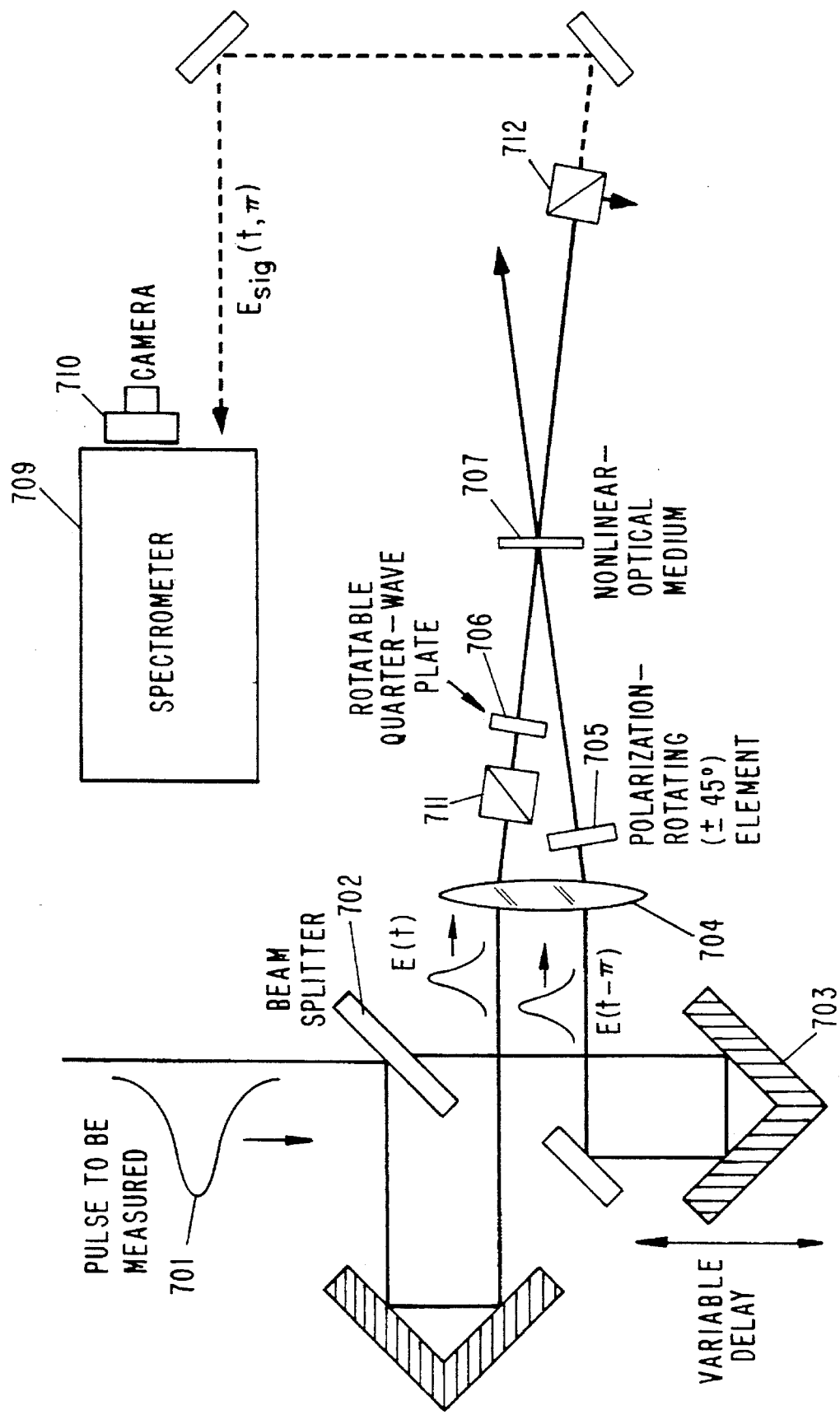
FIG. 24 illustrates an apparatus for carrying out still another embodiment of the instant invention.

A seventh embodiment, shown in FIG. 24, involves coherently combining the signal pulse with another (typically unknown) pulse or pulses (that are related in some way to the unknown pulse to be measured) before measuring the spectrum. This method is analogous to well-known optical heterodyne detection (OHD) methods, which are used to perform polarization spectroscopy and Raman-induced-Kerr-effect spectroscopy. Advantages of this embodiment for FROG are: 1) enhanced signal intensity, 2) improved signal-to-noise ratio, and 3) measurement of the full real and imaginary parts of the signal field, leading to much faster reconstruction of the pulse—since no phase retrieval is necessary, only one half an iteration is now required for full pulse reconstruction.

The apparatus of FIG. 24 includes a pulse to be measured 701, a beam splitter 702, a variable delay line 703 and a lens 704. A polarization-rotating (±45°) element 705 is provided in the path of the gate pulse. A rotatable quarter-wave plate 706 is provided in the path of the pulse to be measured 701 (probe pulse). First and second polarizers 711 and 712 are also provided.

In previous OHD methods, an apparatus similar to that of FIG. 24 is used, but using cw or long-pulse light and lacking the variable-delay 703 and spectrum-resolving apparatuses 709 and 710. Its key feature is that it allows some of the "wrong" polarization to leak through the second polarizer 712 and to copropagate with the signal beam. This extra polarizer leakage at the wrong polarization is called the local oscillator (LO). Generally, the LO is of greater intensity than the signal beam. The measured intensity in any OHD method will be:

$$I_{meas}(t) = I_{LO}(t) + 2Re\{E_{LO}(t)^* E_{sig}(t)\} + I_{sig}(t) \quad (38)$$

where $I_{LO}(t)$ is the intensity of the local oscillator beam, $I_{sig}(t)$ is the intensity of the signal beam, and the other term is the cross term involving the product of the fields of the two beams. As long as the local oscillator is much stronger than the signal beam, which is usually the case, the signal intensity can be neglected, and the measured intensity will be accurately approximated by:

$$I_{meas}(t) \approx I_{LO}(t) + 2Re\{E_{LO}(t)^* E_{sig}(t)\} \quad (39)$$

Typically, chopping methods can be used to single out the cross term and not the local oscillator intensity, so only the cross term will be measured. In this manner, some measure of the complex signal field is obtained, leading to a measure of the medium's nonlinearity in polarization spectroscopy and Raman experiments, and the measured signal is amplified compared to the signal intensity, which is negligible compared to the cross term. In addition, it can be shown that OHD also leads to improved signal-to-noise ratio. Finally, the use of a rotatable quarter-wave plate 706 in the probe beam to cause the leakage allows variation of the relative phase of the LO and signal beams, which then allows the measurement of the real and imaginary parts of the cross term. OHD concepts are discussed in R. Trebino and C. C. Hayden, "Antiresonant-Ring Transient Spectroscopy," Opt. Lett., vol. 16, pp. 493–495, (1991), and references therein the contents of which are incorporated herein by reference.

OHD concepts can be applied to FROG, as shown in FIG. 24, and we will refer to the resulting method as OHD FROG. In OHD FROG, unlike other OHD techniques, which do not involve resolving the spectrum of the signal plus LO beam, the FROG signal plus LO beam is spectrally resolved. The measured intensity is then:

$$I_{measured}(\omega,\tau) \approx I_{LO}(\omega) + 2Re\{E_{LO}(\omega)^* E_{FROG}(\omega,\tau)\} \quad (40)$$

where $E_{FROG}(\omega,\tau)$ is the usual FROG signal field, given by Equation (0). By slightly rotating the quarter plate 706 from having an axis parallel to the second polarizer 712 to slightly off this angle, the relative phase of the LO and signal beams shifts by 90 degrees yielding the signal intensity:

$$E_{measured}'(\omega,\tau) \approx I_{LO}(\omega) + 2Im\{E_{LO}(\omega)[E_{FROG}(\omega,\tau)]\} \quad (41)$$

At this point, the LO spectrum, $I_{LO}(\omega)$, may simply be subtracted off using an independent measurement of the beam spectrum or chopping methods (placing a chopper in the gate pulse, $E(t-\tau)$, which yields a chopped signal, and then lock-in detecting at the chopper frequency) to eliminate contributions of this term in the measured trace. As a result, both the real and imaginary parts of the measured quantity, $$E_{OHDFROG}(\omega,\tau) = E_{LO}(\omega)^* E_{FROG}(\omega,\tau), \quad (42)$$

will be obtained.

Measuring the above full complex quantity is advantageous because, although this new signal field, $E_{LO}(\omega)^* E_{FROG}(\omega,\tau)$, is more complicated than simply $E_{FROG}(\omega,\tau)$, as before, this embodiment now fully characterizes it, yielding the real and imaginary parts, or equivalently the intensity and phase of this signal pulse. Compare this case with the previous cases, in which only the magnitude of the signal field is measured. In other words, in the illustration of FIG. 13, the data constraint has shrunk to a point. It is therefore not necessary to perform projections to this set. It is now only necessary to perform a simple projection to satisfy the signal field constraint, given the measured complex signal. Thus we must only perform the following minimization with respect to the field $E(t_k)$:

$$Z_{OHD} \equiv \sum_{1,j=1}^{N} \left[ E_{OHDFROG}(\omega_i,\tau_j) - \sum_{k=1}^{N} E^*(t_k)e^{-i\omega_i t_k} \sum_{k=1}^{N} E(t_k)|E(t_k-\tau_j)|^2 e^{i\omega_i t_k} \right]^2 \quad (43)$$

This minimization is performed exactly as described in the third embodiment, except that the complex quantity, $E_{OHDFROG}(\omega,\tau)$, is used for the data, as in the above equation.

Figure 25:
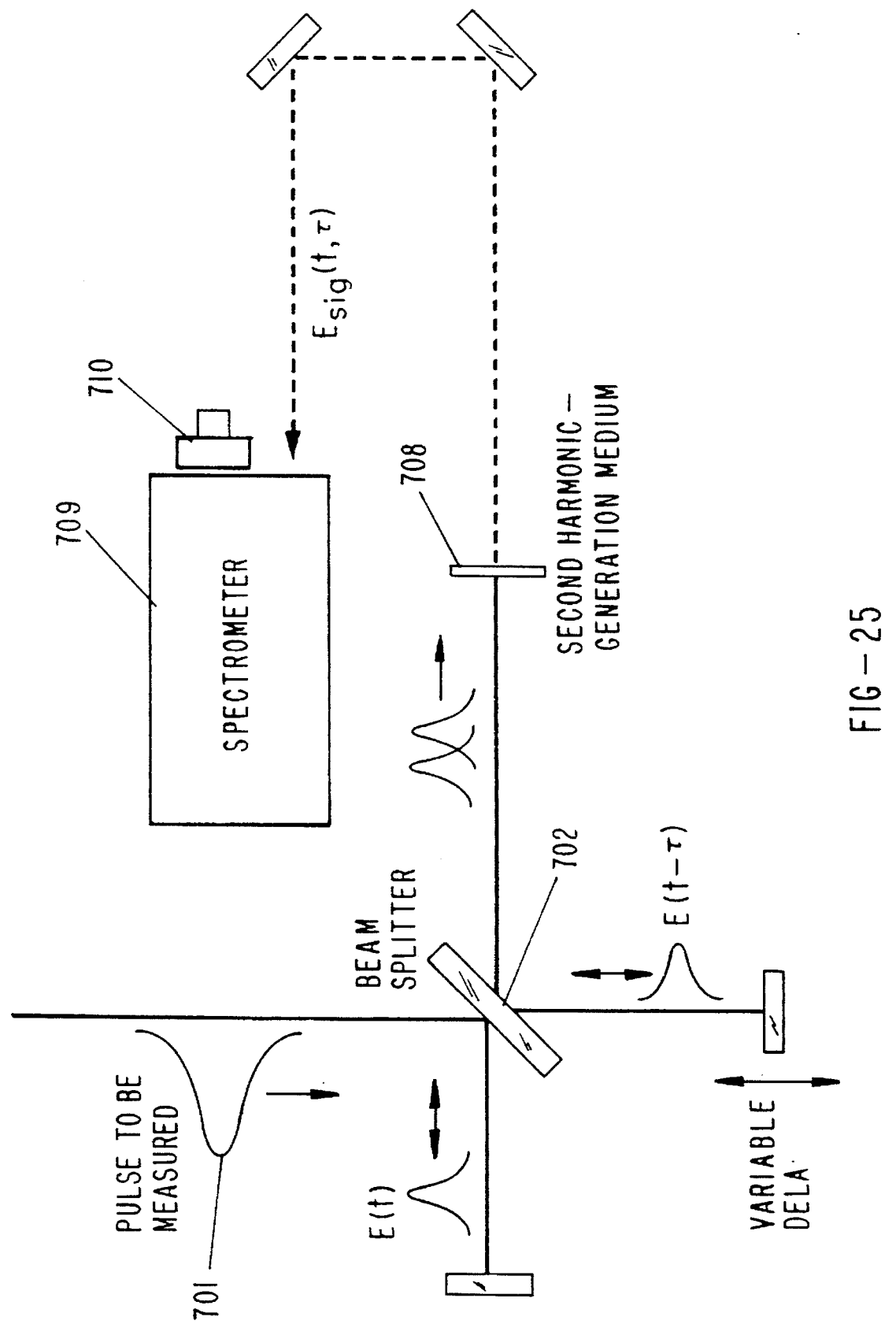
FIG. 25 illustrates an apparatus according to yet another embodiment of the invention.

Another variation on OHDFROG involves interferometric second-harmonic generation (ISHG) and is shown in FIG. 25. Simple ISHG, as it is commonly performed, involves essentially the optics of FIG. 25, but without the spectrometer, i.e., it involves simply measuring the signal energy vs. delay. The OHDFROG embodiment shown in FIG. 25 involves spectrally resolving the ISHG signal and therefore measuring the spectrum vs. delay. In FIG. 25, like components have like reference numerals. A second harmonic-generation medium 708 is employed. This embodiment is an OHDFROG method because the signal field (obtained from the gating of one pulse in the SHG medium by the other) combines coherently with the second harmonic light from each individual pulse, which acts like a LO.

The mathematics of this method is different, however. It is not possible to measure the full complex signal field, and, as a result, we will not be able to reduce the pulse retrieval problem to one half of an iteration. The full phase-retrieval method must be used. However, the generalized projections method described in the third embodiment is ideal for this problem. The signal field is given by:

$$E_{ISHGFROG}(t,\tau) = [E(t) + E(t-\tau)]^2 \quad (44)$$

Except for the more complicated signal field, this problem is identical to the normal FROG retrieval problem, and the appropriate quantity that must be minimized to satisfy the nonlinear-optical constraint:

$$Z_{ISHGFROG} = \sum_{i,j=1}^{N} |E_{ISHGFROG}(t_i,\tau_j) - [E(t_i) + E(t_i-\tau_j)]^2|^2 \quad (45)$$

Figure 26:
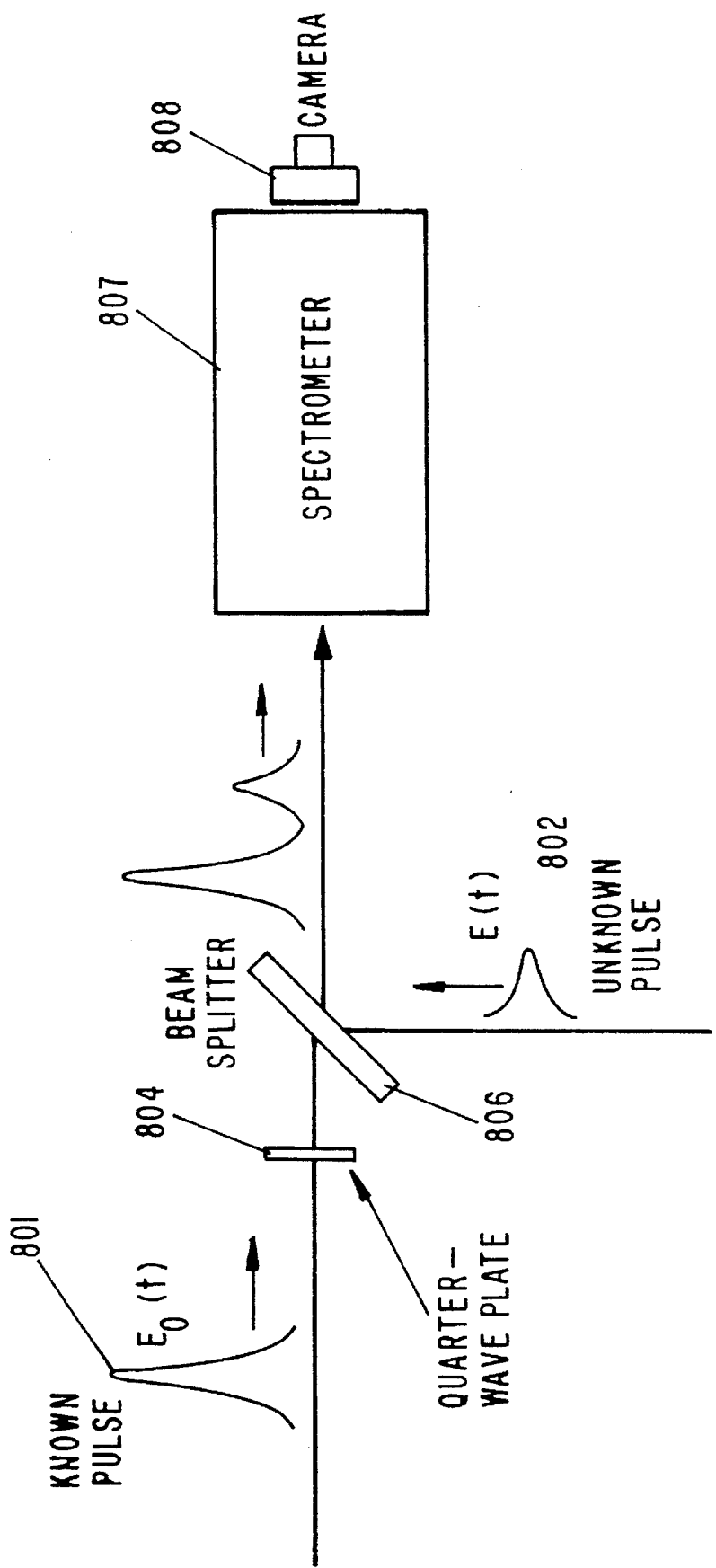
FIG. 26 illustrates an apparatus according to yet another embodiment of the invention.

An eighth embodiment illustrated in FIG. 26 involves the case when a well-characterized (known) pulse 801 is available with on the order of or more than the spectral width of the unknown pulse 802. This embodiment involves measuring the spectrum of the coherent sum of both the pair of (known and unknown) pulses. We call this method Temporal Analysis of a Dispersed Pair Of Light E-fields (TADPOLE). TADPOLE involves using this interference spectrum to obtain the relative phase between the two pulses—and hence the phase of the unknown pulse—and independently measuring the unknown pulse spectrum achieving its full characterization in the frequency domain.

TADPOLE does not involve a nonlinear-optical medium. However, such a process as described in the above embodiments is typically required to measure the known pulse. Because no nonlinear-optical process using the unknown pulse as input is required, this embodiment is ideal for extremely weak pulses—pulses with as little as $10^{-15}$ or less Joules of energy. Indeed, because the required phase information is contained in a cross term between the unknown and known pulses, use of a strong known pulse achieves some effective amplification of the unknown pulse. As a result, pulses with even less energy may be measured in this manner. Indeed, for a high-repetition-rate train of such pulses, this is especially so.

TADPOLE involves interfering a well-characterized pulse with the (potentially weak) unknown pulse and measuring the spectrum of the resulting two-pulse field. The resulting spectrum is given by:

$$I_{TADPOLE}(\omega) = I_0(\omega) + I(\omega) + 2[I_0(\omega)I(\omega)]^{1/2} \cos[\phi(\omega) - \phi_0(\omega)] \quad (46)$$

where $I_0(\omega)$ and $I(\omega)$ are the spectra of the known and unknown pulses, respectively, and $\phi_0(\omega)$ and $\phi(\omega)$ are the phases vs. frequency of the known and unknown pulses, respectively.

By blocking one beam and then the other, it is possible to measure the individual pulse spectra, $I_0(\omega)$ and $I(\omega)$. These measurements may then be used to subtract off the first two terms in the above equation and then to normalize the cosine term to have oscillations with unity magnitude. Alternatively, the cosine term can easily be made to oscillate arbitrarily rapidly by introducing relative delay between the two pulses, so that the two pulses do not overlap appreciably. In this case, it is not necessary to even measure the two spectra to make this measurement. Rather, it is simply necessary to automatically normalize the oscillations in the measured spectrum to have unity magnitude. (It is, however, necessary to measure the unknown pulse spectrum in order to obtain its full characterization.)

The measured trace then yields the reduced measured quantity:

$$f_{TADPOLE}(\omega) = \cos(\phi(\omega) - \phi_0(\omega)) \quad (47)$$

which is easily inverted to yield:

$$\phi(\omega) = \phi_0(\omega) + \arccos[f_{TADPOLE}(\omega)] \quad (48)$$

which, because $\phi_0(\omega)$ is known, yields the desired unknown phase, $\phi(\omega)$. Ambiguities exist, however. Knowledge of just the cosine of a phase function is insufficient to determine the phase function because the arccos function necessarily yields values between 0 and $\pi$. A pulse phase, $\phi(\omega)$, on the other hand, can take on values between 0 and $2\pi$. The method, as described so far has insufficient strength to avoid these ambiguities. Another measurement must be made.

This can be accomplished by making another spectral measurement after introducing a known relative phase delay of $\theta$ between the two pulses. The TADPOLE spectrum that will result is then:

$$I_{TADPOLE}'(\omega) = i_0(\omega) + I(\omega) + 2[I_0(\omega)I(\omega)]^{1/2} \cos(\phi(\omega) - \phi_0(\omega) - \theta) \quad (49)$$

This new measured trace then yields the reduced quantity:

$$f_{TADPOLE}'(\omega) = \cos(\phi(\omega) - \phi_0(\omega) - \theta) \quad (50)$$

which can be expanded to:

$$f_{TADPOLE}'(\omega) = \cos(\theta)\cos(\phi(\omega) - \phi_0(\omega)) + \sin(\theta)\sin(\phi(\omega) - \phi_0(\omega)) \quad (51)$$

Knowledge of both the cosine and sine of a phase function now is sufficient to fully determine the phase function. Thus, a sufficient condition to solve the problem is to determine both $\cos(\phi(\omega) - \phi_0(\omega))$ and $\sin(\phi(\omega) - \phi_0(\omega))$. Fortunately, the formulas for $f_{TADPOLE}(\omega)$ and $f_{TADPOLE}'(\omega)$ above constitute two equations in the required two unknowns for each value of $\omega$, provided that $\theta$ does not equal 0 or $\pi$. This can be easily controlled.

In practice, many methods exist for introducing the phase delay. First, a small amount of extra propagation through space (about a quarter of a wavelength) may be introduced into one beam simply by moving a mirror, which may be accomplished by translating a stage or applying a voltage to a piezoelectric translator. Another method, shown in FIG. 26, is to place a quarter-wave plate (QWP) 804 in one of the beams. The QWP 804 is to be aligned with its fast principal axis parallel to the polarization of the beam for one measurement and with its slow axis parallel to the polarization of the beam for the other measurement. In this manner, the difference in relative phase delay between the two measurements will be $\pi/2$, which is ideal for this method.

Of course, when the bandwidth of the pulses is large, the difference in relative phase delay between the two measurements will deviate from $\pi/2$ for some frequencies, but as long as it does so in a known manner (which is the case for QWPs and propagation through distances of air or glass), the above two equations are easily solved. If, for some frequency, the difference in relative phase delay between the two measurements becomes 0 or $\pi$, then the ambiguity remains at this frequency. In this case, however, the correct phase value at this point may be chosen from the two possible values using the knowledge of the known phase values at the two adjacent points, where the difference in relative phase delay between the two measurements is not 0 or $\pi$. Alternatively, a third spectral measurement, using a different relative phase delay, may be used.

The inversion method for this problem is direct and fast. No iterative technique is involved. Solution of two simultaneous equations and two unknowns, followed by extraction of arccosines and arcsines, is straightforward. Indeed, knowledge of both the cosine and sine of a phase is more than sufficient to obtain the phase—thus additional information is available as a confirmation that the measurement was made correctly.

Note that, in this embodiment, the relative delay between the two pulses is arbitrary. Variation of this parameter only yields additional checks on the device. It is important, however, to maintain the relative delay between the two pulses constant to within a fraction of a wavelength during the measurement. This device is particularly useful when combined with the above FROG techniques for determining the known pulse.

In a ninth embodiment, an artificial neural-net is used in order to retrieve the pulse from the experimental FROG trace.

Artificial neural nets (ANN's) have been used for a wide variety of data analysis problems, such as motion sensing, handwriting recognition, and stockmarket prediction. In a typical artificial neural-net application, data values are stored in M input nodes, each input node is connected to a "hidden layer" of N nodes through an M×N matrix of weights, which in turn is connected to an output layer of P nodes by an N×P matrix of weights. Sigmoidal functions and other nonlinear activation functions multiply the resulting value at each node. In general, it can be shown that a three-layer ANN can simulate any function of the input values. In addition, simple algorithms exist for training an ANN to approximate any desired function. Finally, ANN's are derived from knowledge of biological systems, which are very good at tasks that digital computers are often not so good at. Thus, ANN's are useful for approximating complicated behavior of real-world systems.

Because the iterative methods used for retrieving ultrashort-laser-pulse fields from FROG traces represent extremely complicated functions of the input data trace, and because the human eye can easily recognize pulses from traces that the iterative methods have trouble with (e.g., the double pulse), ANN's are a reasonable choice for performing this complex FROG pulse-retrieval task.

Figure 27:
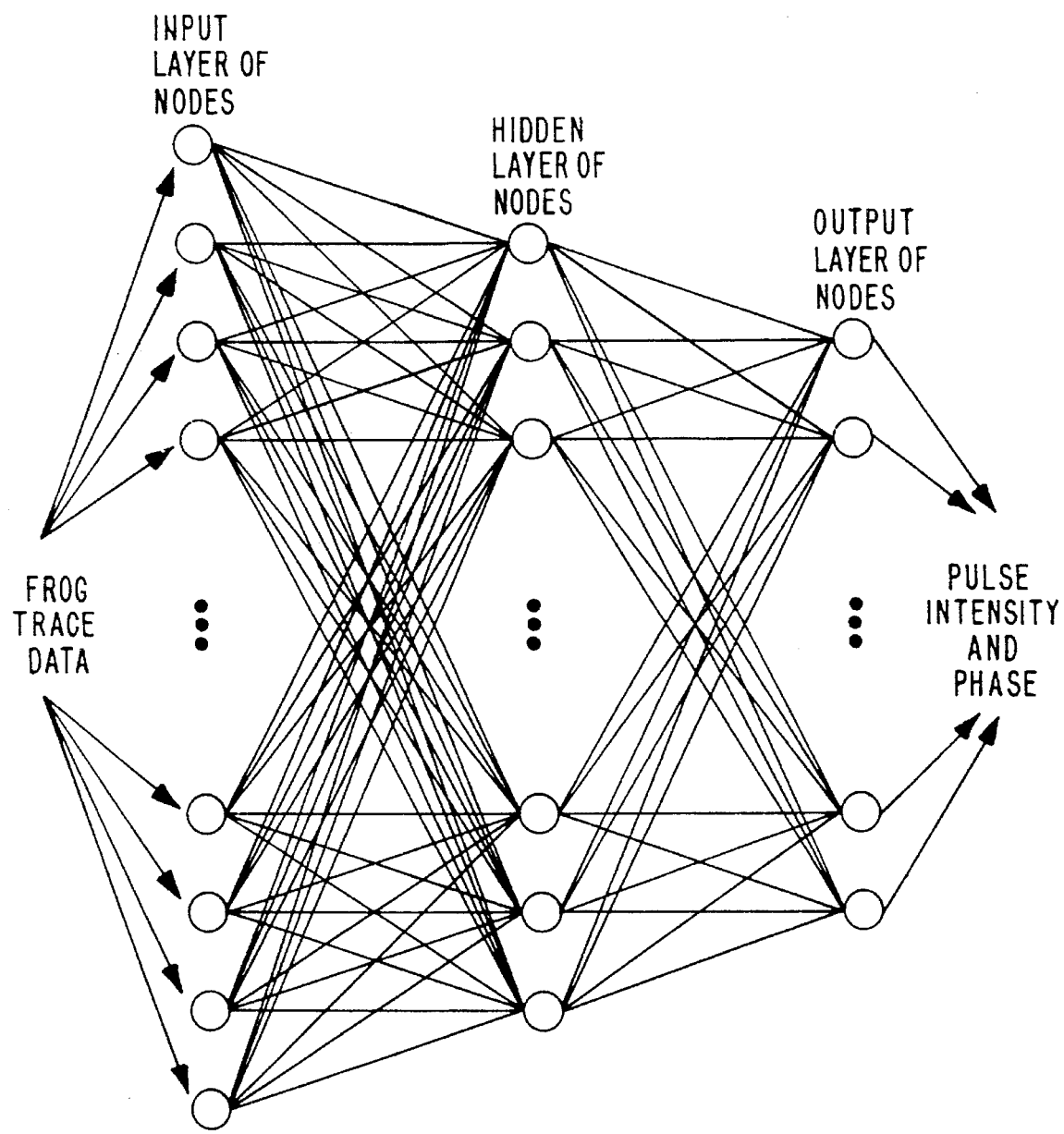
FIG. 27 illustrates a neural net for accomplishing an aspect of the instant invention.

The input FROG trace may be that of any of the previously mentioned embodiments or variations on them. It is simply necessary to train the net using a large set of appropriate traces and their corresponding pulse fields. The advantage of using an artificial neural net to retrieve the pulse from the FROG trace is that the retrieval occurs directly, without the need for iterations, and hence quite rapidly once trained. All previous FROG pulse retrieval methods are iterative, and hence require many seconds and sometimes minutes to converge. An artificial neural net simply involves a fixed number of multiplications, additions, and references to a look-up table, and hence, is much faster. FIG. 27 illustrates a neural net model for carrying out the retrieval of the instant invention from the FROG trace data. The method using a neural net will be referred to as NetFROG.

The required training of the net results in general in a long training period, but use of the net in the field is very fast. A simple three-layer artificial neural net, trained with the standard algorithm, "Backprop," is all that is required See, for example, J. A. Freeman and D. M. Skapura, Neural Networks: Algorithms, Applications, and Programming Techniques, (Addison-Wesley, Reading, Mass., 1991) and references therein, the contents of which are incorporated herein by reference. It is also possible to use generalized projections to train neural networks. This method may work best for neural network retrieval as well. See Y. Shu-Jen and H. Stark, "Learning in neural nets using projection methods," Optical Computing & Processing, vol. 1, no. 1, p. 47–60 (1991) incorporated herein by reference.

It is possible simply to use as inputs to the net the $N^2$ values of the N×N FROG trace, but this represents a very large number of nodes and computations. Training such a net is very slow for even small values of N, such as 32. Further, commercial software limits the number of nodes. Also, once a net is trained for one size of array, then a new training procedure must then be undertaken for a different size array.

As a result, we have found it helpful to perform "feature analysis" of the FROG trace and use as inputs to the net the values of the "features". For example, in one implementation, we have computed moments, $M_{\alpha\beta}$, of the experimental trace:

$$M_{\alpha\beta} \equiv \sum_{1,j=1}^{N} \omega_i^\alpha \tau_j^\beta I_{FROG}(\omega_i, \tau_j) \quad (52)$$

One simply computes as many moments as one's net software and available run time allows. In this manner, the size of the array of the experimental FROG trace does not matter—moments can be computed for any size array, and their meaning does not change for different array sizes. In addition, moments indicate important properties of the trace with high sensitivity. For example, for a symmetrical pulse with a flat phase, the FROG trace is symmetrical with respect to both $\omega$ and $\tau$. As a result, all moments with either $\alpha$ or $\beta$ equal to an odd integer are 0. Thus, slight deviations in the trace from this symmetry, which indicate asymmetries in the pulse intensity and/or phase, are indicated by nonzero values for these odd moments.

It is also useful to compute Legendre and Zernike moments, that is, moments such as those above, but using Legendre and Zernike polynomials in $\omega_i$ and $\tau_j$, instead of simple products of these factors raised to powers. (Such moments are simply linear combinations of the above defined moments.) Additional features that are useful include the mean frequency vs. delay of the trace, which we have also used as an initial guess for the pulse frequency vs. time. Alternatively, the mean time vs. frequency for the trace can be computed, which represents an initial guess for the pulse group delay vs. frequency. Finally, a good way to parameterize the trace is to compute the wavelet transform of the FROG trace. Wavelet transforms have been found to be useful for data compression when storing or transmitting visual images. Wavelets have been shown to contain more useful information of an image for a given amount of parameters than other approaches (such as the Fourier transform, for example).

It is also important to carefully choose the set of pulses and their corresponding traces for training the net. The "space" of all possible pulses must in some sense be completely sampled. This is in general an impossible task because pulses can be arbitrarily complex. However, for a given array size, say 128×128, which is typical, pulses can only be so complicated, that is, they can only have so much substructure. As a result, we have found that for this size array, a normalized sum of as many as twelve Gaussian pulses, each with random heights, widths, and center positions reasonably approximates most pulse intensity shapes seen in experimental traces.

Alternatively, the pulse intensity can be modeled using a sigmoid $[1/(1+\exp(-x))]$ of a Taylor series out to approximately twentieth order. The sigmoid forces the intensity to take only values between 0 and 1. Multiple pulses result from highly oscillatory polynomials occurring in the Taylor series. Phase dependencies can also be modeled by a Taylor series again out to approximately twentieth order. These expansions can occur in the time or frequency domains. Clearly even these limited spaces of pulse shapes cannot be spanned well, but a set of several thousand may easily be generated and appropriate features extracted for training a net. In addition, a few well-known commonly occurring pulse types, such as the transform-limited pulse, the linearly chirped pulse, and the pulse with cubic phase distortion in the frequency domain can also be included to ensure that the net trains on these pulses as well.

Finally, representing the pulse that the net produces is also important. One simple solution is simply to output on the order of N points of the intensity, one for each time value, and another equal number of points for the phase, again, one for each time value. Another solution is to use the same parameters used in creating the training set. The former approach better models intensity and phase fluctuations and jumps, while the latter usually involves less parameters and hence is faster and it better models slowly varying pulses. Hybrid approaches also have advantages: modelling the intensity using the sigmoid of a polynomial approximates commonly occurring, i.e., smooth, pulses well, but using the N-points approach for the phase may by preferred because phase "jumps" of $\pi$ often occur simply because the pulse complex amplitude goes through zero.

The foregoing description of preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of characterizing two light pulses, comprising the steps of:

receiving first and second light pulses, said first light pulse having a variable delay and being delayed over a delay range with respect to said second light pulse;

combining said first and second light pulses within a medium having a nonlinear optical property to produce a signal pulse, said signal pulse being functionally related to said first and second light pulses;

generating an output signal pulse field from said signal pulse representing signal intensity versus frequency over said delay range; and determining characteristics of both of said first and second light pulses on the basis of said output signal pulse field.

2. A method as recited in claim 1 wherein said characteristics include time-dependent or frequency-dependent amplitude and phase of said first and second light pulses.

3. A method of determining an optical characteristic of a medium, comprising the steps of:

providing a first light pulse to form a probe pulse;

providing a second light pulse to form a gate pulse, said gate pulse having a variable delay and being delayed over a delay range with respect to said probe pulse;

causing said probe pulse to interact optically with said medium to produce an output pulse;

combining said output pulse and said gate pulse within a nonlinear optical medium to produce a signal pulse, said signal pulse being functionally related to said output pulse and said gate pulse according to a nonlinear optical property of said optical medium;

generating an output signal pulse field from said signal pulse representing signal intensity versus frequency over said delay range;

calculating an amplitude and phase of said output pulse and one of said probe pulse and said gate pulse on the basis of said output signal pulse field; and determining said optical characteristic of said medium using said amplitude and phase calculated in the calculating step.

4. An apparatus for determining an optical characteristic of a medium, comprising:

a first light source producing a probe pulse, said probe pulse optically interacting with said medium to form an output pulse;

a second light source producing a gate pulse having a variable delay and being delayed over a delay range with respect to said probe pulse;

a nonlinear medium having a nonlinear optical property located to combine said gate pulse and said output pulse and to output a signal pulse, said signal pulse being functionally related to said output pulse and said gate pulse;

a wavelength-selective device positioned to receive said signal pulse, said wavelength-selective device outputting an output signal pulse field representing signal intensity versus frequency over said delay range; and a calculating unit coupled to receive said output signal pulse field, wherein said calculating unit calculates amplitude and phase information of said output pulse and one of said probe pulse and said gate pulse on the basis of said output signal pulse field and determines said optical characteristic of said medium using said amplitude and phase information.

5. A method of determining an optical characteristic of a medium, comprising the steps of:

providing a gate light pulse having a variable delay and being delayed over a delay range;

providing a probe light pulse;

causing said probe light pulse to interact with said medium;

combining said probe light pulse and said gate light pulse to produce a signal light pulse such that said signal light pulse represents a nonlinear optical relationship between said probe light pulse and said gate light pulse; and determining the optical characteristic of said medium from said signal light pulse on a basis of said non-linear optical relationship.

6. A method of characterizing a light pulse, comprising the steps of:

(a) providing a first light pulse to form a probe pulse;

(b) providing a second light pulse to form a gate pulse, said gate pulse having a delay which is varied over a range of delay values with respect to said probe pulse;

(c) combining said probe pulse and said gate pulse within a nonlinear medium to produce an output signal pulse, a nonlinear property of said nonlinear medium acting as a first constraint defining a first set of signal fields;

(d) generating a frequency-resolved optical gating (FROG) trace from said signal pulse, said FROG trace acting as a second constraint;

(e) producing an initial signal field in a time domain using an initial electric field prediction;

(f) applying said second constraint to said initial signal field in a frequency domain to produce an intermediate signal field;

(g) applying said first constraint to said intermediate signal field in the time domain by minimizing an error value of a function which quantifies an error between the intermediate signal field and said first set of signal fields with respect to the electric field to derive a new electric field; and (h) repeating step (e) through step (h) using said new electric field in place of said initial electric field prediction a number of times to generate an electric field characterization of said light pulse.

7. A method of characterizing a light pulse, comprising the steps of:

(a) providing a first light pulse to form a probe pulse;

(b) providing a second light pulse to form a gate pulse, said gate pulse having a delay which is varied over a range of delay values;

(c) combining said output pulse and said gate pulse within a nonlinear medium having a nonlinear optical property to produce a signal pulse, said signal pulse being functionally related to said output pulse and said gate pulse;

(d) converting said signal pulse into an output signal pulse field, said output signal pulse field representing signal intensity versus frequency over said range of delay values; and (f) characterizing said light pulse by, i. determining a signal field $E_{sig}(t,\tau)$, as a function of time t and delay $\tau$, using an initial electric field E(t) prediction in an field equation having a constraint derived from said nonlinear optical property of said medium;

ii. converting said signal field $E_{sig}(t,\tau)$ to a signal field $E_{sig}(\omega,\tau)$, as a function of frequency $\omega$ and delay $\tau$;

iii. replacing a magnitude of said signal field $E_{sig}(\omega,\tau)$ with a magnitude of derived from said plurality of output signal pulse fields while leaving a phase of said signal field $E_{sig}(\omega,\tau)$ unchanged to produce a modified signal field $E'_{sig}(\omega,\tau)$;

iv. converting said modified signal field $E'_{sig}(\omega,\tau)$ into a modified time signal field $E'_{sig}(t,\tau)$;

v. minimizing an error value, of an error function which quantifies an error between the modified signal field $E'_{sig}(t,\tau)$ and set of all fields which satisfy a constraint imposed by said known nonlinear optical property of said nonlinear medium, with respect to the electric field E(t); and vi. repeating steps i–vi a number of times using the electric field E(t) producing the minimum error value in said error function as a new electric field E(t) prediction in place of said initial electric field E(t) prediction to produce a characterization electric field E(t) which provides a characterization of at least said probe pulse.

8. A method of characterizing a light pulse, comprising the steps of:

(a) providing a first light pulse to be characterized;

(b) providing a second light pulse to form a gate pulse, said gate pulse having a delay which is varied over a range of delay values with respect to said first light pulse;

(c) combining said first light pulse and said gate pulse within a nonlinear medium having at least one of a nearly-instantaneous and a non-instantaneous material response to produce an output signal pulse;

(d) combining said output signal pulse with a pulse related to said first light pulse to produce a combined light pulse;

(e) measuring a spectrum of said combined light pulse including an intensity and phase of said output signal pulse; and (f) calculating a characteristic of said first light pulse on a basis of said intensity and phase of said output signal pulse.

9. A method of determining an optical characteristic of a medium, comprising the steps of:

(a) measuring an intensity and phase of a first light pulse to obtain a characteristic of said first light pulse;

(b) thereafter, sending said first light pulse through said medium and obtaining a second light pulse as a result thereof;

(c) measuring an intensity and phase of said second light pulse to obtain a characteristic of said second light pulse; and (d) determining the optical characteristic of said medium using the characteristic of said second light pulse and the characteristic of said first light pulse.

10. A method as recited in claim 9 wherein the characteristic of said first light pulse and the characteristic of said second light pulse are obtained by a frequency-resolved optical gating (FROG) trace.

* * * * *